(12) United States Patent
Olson et al.

(10) Patent No.: US 12,050,052 B1
(45) Date of Patent: Jul. 30, 2024

(54) REFRIGERATED CARRIER DEVICE FOR BIOLOGICAL SAMPLES

(71) Applicant: Babson Diagnostics, Inc., Austin, TX (US)

(72) Inventors: Eric Olson, Austin, TX (US); Mark S. Flanagan, Saugus, MA (US); James Paolino, Reading, MA (US)

(73) Assignee: Babson Diagnostics, Inc., Austin, TX (US)

( * ) Notice: Subject to any disclaimer, the term of this patent is extended or adjusted under 35 U.S.C. 154(b) by 4 days.

(21) Appl. No.: 17/818,169

(22) Filed: Aug. 8, 2022

Related U.S. Application Data

(60) Provisional application No. 63/230,406, filed on Aug. 6, 2021.

(51) Int. Cl.
*F25D 3/08* (2006.01)
*A01N 1/02* (2006.01)
*F25D 29/00* (2006.01)

(52) U.S. Cl.
CPC ............. *F25D 3/08* (2013.01); *A01N 1/0252* (2013.01); *F25D 29/003* (2013.01); *F25D 2201/12* (2013.01); *F25D 2700/12* (2013.01)

(58) Field of Classification Search
CPC ...... F25D 2303/0831; F25D 3/14; F25D 3/08; F25D 2201/12; F25D 2700/12;
(Continued)

(56) References Cited

U.S. PATENT DOCUMENTS

| 1,892,884 A | 1/1933 | Grauman et al. |
| 2,110,237 A | 3/1938 | Parsons |

(Continued)

FOREIGN PATENT DOCUMENTS

| CA | 2058917 A1 | 7/1993 |
| CN | 1501080 A | 6/2004 |

(Continued)

OTHER PUBLICATIONS

European Search Report for EP Application No. 20209543 dated Jun. 9, 2021, 9 pages.

(Continued)

*Primary Examiner* — David J Teitelbaum
(74) *Attorney, Agent, or Firm* — Cooley LLP

(57) ABSTRACT

A refrigerated carrier device that can maintain biological samples including capillary blood samples at refrigerated temperatures is described herein. The carrier includes an insulated phase change material (PCM) that can be pre-chilled to maintain biological samples at a refrigerated temperature (e.g., 2-8° C.) while the carrier is in transit and/or temporary storage protecting the samples from degradation. The use of PCM enables the temperature to be kept reliably between 2-8° C., avoiding temperature excursions, and eliminating the need for a compressor or thermoelectric device at the point of collection, which can reduce costs and risks related to heat, noise, condensation, and sample degradation due to power outages. The carrier device can be removable from a Sample Preparation system, which enables it to double as refrigerated storage at the point of collection and during transportation.

31 Claims, 17 Drawing Sheets

(58) Field of Classification Search
CPC .......... F25D 2331/8014; A01N 1/0252; A01N 1/0273; A01N 1/0268
See application file for complete search history.

(56) References Cited

U.S. PATENT DOCUMENTS

| | | | |
|---|---|---|---|
| 2,240,101 A | 4/1941 | Smith | |
| 2,722,257 A | 11/1955 | Lockhart | |
| 2,775,350 A | 12/1956 | Jones | |
| 2,896,502 A | 7/1959 | Nordin | |
| 2,912,895 A | 11/1959 | Houston et al. | |
| 3,081,029 A | 3/1963 | Gauslaa | |
| 3,300,051 A | 1/1967 | Mitchell | |
| 3,326,400 A | 6/1967 | Hamelin et al. | |
| 3,419,179 A | 12/1968 | Deuschle et al. | |
| 3,420,107 A | 1/1969 | Rowett et al. | |
| 3,434,859 A | 3/1969 | Benjamin et al. | |
| 3,478,889 A | 11/1969 | Fessler et al. | |
| 3,481,712 A | 12/1969 | Bernstein et al. | |
| 3,508,653 A | 4/1970 | Coleman et al. | |
| 3,525,254 A | 8/1970 | Milanes | |
| 3,539,300 A | 11/1970 | Stone | |
| 3,611,403 A | 10/1971 | Gilford et al. | |
| 3,615,222 A | 10/1971 | Mead | |
| 3,626,929 A | 12/1971 | Sanz et al. | |
| 3,654,925 A | 4/1972 | Holderith | |
| 3,684,455 A | 8/1972 | Vacirca et al. | |
| 3,701,434 A | 10/1972 | Moore | |
| 3,706,305 A | 12/1972 | Berger et al. | |
| 3,706,306 A | 12/1972 | Berger et al. | |
| 3,733,179 A | 5/1973 | Guehler | |
| 3,750,645 A | 8/1973 | Bennett et al. | |
| 3,761,408 A | 9/1973 | Lee | |
| 3,768,979 A | 10/1973 | Mead et al. | |
| 3,780,935 A | 12/1973 | Lukacs et al. | |
| 3,786,985 A | 1/1974 | Blaivas | |
| 3,814,248 A | 6/1974 | Lawhead | |
| 3,818,188 A | 6/1974 | Hertel et al. | |
| 3,849,072 A | 11/1974 | Ayres | |
| 3,852,194 A | 12/1974 | Zine, Jr. | |
| 3,862,042 A | 1/1975 | Ayres | |
| 3,879,295 A | 4/1975 | Glover et al. | |
| 3,920,549 A | 11/1975 | Gigliello et al. | |
| 3,926,521 A | 12/1975 | Ginzel | |
| 3,928,139 A | 12/1975 | Dorn | |
| 3,929,646 A | 12/1975 | Adler | |
| 3,931,010 A | 1/1976 | Ayres et al. | |
| 3,938,953 A | 2/1976 | Paschalis et al. | |
| 3,939,822 A | 2/1976 | Markowitz | |
| 3,942,717 A | 3/1976 | Robison | |
| 3,958,944 A | 5/1976 | Wong | |
| 3,972,812 A | 8/1976 | Gresl | |
| 3,985,649 A | 10/1976 | Eddelman | |
| 3,999,868 A | 12/1976 | Sanz et al. | |
| 4,012,325 A | 3/1977 | Columbus | |
| 4,046,699 A | 9/1977 | Zine, Jr. | |
| 4,050,451 A | 9/1977 | Columbus | |
| 4,052,320 A | 10/1977 | Jakubowicz | |
| 4,055,501 A | 10/1977 | Cornell | |
| D246,800 S | 12/1977 | Wong | |
| 4,081,356 A | 3/1978 | Zierdt | |
| 4,083,788 A | 4/1978 | Ferrara | |
| 4,088,582 A | 5/1978 | Murty et al. | |
| 4,092,113 A | 5/1978 | Hardy et al. | |
| 4,131,512 A | 12/1978 | Dorn | |
| 4,131,549 A | 12/1978 | Ferrara | |
| 4,132,225 A | 1/1979 | Whattam | |
| 4,136,036 A | 1/1979 | Columbus | |
| 4,147,628 A | 4/1979 | Bennett et al. | |
| 4,154,690 A | 5/1979 | Ballies | |
| 4,164,449 A | 8/1979 | Dorn et al. | |
| 4,169,060 A | 9/1979 | Columbus | |
| 4,180,465 A | 12/1979 | Murty | |
| 4,227,620 A | 10/1980 | Conway | |
| 4,235,725 A | 11/1980 | Semersky | |
| 4,257,886 A | 3/1981 | Kessler | |
| 4,294,707 A | 10/1981 | Ikeda et al. | |
| 4,295,974 A | 10/1981 | Cornell | |
| 4,308,232 A | 12/1981 | Crouther et al. | |
| 4,358,425 A | 11/1982 | Finney et al. | |
| 4,369,117 A | 1/1983 | White | |
| 4,417,981 A | 11/1983 | Nugent | |
| 4,425,235 A | 1/1984 | Cornell et al. | |
| 4,426,290 A | 1/1984 | Ichikawa et al. | |
| 4,443,408 A | 4/1984 | Mintz | |
| 4,513,522 A | 4/1985 | Selenke | |
| 4,591,486 A | 5/1986 | Eberle | |
| 4,671,939 A | 6/1987 | Mintz | |
| 4,678,559 A | 7/1987 | Szabados | |
| 4,735,904 A | 4/1988 | Starr | |
| 4,755,356 A | 7/1988 | Robbins et al. | |
| 4,762,798 A | 8/1988 | Deutsch et al. | |
| 4,775,626 A | 10/1988 | Armenta et al. | |
| 4,799,358 A * | 1/1989 | Knopf | A01N 1/02 62/3.62 |
| 4,805,772 A | 2/1989 | Shaw et al. | |
| 4,811,866 A | 3/1989 | Golias | |
| 4,832,678 A | 5/1989 | Sheeran | |
| 4,957,707 A | 9/1990 | Hofelich et al. | |
| 5,019,243 A | 5/1991 | McEwen et al. | |
| 5,030,341 A | 7/1991 | McEwen et al. | |
| 5,090,420 A | 2/1992 | Nielsen | |
| 5,103,651 A * | 4/1992 | Coelho | F25D 3/06 62/457.2 |
| 5,104,533 A | 4/1992 | Szabados | |
| 5,151,184 A | 9/1992 | Ferkany | |
| 5,236,604 A | 8/1993 | Fiehler | |
| 5,275,731 A | 1/1994 | Jahn | |
| 5,290,703 A | 3/1994 | Hsu et al. | |
| 5,316,146 A | 5/1994 | Graff | |
| 5,352,410 A | 10/1994 | Hansen et al. | |
| 5,501,841 A | 3/1996 | Lee et al. | |
| 5,556,544 A | 9/1996 | Didier | |
| 5,614,236 A | 3/1997 | Klang | |
| 5,632,905 A | 5/1997 | Haynes | |
| 5,665,309 A | 9/1997 | Champseix et al. | |
| 5,683,659 A | 11/1997 | Hovatter | |
| 5,830,154 A | 11/1998 | Goldstein et al. | |
| 5,882,318 A | 3/1999 | Boyde | |
| 5,882,943 A | 3/1999 | Aldeen | |
| 5,975,313 A | 11/1999 | Sarstedt | |
| 6,043,878 A | 3/2000 | Gratzl et al. | |
| 6,132,353 A | 10/2000 | Winkelman et al. | |
| 6,171,261 B1 | 1/2001 | Niermann et al. | |
| 6,221,655 B1 | 4/2001 | Fung et al. | |
| 6,234,948 B1 | 5/2001 | Yavilevich | |
| 6,270,728 B1 | 8/2001 | Wijnschenk et al. | |
| 6,296,763 B1 | 10/2001 | Hicks | |
| 6,344,331 B1 | 2/2002 | Ball et al. | |
| 6,471,069 B2 | 10/2002 | Lin et al. | |
| 6,497,325 B1 | 12/2002 | DiCesare et al. | |
| 6,730,071 B1 | 5/2004 | Dassa | |
| 6,793,885 B1 | 9/2004 | Yokoi et al. | |
| 7,176,034 B2 | 2/2007 | Efthimiadis et al. | |
| 7,638,342 B2 | 12/2009 | Samsoondar | |
| 7,736,593 B2 | 6/2010 | Dastane et al. | |
| 8,343,426 B2 | 1/2013 | Song | |
| 8,550,273 B2 | 10/2013 | Levin et al. | |
| 8,632,740 B2 | 1/2014 | Dastane et al. | |
| 8,852,505 B2 | 10/2014 | Dupoteau et al. | |
| 9,251,393 B2 | 2/2016 | Pollack | |
| 9,279,760 B2 | 3/2016 | Imazu et al. | |
| 9,488,563 B2 | 11/2016 | Halverson et al. | |
| 9,604,219 B2 | 3/2017 | Mortillaro et al. | |
| 10,336,539 B2 * | 7/2019 | Caveney | F25D 29/001 |
| 10,870,110 B2 | 12/2020 | Olson | |
| 11,697,114 B2 | 7/2023 | Olson | |
| 2001/0025818 A1 | 10/2001 | Warner | |
| 2002/0040872 A1 | 4/2002 | Bogoev et al. | |
| 2002/0066712 A1 | 6/2002 | Brockwell | |
| 2002/0155619 A1 | 10/2002 | Kurihara et al. | |
| 2003/0091701 A1 | 5/2003 | Yahav | |
| 2003/0209091 A1 | 11/2003 | Fattinger et al. | |
| 2004/0005246 A1 | 1/2004 | Efthimiadis et al. | |

(56) References Cited

U.S. PATENT DOCUMENTS

| | | |
|---|---|---|
| 2004/0059255 A1 | 3/2004 | Manoussakis et al. |
| 2004/0129631 A1 | 7/2004 | Anraku et al. |
| 2005/0014273 A1 | 1/2005 | Dahm et al. |
| 2005/0059163 A1 | 3/2005 | Dastane et al. |
| 2005/0123444 A1 | 6/2005 | Tomasso et al. |
| 2005/0132775 A1 | 6/2005 | Laugharn, Jr. et al. |
| 2006/0009713 A1 | 1/2006 | Flaherty |
| 2006/0142669 A1 | 6/2006 | Morimoto et al. |
| 2006/0168985 A1* | 8/2006 | Gano .............. F25D 3/125 62/457.2 |
| 2007/0020629 A1 | 1/2007 | Ross et al. |
| 2007/0048185 A1 | 3/2007 | Dupoteau et al. |
| 2007/0073187 A1 | 3/2007 | Thomson et al. |
| 2007/0083131 A1 | 4/2007 | Escutia et al. |
| 2007/0110627 A1 | 5/2007 | Nagai et al. |
| 2007/0231834 A1 | 10/2007 | Hale |
| 2008/0003148 A1 | 1/2008 | Dause |
| 2008/0096282 A1 | 4/2008 | Samsoondar |
| 2008/0185349 A1 | 8/2008 | Willliams |
| 2008/0213377 A1 | 9/2008 | Bhatia et al. |
| 2008/0237115 A1 | 10/2008 | Shintani et al. |
| 2008/0286150 A1 | 11/2008 | Pankow |
| 2008/0313877 A1 | 12/2008 | Campbell |
| 2009/0257922 A1 | 10/2009 | Baker |
| 2010/0062415 A1 | 3/2010 | Schwoebel et al. |
| 2010/0111773 A1 | 5/2010 | Pantelidis |
| 2010/0114056 A1 | 5/2010 | Nagai |
| 2010/0261988 A1 | 10/2010 | Tamir |
| 2010/0288060 A1 | 11/2010 | Ronsick et al. |
| 2010/0291619 A1 | 11/2010 | Robinson et al. |
| 2010/0294050 A1 | 11/2010 | Massaro |
| 2010/0297659 A1 | 11/2010 | Yoo |
| 2010/0303688 A1 | 12/2010 | Andersen |
| 2011/0263408 A1 | 10/2011 | Suto et al. |
| 2012/0048002 A1 | 3/2012 | Mallet |
| 2012/0048827 A1 | 3/2012 | Levin |
| 2012/0053041 A1 | 3/2012 | Ihm et al. |
| 2012/0058027 A1 | 3/2012 | Song |
| 2012/0258531 A1 | 10/2012 | Seubert et al. |
| 2013/0045477 A1 | 2/2013 | Harder et al. |
| 2013/0045852 A1 | 2/2013 | Chapman et al. |
| 2013/0125628 A1 | 5/2013 | Kitagawa et al. |
| 2013/0167768 A1 | 7/2013 | Smith et al. |
| 2013/0209985 A1 | 8/2013 | Hoke et al. |
| 2013/0224851 A1 | 8/2013 | Ljungmann et al. |
| 2013/0280130 A1 | 10/2013 | Sarwar et al. |
| 2013/0323711 A1 | 12/2013 | Singh et al. |
| 2014/0065018 A1 | 3/2014 | Imazu et al. |
| 2014/0073990 A1 | 3/2014 | Holmes et al. |
| 2014/0096598 A1 | 4/2014 | Halverson et al. |
| 2014/0105796 A1 | 4/2014 | Nagy |
| 2014/0113278 A1 | 4/2014 | Thomas et al. |
| 2014/0241957 A1 | 8/2014 | Serhan et al. |
| 2014/0255254 A1 | 9/2014 | Yamaguchi et al. |
| 2014/0273242 A1 | 9/2014 | Ochranek et al. |
| 2014/0296089 A1 | 10/2014 | Holmes et al. |
| 2014/0356254 A1 | 12/2014 | Lee et al. |
| 2014/0374480 A1 | 12/2014 | Pollack |
| 2015/0018715 A1 | 1/2015 | Walterspiel |
| 2015/0056716 A1 | 2/2015 | Oyler et al. |
| 2015/0072346 A1 | 3/2015 | Gellibolian et al. |
| 2015/0111299 A1 | 4/2015 | Watabe et al. |
| 2015/0151294 A1 | 6/2015 | Cho et al. |
| 2015/0289856 A1 | 10/2015 | Saqi et al. |
| 2015/0316532 A1 | 11/2015 | Makino et al. |
| 2016/0097049 A1 | 4/2016 | Qian |
| 2016/0271015 A1* | 9/2016 | Wengreen ............ A61J 1/165 |
| 2018/0028102 A1 | 2/2018 | George et al. |
| 2018/0259251 A1 | 9/2018 | Poorte et al. |
| 2018/0326413 A1 | 11/2018 | Walkowiak et al. |
| 2019/0072578 A1 | 3/2019 | Buschke |
| 2019/0145688 A1* | 5/2019 | Tsuno ................ F25D 3/06 62/129 |
| 2019/0320960 A1 | 10/2019 | Olson et al. |
| 2019/0331703 A1 | 10/2019 | Olson et al. |
| 2019/0350808 A1 | 11/2019 | Olson et al. |
| 2020/0150005 A1 | 5/2020 | Slutter et al. |
| 2020/0261308 A1 | 8/2020 | Zhou |
| 2020/0363116 A1* | 11/2020 | Van Bokkelen ........ F25D 29/00 |
| 2021/0015699 A1 | 1/2021 | Zou et al. |
| 2021/0039088 A1 | 2/2021 | Olson |
| 2021/0123936 A1 | 4/2021 | Swanson et al. |
| 2022/0049890 A1* | 2/2022 | Alexander ............ F25D 3/08 |
| 2022/0117778 A1 | 4/2022 | Knotts |
| 2022/0349910 A1 | 11/2022 | Silbert et al. |
| 2023/0074188 A1 | 3/2023 | Luo et al. |
| 2023/0324425 A1 | 10/2023 | Flanagan et al. |
| 2024/0042427 A1 | 2/2024 | Olson |

FOREIGN PATENT DOCUMENTS

| | | |
|---|---|---|
| CN | 1690714 A | 11/2005 |
| CN | 1826530 A | 8/2006 |
| CN | 1856366 A | 11/2006 |
| CN | 1863495 A | 11/2006 |
| CN | 101311700 A | 11/2008 |
| CN | 101312689 A | 11/2008 |
| CN | 101454665 A | 6/2009 |
| CN | 101678931 A | 3/2010 |
| CN | 201454557 U | 5/2010 |
| CN | 102033007 A | 4/2011 |
| CN | 102209896 A | 10/2011 |
| CN | 102764133 A | 11/2012 |
| CN | 102933949 A | 2/2013 |
| CN | 103123317 A | 5/2013 |
| CN | 103308376 A | 9/2013 |
| CN | 103354765 A | 10/2013 |
| CN | 103393427 A | 11/2013 |
| CN | 103608658 A | 2/2014 |
| CN | 103674672 A | 3/2014 |
| CN | 104034672 A | 9/2014 |
| CN | 104107054 A | 10/2014 |
| CN | 203965173 U | 11/2014 |
| CN | 104768516 A | 7/2015 |
| CN | 105600468 A | 5/2016 |
| CN | 108743197 A | 11/2018 |
| CN | 114159058 A | 3/2022 |
| EP | 0494845 A1 | 7/1992 |
| EP | 1005910 A2 | 6/2000 |
| EP | 1161923 A1 | 12/2001 |
| EP | 1542020 A2 | 6/2005 |
| EP | 1884188 A1 | 2/2008 |
| EP | 2726842 A1 | 5/2014 |
| EP | 3603813 A2 | 2/2020 |
| EP | 3888721 A1 | 10/2021 |
| FR | 2582013 A1 | 11/1986 |
| JP | S4851686 A | 7/1973 |
| JP | S4841632 B1 | 12/1973 |
| JP | H03181852 A | 8/1991 |
| JP | H0526883 A | 2/1993 |
| JP | H0821839 A | 1/1996 |
| JP | H09166591 A | 6/1997 |
| JP | H1033507 A | 2/1998 |
| JP | H10243940 A | 9/1998 |
| JP | H10277019 A | 10/1998 |
| JP | H1183864 A | 3/1999 |
| JP | H11318870 A | 11/1999 |
| JP | 2000084389 A | 3/2000 |
| JP | 2001502595 A | 2/2001 |
| JP | 2001264344 A | 9/2001 |
| JP | 2007503580 A | 2/2007 |
| JP | 2007271388 A | 10/2007 |
| JP | 2008506128 A | 2/2008 |
| JP | 2008099991 A | 5/2008 |
| JP | 2008191070 A | 8/2008 |
| JP | 2009507237 A | 2/2009 |
| JP | 2009089759 A | 4/2009 |
| JP | 2012527613 A | 11/2012 |
| JP | 2014048112 A | 3/2014 |
| JP | 2014173904 A | 9/2014 |
| JP | 2015509202 A | 3/2015 |
| WO | WO-8505048 A1 | 11/1985 |
| WO | WO-9839650 A1 | 9/1998 |
| WO | WO-0170403 A1 | 9/2001 |

(56) References Cited

FOREIGN PATENT DOCUMENTS

| WO | WO-2005014173 A1 | 2/2005 |
| WO | WO-2008027319 A2 | 3/2008 |
| WO | WO-2008119947 A1 | 10/2008 |
| WO | WO-2013003308 A1 | 1/2013 |
| WO | WO-2014050021 A1 | 4/2014 |
| WO | WO-2017100798 A1 | 6/2017 |
| WO | WO-2018090023 A1 | 5/2018 |
| WO | WO-2018090027 A1 | 5/2018 |
| WO | WO-2018090030 A2 | 5/2018 |
| WO | WO-2019006349 A1 | 1/2019 |

OTHER PUBLICATIONS

International Search Report for PCT/US2017/061585, dated Jan. 17, 2018, 2 pages.
International Search Report for PCT/US2017/061596, dated Feb. 2, 2018, 3 pages.
International Search Report for PCT/US2017/061592, dated Jan. 29, 2018, 3 pages.
International Search Report and Written Opinion for PCT/US2016/066236, dated Mar. 3, 2017, 7 pages.
Office Action for Japanese Application No. JP2019525902, dated Jan. 20, 2022, 5 pages.
Office Action for Chinese Application No. 201680081591.7, dated Sep. 1, 2020, 20 pages.
Office Action for Chinese Application No. CN20178083377, dated Mar. 4, 2022, 21 pages.
Office Action for Chinese Application No. 202110946196, dated Jun. 22, 2022, 29 pages.
Office Action for Chinese Application No. 20178083377, dated Sep. 1, 2022, 18 pages.
Office Action for Chinese Application No. CN202110946196.3 dated Mar. 7, 2023, 14 pages.
Non-Final Office Action for U.S. Appl. No. 17/818,169 dated Nov. 8, 2023, 28 pages.

\* cited by examiner

REFRIGERATED CARRIER DEVICE FOR BIOLOGICAL SAMPLES

CROSS-REFERENCE TO RELATED APPLICATIONS

This application claims priority to and the benefit of U.S. Provisional Application No. 63/230,406, filed Aug. 6, 2021, entitled "Refrigerated Carrier Device for Biological Samples," which is incorporated by reference herein in its entirety.

TECHNICAL FIELD

The present disclosure relates to refrigerated carrier devices for automatic loading, storing, and transporting biological samples, including capillary blood samples collected and processed in a retail environment.

BACKGROUND

Biological samples including blood samples are routinely collected and analyzed to assess the overall physical well-being of patients. Blood samples can be obtained by venipuncture or by capillary blood sampling methods at a collection site, and then transported to an analysis site (e.g., a technical laboratory) for analysis. Logistics and cost associated with collecting, preparing and transporting blood samples from the collection site to the analysis site can be significant. Blood samples collected at a traditional collection site or at retail collection site (e.g., a collection site different from a technical laboratory, medical facility or hospital) typically require a number of preparation or processing steps such as sorting, labeling, clotting, centrifuging and loading into a carrier device suitable for their transfer to a technical laboratory for analysis. The majority of these processing steps are conducted by a technician, and therefore can be prone to human errors such as incorrect labeling, inadequate mixing with additives, incomplete centrifugation, and/or errors loading the samples into the carrier device, which in some cases can adversely affect or invalidate test results and require collection of a new sample. Additionally, blood samples often need to be refrigerated within a particular temperature range during on-site storage and transit in order to prevent thermally induced sample degradation. Current methods to store blood samples and other biological samples during on-site storage and transit between a collection site and an analysis site often involve the use of thermoelectric refrigerated containers which generate heat, noise, and can be prone to failure due to loss of power. Consequently, there is a need to develop devices and methods that can automate the process of sorting, clotting, and centrifuging blood samples, as well facilitate the automatic loading and refrigeration of blood samples for their transport to an analysis site, overcoming the limitations of currently available devices.

SUMMARY

Devices for atomically loading, storing, and transporting refrigerated biological samples are described herein. In some embodiments, an insulated cap is configured to be coupled to a container and to a sample loading device such that the insulated cap allows the sample loading device to load a sample into a storage compartment of the container. The insulated cap includes an access port extending therethrough, and a gate that is configured to transition between a closed configuration and an open configuration. The gate seals the access port in the closed configuration and unseals the access port in the open configuration, thereby allowing a sample to be transferred through the access port to and into the storage compartment of the container when the insulated cap is coupled to the container.

In some embodiments, an apparatus includes a container that defines a storage compartment with an opening and that is configured to remove heat from the storage compartment, and an insulated cap removably coupled to the container to selectively seal the opening. The insulated cap defines an access port extending therethrough, and a gate configured to transition between a closed configuration in which the gate seals the access port, and an open configuration in which the gate unseals the access port, thereby allowing a sample to be transferred through the access port and into the storage compartment.

In some embodiments, an apparatus includes a container including an inner shell and an outer shell that defines a compartment with an opening. The outer shell surrounds the inner shell and defines an annular region between the inner shell and the outer shell. A phase change material (PCM) is disposed within the annular region and is configured to remove heat from the storage compartment. An insulated cap is removably coupleable to the container to selectively fluidically seal the opening. The insulated cap includes: an access port that extends therethrough and that is fluidically coupleable to the opening when the insulated cap is coupled to the container, and a gate that is configured to transition between a closed configuration in which the gate prevents access to the storage compartment when the insulated cap is coupled to the container, and an open configuration in which the gate allows access to the storage compartment when the insulated cap is coupled to the container In some embodiments, an apparatus comprises a container that defines a storage compartment with an opening, the container configured to remove heat from the storage compartment. The container includes an inner shell that defines the storage compartment; an outer shell disposed adjacent to the inner shell and defining a region between the inner shell and the outer shell; and a phase change material disposed in the region between the inner shell and the outer shell. The container also includes an insulated cap removably coupled to the container to selectively seal the opening; and a sensor disposed in one of the container or the insulated cap, the sensor configured to measure a temperature of the storage compartment.

In some embodiments, an apparatus comprises a container including an inner shell and outer shell, the inner shell defining a storage compartment with an opening, the outer shell being disposed adjacent to the inner shell and defining a region between the inner shell and the outer shell; a phase change material disposed within the region between the inner shell and the outer shell, the phase change material being configured to remove heat from the storage compartment; an insulated cap removably coupled to the container to selectively seal the opening; and a biasing member disposed within the storage compartment, the distributing component configured to direct sample specimen containers into the storage compartment.

DETAILED DESCRIPTION

Figure 1A:
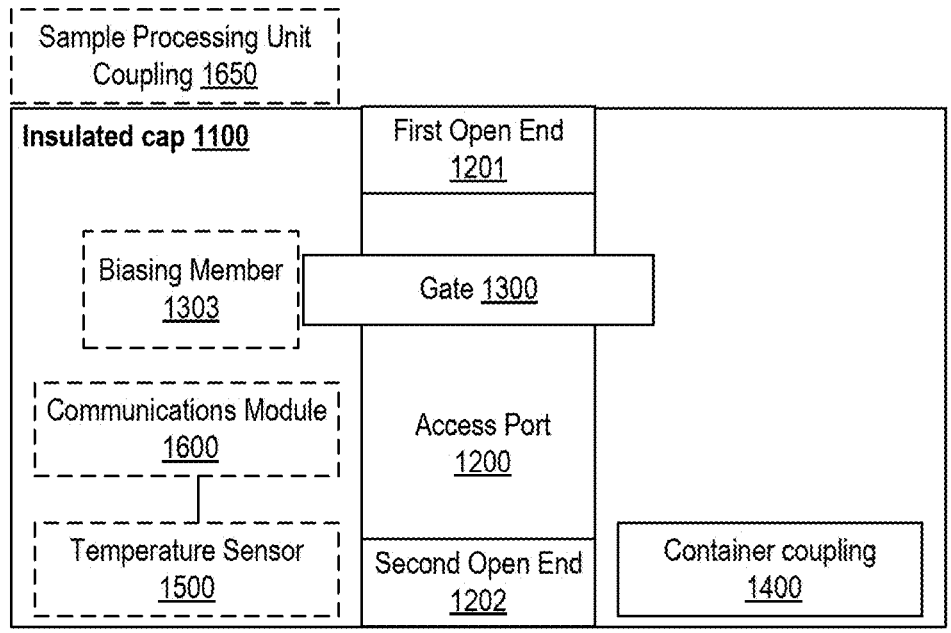
FIGS. 1A and 1B are a schematic illustration of an insulated cap in a closed configuration and an open configuration, respectively, according to an embodiment.

The embodiments described herein related generally to refrigerated carrier devices, and more particularly to insulated devices that can facilitate automated sample loading and include phase change material(s) (PCM) that cool biological samples including capillary blood samples, preserving the integrity of the samples during storage and transport.

The ability to keep biological samples, particularly those obtained from human patients for diagnostic purposes such as blood samples, stable from the time of collection to the time of analysis can have a significant impact on whether the samples can be successfully analyzed. Blood samples are often subject to several processing steps performed by a technician immediately after being drawn from a patient. Collecting blood samples for use in clinical diagnostics is complex. Typically, medical professionals and/or technicians need to complete a number of steps to prepare and stabilize a sample specimen until they are transferred to a laboratory for analysis. For example, blood samples need to be labeled to identify all pertinent information such as patient identification, date and time of sample collection, volume of sample required, and type of blood analysis required. Blood samples also need to be mixed with adequate amounts of chemical additives such as anticoagulants, preservatives, and clot activators (e.g., Ethylenediaminetetraacetic acid (EDTA) heparin, potassium oxalate and/or trisodium citrate) and centrifuged to separate blood components. In some instances, sample preparation includes manually inverting sample containers a specific number of times in order to mix the blood with the specific chemical additive or reagent. The requirements for inversion of the tubes can vary significantly and can cause confusion and lead to mistakes.

The preparation of blood samples can also involve waiting specific amounts of time for certain processes to take place. For example, some sample preparation methods require waiting for serum tubes to clot prior to centrifugation. The technician conducting the sample preparation can become impatient and centrifuge too early, or may become distracted and centrifuge too late, causing inadequate latent fibrin formation that may lead to medical diagnostic errors. Sample preparation may also require sorting tubes. Tubes may be sorted in different containers depending on the type of tube or depending on the laboratory to which they will be sent. Moreover, in some instances, different tubes require specific heat treatments (e.g., storing at room temperature after collection, refrigerated, and/or frozen). In other instances, adding inadequate amounts of blood sample to a sample tube containing an anticoagulant (common sample preparation tests require a 9:1 blood to anticoagulant ratio) can cause increased clotting times which can lead to inaccurate results. This type of error can be more pronounced and difficult to avoid when processing small sample volumes. Excessive agitation or vigorous shaking can also lead to erroneous analysis results due to induced hemolysis and/or platelet clumping. Cross-contamination of samples during processing can also lead to inaccurate results by introducing undesired chemicals and/or pathogens in the sample.

The sample preparation and/or processing steps described above can be subject to multiple human errors that may render the analysis invalid or undetermined and can cause significant costs. Healthcare providers are required to use written procedures and formal employee trainings to reduce the likelihood and impact of sample preparation errors described above. In some cases, the complexity of the procedures requires that the personnel collecting and processing g the blood sample undergo formal phlebotomy training and/or licensing. Other strategies to mitigate the potential for errors include use of visual aids to remind technicians how to handle each sample tube type, using poster size flow charts, color coded samples and/or labels, and custom information systems designed to remind the technician how to prepare each blood sample specimen, and use of timers to measure required time intervals for each individual steps in the case of time sensitive sample preparation methods. All this complexity leads to elevated costs and higher risk for errors.

In addition to the processing steps described above, biological samples can degrade rapidly at room temperature and must generally be stored at low temperatures to preserve the integrity of the sample. This problem is particularly complex when specimens are collected at a location distant from the laboratory where the analysis is conducted, especially if there is limited access to refrigerator equipment (e.g., compressor-based or thermoelectric refrigerators) and/or reliable electric power. Moreover, in some instances the volume of sample available for analysis can be considerably small, for example, in the case of blood samples obtained from pediatric patients, or in the case of capillary blood samples obtained from a puncture on a finger, heel or earlobe of a patient. These small volume samples can be significantly more sensitive to temperature fluctuations due to their low mass, which requires a more stringent control of temperature during storage and transport. These small volume samples, when compared to larger volume samples, also present less tolerance for waste. Conventional methods to transport blood samples include use of compressor-based refrigerators and/or thermoelectric refrigerators that require uninterrupted power supply, generate heat and noise, and are prone to condensation problems. These disadvantages can translate in elevated costs, complex logistics and potentially high risks of sample degradation due to power outages. Additionally, blood samples, particularly capillary blood samples can be degraded due to temperature excursions due to currier transfers between point of collection and point of analysis.

Systems and devices described herein address the limitations of existing technologies by providing a pre-chilled refrigerated carrier device that (i) uses a (PCM) that can hold, keep, and/or maintain biological samples such as capillary blood samples refrigerated for a period of time sufficient for storage and currier transfer from a point of collection and a point of analysis and (ii) can be coupled to and/or interact with an automated sample preparation or processing system (e.g., a system that automates the sample processing steps such as sorting, clotting, centrifuging and refrigerating), facilitating automatic loading of the samples into a storage compartment on the refrigerated carrier (e.g., loading samples without the need of direct human intervention) avoiding exposure of the samples to ambient temperature. The refrigerated carrier device can include a container with an outer shell, an inner shell, and a PCM. The outer shell can an interior space and/or volume for accommodating the inner shell, and a thermal barrier that limits and/or significantly reduces heat transfer from the external environment surrounding the refrigerated carrier device to the interior space and/or volume defined by the outer shell (e.g., the outer shell is configured to be thermally insulated). In some implementations, the outer shell can be made of one or more layers of thermally insulating materials (e.g., materials having a low thermal conductivity coefficient) stacked together to form and/or provide a continuous barrier that reduces and/or minimizes the rate of heat transfer between one or more exterior surfaces of the outer shell (e.g., the surfaces disposed outside the outer shell and exposed to air and/or other environments surrounding the refrigerated device) and one or more areas disposed inside the outer shell. In some implementations, the outer shell can include a first layer and a second layer made of thermally insulating materials and/or materials that exhibit sufficient mechanical strength such as such as stainless steel, with the second layer being disposed inside the first layer and separated or spaced from the first layer to define a volume or chamber therebetween. The chamber can be used to draw vacuum and thus form a thermal barrier that reduces and/or restricts heat transfer between the environment surrounding the exterior of the refrigerated carrier and the interior of the outer shell, as further described herein.

The inner shell can occupy a fraction of the interior space of the outer shell and define an annular region located inside the outer shell and outside the inner shell (i.e., between the inner shell and outer shell, in which a PCM can be accommodated. The inner shell can be made of a thermally conductive material and can be define a storage compartment for storing biological samples. The PCM can be disposed in the annular region generated between the outer shell and the inner shell, surrounding the inner shell. The storage compartment can accommodate sample specimen containers and keep them refrigerated by removing heat from the sample specimen containers, through the thermally conductive inner shell, and to the PCM surrounding the inner shell. The use of PCM refrigerated carries enables the temperature of the sample to be kept reliably between about 2° C. and about 8° C. to avoid temperature excursions. Furthermore, the integration with an automated sample preparation or processing system that automates the process of sorting, clotting, centrifuging, refrigerating and/or loading samples into the refrigerated carries for transfer ensures higher levels of quality control, eliminates potential errors caused by a technician, and circumvents the need to expose samples to room temperature during sample preparation and/or transfer between storage refrigerators and currier transfer devices.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

In some embodiments, an insulated cap is configured to be coupled to a container and to a sample loading device. The sample loading device can load a sample into a storage computing of the container via the insulated cap. The insulated cap includes an access port that extends through the insulated cap, and a gate that is configured to transition between a closed configuration in which the gate seals the access port, and an open configuration in which the gate unseals the access port, thereby allowing a sample to be transferred through the access port and into the storage compartment of the container when the insulated cap is coupled to the container.

In some embodiments, an apparatus includes a container that defines a storage compartment with an opening. The container is configured to remove heat from the storage compartment. The apparatus further includes an insulated cap that is removably coupled to the container to selectively seal the opening. The insulated cap defines an access port that extends therethrough, and a gate that is configured to transition between a closed configuration in which the gate seals the access port, and an open configuration in which the gate unseals the access port, thereby allowing a sample to be transferred through the access portion and into the storage compartment.

In some embodiments, an apparatus includes a container that includes an inner shell and an outer shell. The inner shell defines a storage compartment with an opening. The outer shell surrounds the inner shell and defines an annular region between the inner shell and the outer shell. The apparatus further includes a phase change material (PCM) disposed within the annular region and configured to remove heat from the storage compartment. The apparatus further includes an insulated cap that is removably coupleable to the container to selectively fluidically seal the opening. The insulated cap includes an access port extending therethough and fluidically coupleable to the opening when the insulated cap is coupled to the container. The insulated cap further includes a gate that is configured to transition between a closed configuration in which the gate prevents access to the storage compartment when the insulated cap is coupled to the container, and an open configuration in which the gate allows access to the storage compartment when the insulated cap is coupled to the container.

Figure 1B:
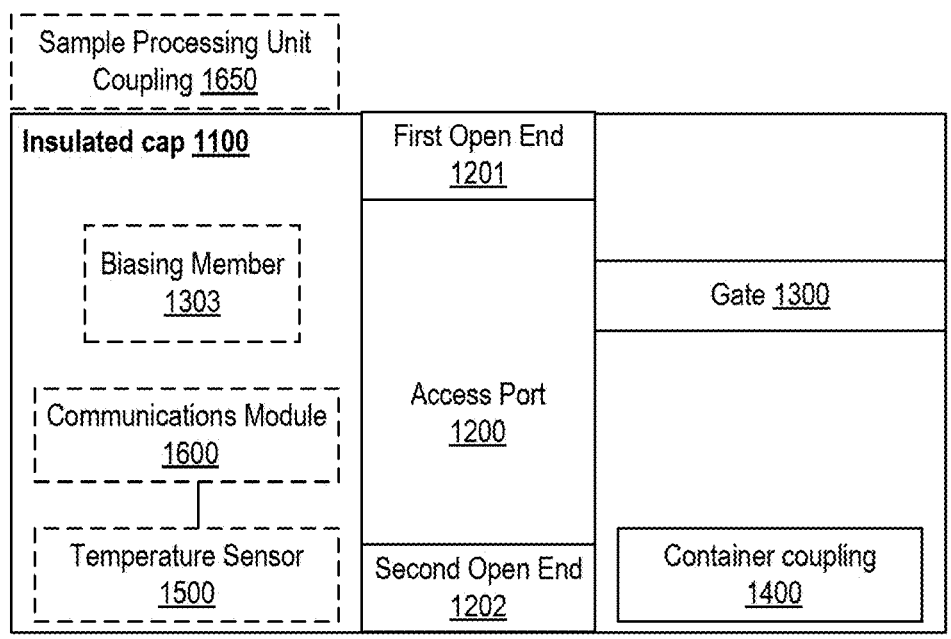
Figure 2:
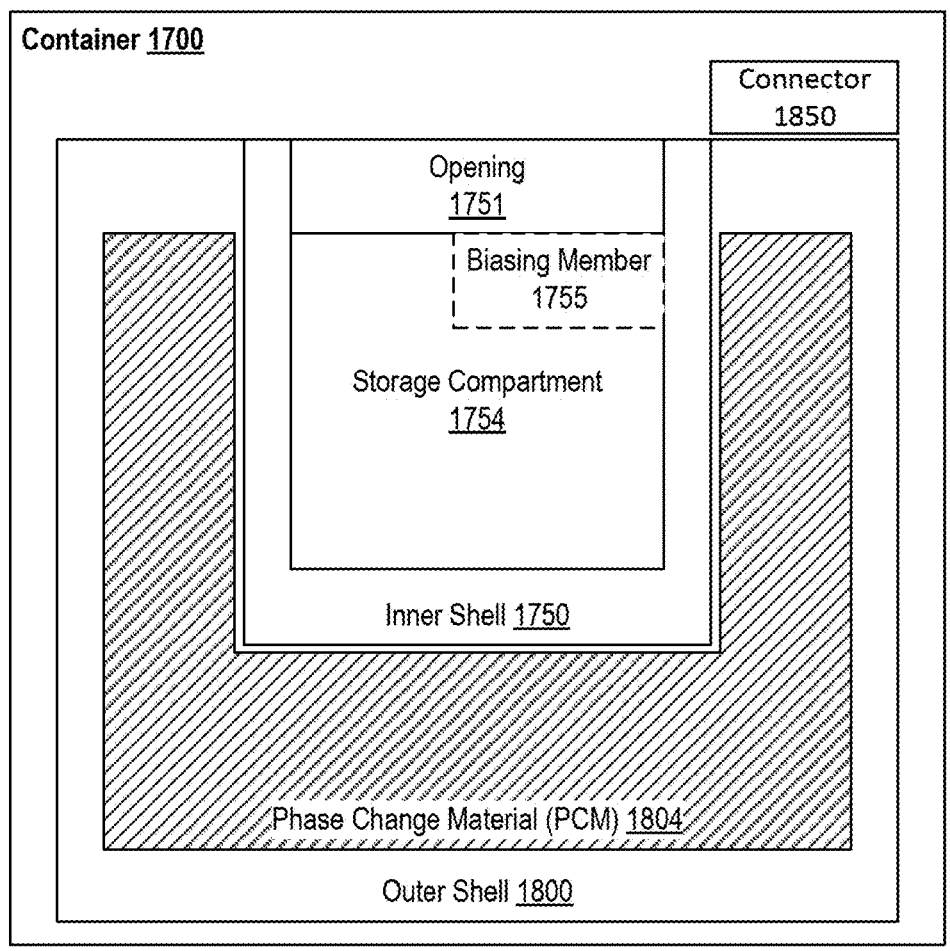
FIG. 2 is a schematic illustration of a container configured to be coupled to the insulated cap of FIGS. 1A-1B, to form a refrigerated carrier.
Figure 3:
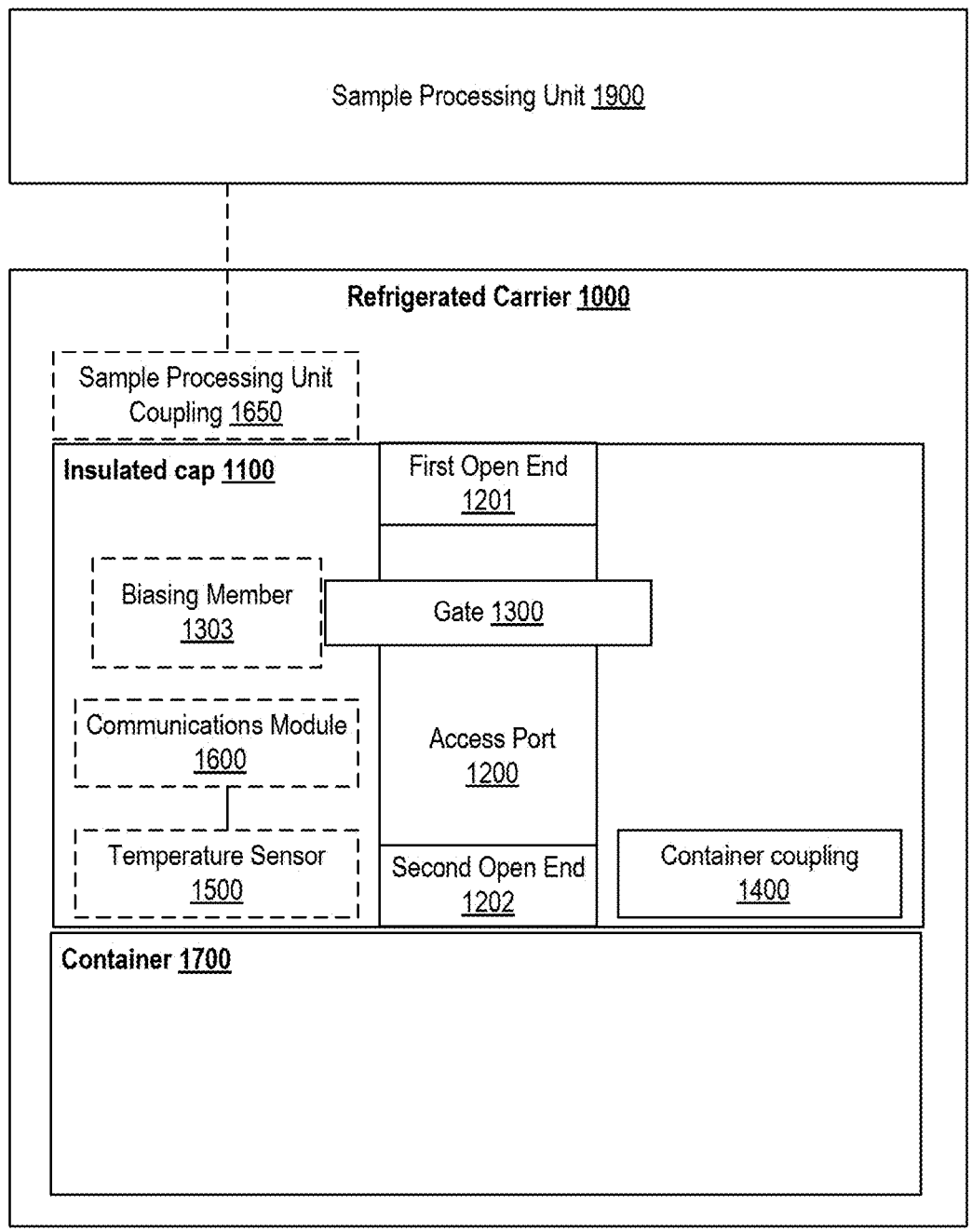
FIG. 3 is a schematic illustration of a refrigerated carrier, including an assembly of the insulated cap of FIGS. 1A-1B and the container of FIG. 2.

FIGS. 1-3 show a schematic illustration of an insulated cap 1100, a container 1700, and a refrigerated carrier 1000, respectively, according to an embodiment. As shown in FIGS. 1A and 1B, the insulated cap 1100 includes an access port 1200, a gate 1300, and a container coupling 1400. The insulated cap 1100 can be transitioned from a closed configuration in which the gate 1300 obstructs the access port 1200 (shown in FIG. 1A) to an open configuration in which the gate 1300 unobstructs or opens the access port 1200 (shown in FIG. 1B), as further described herein. Optionally, the insulated cap 1100 can include a temperature sensor 1500, a communications module 1600, and a sample processing unit coupling 1650. The insulated cap 1100 is configured to be coupled to the container 1700 (as shown in FIG. 2) (e.g., via the container coupling 1400) to selectively seal the opening of the container 1700 and collectively form the refrigerated carrier 1000, as shown in FIG. 3. The insulated cap 1100 is configured to be coupled to the container 1700 (collectively forming the refrigerated carrier 1000), and to a sample processing unit 1900 (via the sample processing unit 1650) to allow and/or facilitate transferring of samples and/or sample specimen containers storing biological material such as capillary blood samples, directly (without exposure to ambient conditions outside the sample processing unit 1900) and automatically (without direct human intervention) from the sample processing unit 1900 into a storage compartment of the refrigerated carrier 1000, as further described herein. In some implementations, the temperature sensor 1500 can be configured to measure a temperature of at least a portion (e.g., a storage compartment of the container 1700) of the container 1700 when the insulated cap 1100 is coupled to the container 1700. In some implementations, the communications module 1600 can be operatively coupled to the temperature sensor 1500 and configured to read the temperature measured by the temperature sensor 1500 and send a signal representative of the measured temperature to an external device and/or network, as further described herein.

In some embodiments, the sample specimen containers described herein can be similar in form and/or function to the specimen containers described in U.S. Pat. No. 10,870,110 entitled, "Specimen Container and Centrifugation Method for Separating Serum or Plasma From Whole Blood Therewith," filed Oct. 28, 2020 ("the '110 patent"), the disclosure of which is incorporated herein by reference in its entirety.

In some embodiments, the sample preparation units described herein can be similar in form and/or function to the sample preparation units described in U.S. Patent publication No. US 2019/0331703, entitled "Sample Preparation Device," filed May 14, 2019, the disclosure of which is incorporated herein by reference in its entirety.

The insulated cap 1100 can define one or more areas (e.g., compartments and/or chambers) for accommodating (e.g., housing, containing, supporting, etc.) one or more components, while providing one or more interfaces that enable such components to be coupled to external components and/or other devices, as further described herein. The insulated cap 1100 can be any suitable shape, form and/or configuration for housing and/or supporting the one or more components. In some embodiments, the insulated cap 1100 can be a three-dimensional shape having a length and any suitable cross-sectional area including for example, circular, oval, square, rectangular, and/or other polygonal cross-sectional area. In some embodiments, the insulated cap 1100 can include multiple portions that can be coupled and/or assembled together to form one or more chambers for receiving the components of the insulated cap 1100. That is, in some embodiments, the insulated cap 1100 can be modular. Alternatively, in other embodiments, the insulated cap 1100 can be made of a monolithic structure.

The insulated cap 1100 can include any suitable structure and/or component configured to provide a resealable thermally insulated closure for the opening of the container 1700 when the insulated cap 1100 is coupled to the container 1700. For example, in some implementations the insulated cap 1100 includes an insulation block (not shown). The insulation block can be formed of any suitable insulating material or insulating structure configured to enhance and/or improve the thermal insulating properties of the insulated cap 1100. That is, the insulation block can be configured to reduce the rate of heat transfer between the one or more surfaces of the insulated cap 1100 that are in contact with, or adjacent to the opening of the container 1700, when the container 1700 is coupled to the insulated cap 1100. In other words, the insulation block may be configured to function as a thermal barrier to heat transfer when the insulated cap 1100 is coupled to the container 1700, between the interior and the exterior of the insulated container 1700 via the opening of the container 1700.

The insulation block can incorporate any suitable material and/or structure configured to reduce heat transfer. For example, the insulation block may include one or more materials that have inherently low heat transfer characteristics including polyurethanes, polyisocyanurates, polyesters, polystyrene, polyethylene, polypropylene, cellulose, fiberglass and others. In some implementations, the insulation block can include materials having low heat transfer characteristics as well as suitable mechanical properties, such as being easy to form and/or machine. For example, in some implementations the insulation block can include thermosetting or thermoplastics polymers and polymer formulations. The insulation block can also be formed or shaped into a structure that itself provides additional thermal insulating properties. For example, in some implementations the insulation block can be shaped as an open cell foam, a closed cell foam or combination thereof. The foam provides a plurality of internal voids and/or volumes filled with low heat transfer coefficient air, which reduces the thermal conductivity of the insulation block. Moreover, in some instances, the internal voids and/or volumes can be filed with a gas such as nitrogen, carbon dioxide, and/or argon among others. Alternatively, in some implementations, the internal voids can be evacuated (e.g., under vacuum) to enhance the thermal insulating properties of the insulation cap 1100. In some implementations, the internal voids and/or volumes can be arranged and/or organized forming any suitable configuration. For example, the voids can specific geometries such as spherical, cylindrical, hexagonal, cubical, ellipsoidal, and the like.

In some implementations, the insulated cap 1100 includes a cover (not shown) removably coupled to the insulated cap 1100. The cover can be configured to provide access to the interior space and/or volume of the insulated cap 1100, facilitating introducing and/or removing one or more components of the insulated cap 1100. For example, in some implementations, the cover can be decoupled from the insulated cap 1100 to introduce and/or remove the insulation block, the optional temperature sensor 1500 and/or the optional communications module 1600. The cover can be coupled to the insulation cap 1100 via bolts, nuts, fasteners, screws, rivets, anchors or any other coupling methods. The cover can be made of any suitable materials having sufficient structural strength and rigidity, including, for example, metal, glass, ceramic, and/or polymers. In some implementations, the cover can be made of one or more insulated materials including those described above with respect to the insulation block. In some implementations, the cover can be configured to house, accommodate, and/or provide support to other components of the insulated cap 1100. For example, in some implementations, the cover can include and/or incorporate one or more surfaces that may be inscribed or engraved to provide an aesthetic, instructional, and/or functional interface for a user of the insulated container. In some implementations the cover can also provide structural support to the sample processing unit coupling 1650 configured to attach and/or detach the insulated cap 1100 and the container 1700 coupled to the insulated cap 1100 to a sample processing unit 1900, as further described herein.

The access port 1200 can be an opening, aperture, and/or a passage that defines a channel, duct, and/or corridor configured to convey, transfer and/or transport samples, and/or sample specimen containers through the insulated cap 1100. As shown in FIGS. 1A and 1B, the access port 1200 defines a channel that extends through the insulated cap 1100 from a first surface of the insulated cap 1100 adjacent to the sample processing unit coupling 1650 (e.g., the exterior side or face of the insulated cap 1100) to a second surface of the insulated cap 1100 adjacent to the container coupling 1400 and the temperature sensor 1500 (e.g., the interior side or face of the insulated cap 1100). The access port 1200 defines a channel including a first open end 1201, a second open end 1202, and one or more lateral walls extending therebetween. The first open end 1201 can be located on the exterior side or face of the insulated cap 1100 and can be sized and configured to facilitate admitting or loading sample specimen containers storing biological material such as capillary blood samples from a sampling processing unit 1900 into the access port 1200. The second open end 1202 can be located on the interior side or face of the insulated cap 1100 and can be sized and configured to facilitate withdrawing, transferring and/or unloading sample specimen containers from the access port 1200 to the container 1700. The one or more lateral walls can extend from the first open end 1201 to the second open end 1202 and can define the channel configured to convey the sample specimen containers.

The access port 1200 can have any suitable cross-sectional shape including for example, circular, oval, square, rectangular, and/or other polygonal cross-sectional shape. In some implementations, the access port 1200 can include a single channel. Alternatively, in some implementations, the access port 1200 can include multiple channels, with, e.g., each channel being parallel to the other channels. In some implementations the access port 1200 can include a single channel having a cross-sectional area smaller than the cross sectional area of an opening of a storage compartment included in the container 1700, such that when the access port 1200 is used to transfer sample specimen containers through the insulated cap 1100 and into the storage compartment of the container 1700, excess heat from the exterior environment surrounding the insulated cap 1100 is prevented from entering the storage compartment of the container 1700. Said in other words, the first open end 1201 and the second open end 1202 of the access port 1200 have cross-sectional areas smaller than the cross-sectional area of the opening 1751 (shown in FIG. 2) to minimize heat transfer from the surroundings into the container 1700 when the container 1700 is used to store sample specimen containers. For example, in some implementations, the ratio R of the cross-sectional area of the opening 1751 to the cross-sectional area of the first open end 1201 and/or the second open end 1202 (e.g., R=cross-sectional area 1751/cross sectional area 1201 or 1202) is equal to no more than about 5.0, no more than about 4.5, no more than about 4.0, no more than about 3.5, no more than about 3.0, no more than about, 2.5, no more than about 2.0, no more than about 1.75, inclusive of all values and ranges therebetween. In some implementations, the ratio R of the cross-sectional area of the opening 1751 to the cross-sectional area of the first open end 1201 and/or the second open end 1202 (e.g., R=cross-sectional area 1751/cross sectional area 1201 or 1202) is equal to at least about 1.75, at least about 2.0, at least about 2.5, at least about 3.0, at least about 3.5, at least about 4.0, at least about 4.5, at least about 5.0, inclusive of all values and ranges therebetween. Combinations of the above referenced ratios R for the cross-sectional area of the opening 1761 to the cross-sectional area of the first open end 1201 and/or the second open end 1202 are also possible (e.g., a ratio R of at least about 1.75 to no more than about 3.6, at least about 2.9 to no more than about 5.0).

In some implementations, the access port 1200 can include multiple channels having a collective cross-sectional area (e.g., the cross sectional area resulting from adding the individual cross-sectional areas of all the channels included in the access port 1200) smaller than the cross sectional area of the opening of a storage compartment included in the container 1700, such that when the access port 1200 is used to transfer sample specimen containers through the insulated cap 1100 and into the storage compartment of the container 1700, excess heat from the exterior environment surrounding the insulated cap 1100 is prevented from entering the storage compartment of the container 1700. To remove the specimen containers, as described elsewhere in more detail, the insulated cap 1100 can be decoupled from the container 1700, facilitating quick and easy removal of specimen containers and/or other materials, e.g., compared to their removal through the access port 1200 of the insulated cap 1100. In some implementations, the access port 1200 can include multiple portions that can be coupled and/or assembled together to form the access port 1200. That is, in such implementations, the access port 1200 can be modular. In other implementations, the access port 1200 can be made of a monolithic structure. For example, in such implementations, the access port 1200 can be a modular structure made by carving and/or etching portions of a channel or passage on multiple slabs of suitable materials such that the slabs can be coupled together and collectively form and/or define the access port 1200. In some implementations, the access port 1200 can be a monolithic structure made by carving and/or etching a channel or passage on a slab of a suitable material, which can then be disposed on the insulated cap 1100. In some implementations, the access port 1200 can include a first open end 1201 carved and/or etched on the cover of the insulated cap 1100, and a second open end 1202 and a lateral wall fabricated by carving and/or etching a portion of the insulation block of the insulated cap 1100. The access port 1200 can be made of any suitable material, having sufficient structural strength and rigidity, including, for example, metal, glass, ceramic, and/or polymers. In some implementations, the access port 1200 can be made of one or more insulated materials including those described above with respect to the insulation block. For example, the access port 1200 can be made of one or more materials that have inherently low heat transfer characteristics including polyurethanes, polyisocyanurates, polyesters, polystyrene, polyethylene, polypropylene, cellulose, fiberglass and others. In some implementations, the access port 1200 can be made of materials having low heat transfer characteristics as well as suitable mechanical properties, such as being easy to form and/or machine. For example, in implementations, the access port 1200 can be made of thermosetting or thermoplastics polymers and polymer formulations.

The gate 1300 can be one or more structures and/or components configured to transition between a closed configuration (shown in FIG. 1A) in which the gate 1300 obstructs the access port 1200 and seals and/or prevents access to a storage compartment 1754 (as described in further detail with respect to FIGS. 2 and 3) of a container 1700, when the container 1700 is coupled to the insulated cap 1100, and an open configuration (shown in FIG. 1B) in which the gate 1300 unobstructs or opens the access port 1200 and unseals and/or allows access to the storage compartment of the container 1700. The gate 1300 can be any suitable shape, form and/or configuration. For example, in some implementations, the gate 1300 can include a plate, panel, lid and/or cover that can be configured to be removably, rotatably, slidably, etc., disposed across the access port 1200 such that the gate 1300 can block, obstruct and/or seal the channel defined by the access port 1200. More specifically, the gate 1300 can be in the closed configuration when for example the plate is disposed across the access port 1200 between the first open end 1201 and the second open end 1202 of the access port 1200 orientated perpendicular to the path defined by the access port 1200, such that the plate substantially blocks, obstructs and/or seals the channel defined by the access port 1200 preventing sample specimen containers storing biological material to be transferred from a sampling processing unit 1900 through the insulated cap 1100 and into a container 1700, and preventing such specimen containers from experiencing undesirable temperatures or temperature fluctuations during storage and transfer of the container 1700. The gate 1300 can be transitioned from the closed configuration to the open configuration by removing the plate from the access port 1200 between the first open end 1201 and the second open end 1202 thus rendering the channel defined by the access port 1200 unobstructed, which allows and/or facilitates transferring sample specimen containers storing biological material such as capillary blood samples from the sample processing unit 1900, through the insulated cap 1100 and into the container 1700. Alternatively, the gate 1300 can be transitioned from the closed configuration to the open configuration by changing the orientation of the plate (e.g., rotating the plate) from the orientation perpendicular to the path defined by the access port 1200 to an orientation parallel to the path defined by the access port 1200. For example, in some implementations, the gate 1300 can be rotatably coupled (e.g., via a hinge) such that it can be transitioned between its closed/open configurations about the point at which it is rotatably coupled to the cap 1100.

The gate 1300 can have any three-dimensional shapes characterized by a length or depth and a suitable cross-sectional area including for example, circular, oval, square, rectangular, and/or other polygonal cross-sectional area. For example, in some implementations, the gate 1300 can include a rectangularly shaped plate, panel, lid, and/or cover configured to be removably disposed on the access port 1200 oriented perpendicular to the channel defined by the access port 1200, as described above. In some implementations, the gate 1300 can include a circular shaped plate, an elliptical shape, a trapezoidal shape, or any other suitable shape. The gate 1300 can be made of any suitable material, having sufficient structural strength and rigidity, including, for example, metal, glass, ceramic, and/or polymers. In some embodiments, the gate 1300 can be made of one or more insulated materials including those described above with respect to the insulation block 1102 and/or the access port 1200. For example, the gate 1300 can be made of one or more materials that have inherently low heat transfer characteristics including polyurethanes, polyisocyanurates, polyesters, polystyrene, polyethylene, polypropylene, cellulose, fiberglass and others. In some implementations, the gate 1300 can be made of materials having low heat transfer characteristics as well as suitable mechanical properties, such as being easy to form and/or machine. For example, in some implementations the gate 1300 can be made of thermosetting or thermoplastics polymers and polymer formulations.

In some implementations, the gate 1300 can include one or more suitable structures and/or components configured to assist and/or facilitate the gate 1300 transitioning between its open and closed configurations. For example, in some implementations, the gate 1300 can include a set of tracks, rails and/or pathways that provide a low friction surface suitable for moving at least a portion of the gate 1300, allowing the gate 1300 to transition from its closed configuration (shown in FIG. 1A) in which the gate 1300 obstructs and/or seals the channel defined by the access port 1200 and the open configuration (shown in FIG. 1B) in which the gate 1300 does not obstruct (or at least does not obstruct enough) the channel so that sample specimen containers can be deposited through the access port 2200. In some implementations, the set of tracks can provide a pathway for guiding the translational movement of or more components of the gate 1300 from a first position in which the gate 1300 is in the closed configuration to a second position in which the gate 1300 is in the open configuration.

In some implementations, the set of tracks can include multiple portions that can be coupled and/or assembled together to form the set of tracks. That is, in some implementations, the set of tracks can be modular. In some implementations, the set of tracks can be made of a monolithic structure. In some implementations, the set of tracks can be mechanically supported on one or more components of the insulated cap 1100. For example, in some implementations the set of tracks can be disposed on at least a portion of the insulation block such that the insulation block provides the rigidity and structural support required for the set of tracks to facilitate sliding the gate 1300 from the closed configuration to the open configuration. In some implementations, the set of tracks can be disposed on at least a portion of the cover of the insulated cap 1100 as further described herein The tracks can be made of or include any suitable material having surface texture and and/or surface material properties providing low surface friction for sliding and/or moving the one or more components of the gate 1300 front the closed configuration to the open configuration. For example, in some embodiments, the track can be made of, or include a coating of Polytetrafluoroethylene (PTFE), Polyetheretherketone (PEEK), Polyphenylensulfide (PPS), Nylon, Acetal Polyoxymethylene (POM), Polyethylene terephthalate (PET), Molybdenum Disulfide, Tungsten Disulfide, and others.

In some implementations, the gate 1300 can include an engagement member (not shown) that can be engaged to transition the gate 1300 from the closed configuration to the open configuration. The engagement member can include one or suitable structures and/or components configured to change the position and/or the orientation of one or more components of the gate 1300 effectively transitioning the gate 1300 from the closed configuration to the open configuration. For example, in some implementations the engagement member can include a tab, a flap, a handle or the like configured to be engaged manually by a user to transition the gate 1300 from the closed configuration to the open configuration. In some implementations, the engagement member can include a mechanical structure such as a joint, a shaft, a gear, and/or pulley configured to be engaged by an electrical motor, a piezoelectric actuator, or the like to change the position and/or orientation of the one or more components of the gate 1300, transitioning the gate 1300 from the closed configuration to the open configuration. In some implementations, the engagement member can be configured to be engaged by an adapter (not shown) of a sample processing unit 1900 with the purpose of transitioning the gate 1300 from the closed configuration to the open configuration to allow transferring and/or loading sample specimen containers storing biological material from the sample processing unit 1900 to the container 1700 coupled to the insulated cap 1100.

In some implementations, the gate 1300 can also include a biasing member 1303 configured to bias the gate 1300 into its closed configuration. The biasing member 1303 can be configured to resist movement of the gate 1300 when engaged (e.g., by a user, an electric motor, a piezoelectric actuator, a hydraulic mechanism or the like) to transition the gate 1300 from the closed configuration to the open configuration. In other words, the biasing member 1303 can be any suitable structure and/or component configured to exert a restitution force that opposes the force or forces exerted on the gate 1300 (via the engagement member) to transition the gate 1300 from the closed configuration to the open configuration. For example, in some implementations, the biasing member 1303 can include one or more springs or coils coupled to the gate 1300 such that when the gate 1300 is in the closed configuration, the springs or coils remain in the thermodynamic equilibrium position (e.g., the position that minimizes the potential and kinetic energy of the spring or coil). When the gate 1300 is engaged via the engagement member to transition from the closed configuration to the open configuration, the biasing member 1303 can exert one or more forces on the gate 1300 that oppose the forces exerted on the gate 1300 via the engagement member. In some instances, the magnitude of the one or more forces exerted by the biasing member 1303 exceed the magnitude of the force exerted via the engagement member. In such instances, the gate 1300 will remain in the closed configuration. Alternatively, in other instances the magnitude of the one or more forces exerted by the biasing member are less than the magnitude of the force exerted via the engagement member. In those instances, the gate 1300 can be transitioned from the closed configuration to the open configuration.

In some implementations, the biasing member 1303 can include one or more magnets coupled to the gate 1300 and configured to exert a magnetic force suitable to resist movement of the gate 1300 when engaged (e.g., by a user, an electric motor, a piezoelectric actuator, a hydraulic mechanism or the like) to transition the gate 1300 from the closed configuration to the open configuration. In some instances, the magnitude of the force exerted by the magnet of the biasing member 1303 can exceed the magnitude of a force exerted on the gate 1300 via the engagement member to transition the gate 1300 from the closed configuration to the open configuration. In such instances, the gate 1300 will remain in the closed configuration. In other instances, the magnitude of the force exerted on the gate 1300 via the engagement member exceeds the magnitude of the force exerted by the magnet of the biasing member 1303. In those instances, the gate 1300 will transition from the closed configuration to the open configuration, facilitating loading and/or transferring samples through the insulated cap 1100 to a container 1700.

The container coupling 1400 can be any suitable mechanism by which the insulated cap 1100 can be secured to an open end of the container 1700 such that the insulated cap 1100 and the container 1700 collectively form a refrigerated carrier 1000, as shown in FIG. 3. The container coupling 1400 can include any mechanism capable of creating a removable, thermally insulated and airtight seal between the insulated cap 1100 and the container 1700. The mechanism of the container coupling 1400 can be configured to prevent and/or avoid leaks of fluids including liquids and/or gases such as air when the refrigerated carrier 1000 is oriented in any direction. Similarly, the mechanism of the container coupling 1400 can be configured minimize heat losses from the interior of the refrigerated carrier 1000 and the exterior environment (e.g., air at ambient conditions) surrounding the refrigerated carrier 1000. That is, the mechanism of the container coupling 1400 can be configured to reduce the rate of heat transfer between the interior side or face of the insulated cap 1100, which is in contact with (and can be thermally equilibrated with) a storage compartment disposed on the container 1700, and the exterior surfaces of the refrigerated carrier 1000 exposed to air at ambient conditions. In some implementations, the container coupling 1400 can include an engineering fit, interreference fit, press fit and/or friction fit. For example, in some implementations, the container coupling 1400 can include an interference fit that can secure the insulated cap 1100 to the container 1700 by friction, after an open end of the container 1700 and the insulated cap 1100 are pushed together. In some implementations, the container coupling 1400 can include a threaded end or threaded portion that can be coupled to a similarly sized threaded end disposed on the container 1700 such that the insulated cap 1100 and the container 1700 are secured producing a thermally insulated airtight seal. In some implementations, the container coupling 1400 can include one or more gaskets configured to joint at least a portion of the interior side or face of the insulated cap 1100 and a portion of the container 1700. The mechanism of the container coupling 1400 to secure the insulated cap 1100 and the container 1700 is not limited to any particular mechanism and can include any mechanism and/or combination of mechanisms whereby the insulated cap 1100 and the container 1700 are secured together creating a thermally insulated and airtight seal.

The temperature sensor 1500 can be any suitable device disposed on the insulated cap 1100 and configured to sense and quantify a temperature representative of the temperature of the storage compartment 1754 (shown in FIG. 2) included in the container 1700, when the insulated cap 1100 is coupled to the container 1700. For example, the temperature sensor 1500 can include a thermocouple, a resistance temperature detector (RTD), a thermistor, and/or a semiconductor based integrated circuit, disposed on the insulated cap 1100 such that the sensor 1500 can be in close proximity and thermal communication with a storage compartment of a container 1700. In some implementations, the temperature sensor 1500 can include one or more thermocouples including for example an E-type, J-Type, K-type, N-type, T-type, and/or R/S-type thermocouple. The thermocouple(s) can be disposed on the insulated cap 1100 near to or adjacent to the interior side or face of the insulated cap 1100, such that the thermocouple(s) can be in thermal communication with at least a portion of a storage compartment 1754 of the container 1700 when the insulated cap 1100 is coupled to the container 1700 via the container coupling 1400. Moreover, the thermocouple(s) can be disposed on a location of the insulated cap 1100 such that the thermocouples are both in thermal communication with at least a portion of a storage compartment 1754 of the container 1700, and thermally insulated from any exterior surface of the insulated cap 1100 and/or the container 1700 exposed to the exterior environment (e.g., air at ambient conditions). In that way, the temperature sensor 1500 can be used to sense and record a temperature representative of the temperature of the storage compartment 1754 included in the container 1700. It is worth noticing that the thermocouple(s) can be considered to be in thermal communication with one or more components, for example a storage compartment 1754 of the container 1700, when a probe of the thermocouple (e.g., a joint of two metals with dissimilar thermal behavior such as in a K-type thermocouple) is in direct physical contact with at least a portion of the component that the thermocouple is configured to sense and measure temperature. In some instances, the thermocouple(s) can be considered to be in thermal communication with the storage compartment 1754 of a container 1700 when the probe of the thermocouple is disposed physically in contact with a least a portion of the container 1700 defining the storage compartment 1754 (e.g., a wall or an interior shell that defines the boundaries of the storage compartment).

In some implementations, the temperature sensor 1500 can be integrated and/or disposed with other components of the insulated cap 1100. For example, in some implementations the temperature sensor 1500 can be integrated with a cartridge, cassette and/or container that houses one or more components including a communications module 1600, a power source, and/or a control unit, as further described herein. In those implementations, the temperature sensor 1500 can include a thermocouple with a temperature probe (e.g., a Nickel Chromium-Nickel Aluminum K-type thermocouple probe) directly forming a/or constituting a portion of the cartridge. The cartridge can facilitate installing, inspecting, replacing, and/or removing one or more components of the insulated cap 1100 such as a communications module 1600. The cartridge can be disposed on the insulated cap 1100 such that a portion of the cartridge which comprises the probe of the thermocouple can be in thermal communication with at least a portion of the storage compartment container 1700, when the insulated cap 1100 is coupled to the container 1700 via the container coupling 1400.

In some implementations, the temperature sensor 1500 can be electrically and/or mechanically coupled to a communications module 1600. The temperature sensor 1500 can be configured to sense and/or measure a temperature and send and/or transmit a signal (for example a voltage) representative of the temperature sensed and/or measured by the probe of the temperature sensor 1500 to the communication module 1600, which in turn can transmit that signal to one or more external devices. In some implementations, the temperature sensor 1500 can be configured to send signals representative of the temperature sensed and/or measured to the communication module 1600 for a predetermined period of time. In some implementations, the temperature sensor 1500 can be configured to send signals representative of the temperature sensed and/or measured to the communication module 1600 at constant time intervals, for example every thirty second, every minute, every two minutes, every ten minutes and so on. In some implementations, the temperature sensor 1500 can be configured to send signals representative of the temperature sensed and/or measured to the communication module 1600 every time the sensed temperature changes. In some implementations, the temperature sensor 1500 can be configured to send signals representative of the temperature sensed and/or measured to the communication module 1600 every time the temperature sensor receives a request from the communication module 1600.

The communications module 1600 can be any device configured to receive signals representative of a temperature sensed and/or measured by the temperature sensor 1500, and transmit signals, including the signals received from the temperature sensor 1500, to one or more external devices. In some implementations, the communications module can include a transducer (e.g., a radio frequency (RF) antenna) configured to convert an electrical signal (e.g., a voltage) received from a transmitter such as the temperature sensor 1500 into a radio signal. The RF antenna can also be configured to pick up radio signals emitted by one or more external devices and convert them into a voltage that can be stored and/or transmitted to one or more components of the insulated cap 1100.

In some implementations, the communications module 1600 can include a Radio-Frequency Identification System, also referred to as an RFID tag that can be used to identify the insulated cap 1100 and also determine, record, and/or transmit the geographic location of a refrigerated carrier 1000 formed when the insulated cap 1100 is coupled to a container 1700. The RFID tag can include an RF antenna, a tag including all the information about the refrigerated carrier, and a reader or interrogator configured to read and interprets data on the tag. When triggered by an interrogation pulse form a nearby RFID reader, the RFID tag transmits digital data that identifies the insulated cap 1100 (e.g., an inventory number, product number, or a serialization code). In some implementations, the RFID tag can include an active RFID tag comprising a power source (e.g., a battery) that can extend the range of distances that the RFID signal can be read by an RFID reader. In some implementations, the RFID tag can include a passive RFID tag that is powered by energy from the RFID reader's interrogation pulse. In that way, the communication module 1600 can operate with very low energy consumption.

In some implementations, an RFID tag (e.g., a local short-range RFID) may be used to identify a monitored temperature of the container 1700 and provide a unique ID for that container 1700 such that the temperature of components within the storage compartment 1754 can be continuously or constantly monitored, e.g., while in the sample processing unit and/or while the container is outside of the sample processing unit, perhaps during transport to a lab. To that end, it can be verified at the lab that no unacceptable temperatures during handling were reached.

The RF antenna can be configured to receive signals (for example a voltage) representative of the temperature sensed and/or measured by the probe of the temperature sensor 1500, and convert those signals into a high frequency radio signal that can be transmitted and received by one or more external devices. In some implementations, the communications module 1600 can include an RF antenna that produces radio signals at a frequency of no more than about 3000 Hz, no more than about 2500 Hz, no more than about 2000 Hz, no more than about 1800 Hz, no more than about 1500 Hz, no more than about 1000 Hz, no more than about 900 Hz, no more than about 800 Hz, no more than about 700 Hz, no more than about 600 Hz, or no more than about 300 Hz, inclusive of all values and ranges therebetween. In some implementations, the communications module 1600 can include an RF antenna that produces radio signals at a frequency of at least about 300 Hz, least about 400 Hz, least about 600 Hz, least about 700 Hz, least about 850 Hz, least about 950 Hz, least about 1200 Hz, least about 2000 Hz, least, inclusive of all values and ranges therebetween. Combinations of the above referenced ranges for the frequency of the RF antenna are also possible (e.g., a frequency of at least about 300 Hz to no more than about 850 Hz, at least about 860 Hz to no more than about 930 Hz). In some implementations, the communications module 1600 can include an RF antenna configured to produce radio signals at a predetermined frequency specifically selected to overcome interferences caused by materials surrounding the communication module 1600, such as for example, the insulating block of the insulated cap 1100. For example, in some implementations the communication module 1600 can be configured to produce radio signals at about 800 Hz As described above, in some implementations, the communications module 1600 can include one or more additional components (not shown in FIGS. 1-3) such as power source, and/or a control unit. The power source can be any suitable energy source and/or energy storage device. In some implementations, the power source can include one or more rechargeable batteries. In some implementations, the communications module 1600 can include one or more ports that enable connection between an external power source and one or more components of the communications module. In some instances, the external power source can be used to directly power the components of the communication module 1600 and/or recharge the power source.

The control unit can be configured to activate and/or control the operation of the communications module 1600, e.g., by receiving electrical signal(s) from and/or sending electrical signal(s) to other components of the insulated cap 1100. The control unit can include a memory, a processor, and an input/output (I/O) device. The memory can be, for example, a random-access memory (RAM), a memory buffer, a hard drive, a database, an erasable programmable read-only memory (EPROM), an electrically erasable read-only memory (EEPROM), a read-only memory (ROM), and/or so forth. In some embodiments, the memory can store signals received from the temperature sensor 1500 (e.g., temperature readings as a function of time) or instructions received from an external device, which can be executed by the processor. Such instructions can be designed for example, report the geographical position of the insulated cap 1100, the temperature sensed and/or measured by the temperature sensor 1500, and/or the time since the last time the refrigerated carrier was loaded with sample specimen containers storing biological material such as capillary blood samples. The processor can be any suitable processing device configured to run and/or execute instructions as described above. The processor can be a general-purpose processor, a Field Programmable Gate Array (FPGA), an Application Specific Integrated Circuit (ASIC), a Digital Signal Processor (DSP), and/or the like. The input/output (I/O) device can include one or more components for receiving information and/or sending information to other components of insulated cap 1100 and/or an external device. In some embodiments, the I/O device can include a network interface that can enable communication between the control unit and one or more external devices, including, for example, an external user device (e.g., a mobile phone, a tablet, a laptop) and/or other compute devices (e.g., a local or remote computer, a server, etc.). The network interface can be configured to provide a wired connection with the external device, e.g., via a port or firewall interface. Alternatively, or optionally, the network interface can be configured to communicate with the external device via a wireless network (e.g., Wi-Fi, Bluetooth®, low powered Bluetooth®, Zigbee and the like). In some embodiments, the communication interface can also be used to recharge the power source (e.g., the rechargeable battery).

The sample processing unit coupling 1650 can be any suitable structure and/or mechanism by which the refrigerated carrier 1000 (formed by coupling the insulated cap 1100 to the container 1700 as shown in FIG. 3) can be coupled, connected, associated, and/or integrated to a sample processing unit 1900 to facilitate the automatic loading and/or transferring of sample specimen containers from the sample processing unit 1900 through the access port 1200 and to the container 1700, as further described herein. The sample processing unit coupling 1650, which can be referred to as "the coupling 1650" can be configured to be engaged by one or more components of the sample processing unit 1900 to facilitate disposing the refrigerated carrier 1000 inside a volume of the sample processing unit 1900. In some implementations, the coupling 1650 can be configured to support the entire weight of the refrigerated carrier 1000 when the refrigerated carrier 1000 is disposed on the sample processing unit 1900. In other implementations, the coupling 1650 can be configured to partially support the weight of the refrigerated carrier 1000 when the refrigerated carrier 1000 is disposed on the sample processing unit 1900. The coupling 1650 can be configured to stabilize, secure, fasten and/or attach at least a portion of the refrigerated carrier 1000 facilitating alignment of the access port 1200 of the insulated cap 1100 with one or more components of the sample processing unit 1900 for automatic loading of sample specimen containers.

The coupling 1650 can be disposed in any suitable location and/or orientation with respect to the components of the refrigerated carrier 1000. For example, FIGS. 1A and 1B show the coupling 1650 can be disposed on the exterior side or face of the insulated cap 1100 adjacent to the first open end 1201 of the access port 1200. The coupling 1650 can be any suitable size, shape and configuration. In some implementations the coupling can be shaped like a track, rail or pathway by which the refrigerated carrier 1000 can be introduced and/or guided into the sample processing unit 1900. In other implementations, the coupling 1650 can be a tab, a flap, a handle or the like configured to be engaged by a component of the sample processing unit to introduce and/or guide the refrigerated carrier 1000 into the sample processing unit 1900. In some implementations, the coupling 1650 can include one or more alignment features and/or markings that facilitate orientating the refrigerated carrier 1000 such that the access port 1200 can be aligned with a component of the sample processing unit 1900 for automatic loading of sample specimen devices. In some implementations, the coupling 1650 can include multiple portions that can be coupled and/or assembled together to form the sample processing coupling 1650. That is, in some implementations, the coupling 1650 can be modular. In other implementations, the coupling 1650 can be made of a monolithic structure.

The coupling 1650 can be made of any suitable material, having sufficient structural strength and rigidity, including, for example, metal, glass, ceramic, and/or polymers. In some embodiments, the coupling 1650 can be made of one or more insulated materials including those described above with respect to the insulation block and/or the access port 1200 of the insulated cap 1100. The coupling 1650 can also be made of or include any suitable material having surface texture and and/or surface material properties providing low surface friction for receiving the refrigerated carrier 1000 on the sample processing unit 1900. For example, in some embodiments, the coupling 1650 can be made of or include a coating of Polytetrafluoroethylene (PTFE), Polyetheretherketone (PEEK), Polyphenylensulfide (PPS), Nylon, Acetal Polyoxymethylene (POM), Polyethylene terephthalate (PET), Molybdenum Disulfide, Tungsten Disulfide, and others Although the insulated cap 1100 has been described as including an access port 1200, a gate 1300, a container coupling 1400 and optionally a temperature sensor 1500, a communications module 1600, and/or a sample processing unit coupling 1650, in some embodiments an insulated cap may include a container coupling 1400, a temperature sensor 1500, a sample processing unit coupling 1650, and optionally a communications module 1600. In such implementations, the sample processing unit 1900 can include and/or integrate an access port and a gate configured to be removably couplable to the insulated cap 1100 to allow and/or facilitate transferring samples and/or sample specimen containers containing biological material such as capillary blood samples, directly (without exposure to ambient conditions outside the sample processing unit 1900) and automatically (without direct human intervention) from the sample processing unit 1900, through the insulated cap 1100 and into a storage compartment of the refrigerated carrier 1000 (which is collectively formed by the insulated cap 1100 and the container 1700) when the refrigerated carrier 1000 is coupled to the sample processing unit 1900 via the sample processing unit coupling 1650.

For example, in some implementations, the insulated cap 1100 can include a container coupling 1400 configured to couple the insulated cap 1100 to the container 1700, a temperature sensor 1500 to measure a temperature of at least a portion of the container 1700, and a sample processing unit coupling 1650 to couple the refrigerated carrier 1000 to the sample processing unit 1900. Additionally, the insulated cap 1100 can include a cover (not shown) configured to be removably coupled to the insulated cap 1100 to seal the storage compartment of the refrigerated carrier 1000. Optionally, in some embodiments the insulated cap can also include a communications module 1600 configured to read the temperature measured by the temperature sensor 1500 and send a signal representative of the measured temperature to an external device. In use, the cover of the insulated cap 1100 can be removed by a user to expose and/or unseal the storage compartment of the refrigerated carrier 1000 prior to coupling the refrigerated carrier 1000 to a sample processing unit 1900 that includes an access port and a gate. The access port and the gate integrated to the sample processing unit 1900 can be similar to and/or substantially the same as the access port 1200 and the gate 1300 described above with reference to FIGS. 1A and 1B. More specifically, the access port of the sample processing unit 1900 can define a channel, duct, and/or corridor configured to convey, transfer and/or transport samples, and/or sample specimen containers to the refrigerated carrier 1000. Similarly, the gate of the sample processing unit 1900 can be configured to transition between a closed configuration in which the gate obstructs the access port of the sample processing unit 1900 and seals and/or prevents access to refrigerated carrier 1000, when the refrigerated carrier 1000 is coupled to the sample processing unit 1900 via the sample processing unit coupling 1650, and an open configuration in which the gate of the sample processing unit 1900 unobstructs or opens the access port of the sample processing unit 1900 and unseals and/or allows access to the refrigerated carrier 1000. In some implementations in which the sample processing unit 1900 includes the gate described above, the insulated cap 1100 may not include a gate, and instead the system may rely only on the gate of the sample processing unit 1900 to open and close access from the sample processing unit 1900 into the storage compartment of the container when the container is disposed within or otherwise operably coupled to the sample processing unit 1900.

FIG. 2 shows a schematic illustration of the container 1700 configured to store sample specimen containers that store and/or contain biological material such as capillary blood samples facilitating their transport from a sample collection site to one or more analysis sites and/or laboratories. The container 1700 can be configured to store the sample specimen containers under controlled conditions such as a constant temperature, typically below ambient temperature, to prevent the degradation of the biological material stored inside each one of the sample container specimens. The container 1700 can include an inner shell 1750, an outer shell 1800, and a connector 1850. The outer shell can provide a barrier to the container 1700 against the external environment surrounding the container 1700 and define an interior space and/or volume suitable for accommodating the inner shell 1750. The inner shell 1750 can be disposed inside the outer shell 1800, occupying a fraction of the interior volume of the outer shell 1800 and defining an annular region, space, and/or volume located outside of the inner shell 1750 and inside of the outer shell 1800. This annular region, space, and/or volume can be used to accommodate a PCM 1804, as further described herein. The inner shell 1750 can be coupled to the outer shell 1800 via the connector 1850. Moreover, the container 1700 can be coupled via the connector 1850 to the insulated cap 1100 (as described above with reference to FIG. 1) to form the refrigerated carrier 1000, as further described herein.

The inner shell 1750 of the container 1700 can be any suitable structure configured to store sample specimen containers. The inner shell 1750 can be any suitable shape, form and/or configuration. In some embodiments, the inner shell 1750 can be a three-dimensional shape having a length and any suitable cross-sectional area including for example, circular, oval, square, rectangular, and/or other polygonal cross-sectional area. The inner shell 1750 can include an open end (also referred herein as opening 1751), a closed end, and one or more lateral walls, which collectively define a storage compartment 1754. The opening 1751 can have a circular shape characterized by a diameter large enough for receiving and/or facilitating transfer of sample specimen containers into and out of the storage compartment 1754. For example, in some embodiments the opening 1751 can be characterized by a diameter of no more than 50 cm, no more than 40 cm, no more than 30 cm, no more than 25 cm, no more than 20 cm, no more than 15 cm, no more than 10 cm, no more than 5 cm, inclusive of all values and ranges therebetween. In some embodiments, the opening 1751 can be characterized by a diameter of at least about 3 cm, at least about 5 cm, at least about 8 cm, at least about 10 cm, at least about 15 cm, at least about 25 cm, at least about 30 cm, at least about 40 cm, at least about 50 cm, inclusive of all values and ranges therebetween. Combinations of the above referenced ranges for the diameter of the opening 1751 are also possible (e.g., a diameter of at least about 5 cm to no more than about 40 cm, at least about 20 cm to no more than about 50).

The storage compartment 1754 can be sized and configured to store any suitable number of sample specimen containers. For example, in some implementations, the storage compartment 1754 can be sized and configured to store no more than 150 samples, no more than 130 samples, no more than 100 samples, no more than 80 samples, no more than 60 samples, no more than 40 samples, no more than 30 samples, no more than 25 samples, no more than 20 samples, no more than 15 samples, no more than 10 samples, inclusive of all values and ranges therebetween. In some implementations, the storage compartment 1754 can be sized and configured to store at least about 5 samples, at least about 10 samples, at least about 15 samples, at least about 20 samples, at least about 25 samples, at least about 30 samples, at least about 40 samples, at least about 80 samples, at least about 160 samples, at least about 200 samples.

In some implementations, storage compartment 1754 includes optional biasing member 1755 (as shown in FIG. 2). Biasing member 1755 can be any suitable structure configured to convey, encourage, urge, or otherwise direct (or re-direct) a sample container as it enters the storage compartment 1754 (via the opening 1751) to a particular location within the storage compartment 1755 to maximize the usable storage capacity of the storage compartment 1754. In some instances, for example, biasing member 1755 can be a ledge (also referred to as a kick ledge) or ramp that causes a sample container (e.g., tube) to move towards a front side or corner of the storage compartment 1754 (e.g., in cases in which the opening to the storage compartment 1754 is on its back side or corner), so that the storage compartment 1754 fills from the front side or corner, and as additional sample containers are added, they stack on one another beginning from that front side or corner, thereby increasing, maximizing, and/or optimizing the usable volume of the storage compartment 1754.

In some implementations, the inner shell 1750 can include multiple portions that can be coupled and/or assembled together to form the opening 1751 and the storage compartment 1754. That is, in some implementations, the inner shell 1750 can be modular. Alternatively, in other implementations, the inner shell 1750 can be made of a monolithic structure.

The inner shell 1750 can be made of any suitable materials having sufficient structural strength and rigidity and high thermal conductivity including, metals, metal alloys, and/or selective metal oxides. For example, in some implementations, the inner shell can be made of silver, copper, aluminum, nickel, tungsten, zinc, silicon carbide, beryllium oxide, aluminum-bronze alloys, Nickel-chromium alloys and the like.

The inner shell 1750 can be coupled to the connector 1850 to provide the inner shell 1750 stability and prevent undesired movements and/or collisions between the inner shell 1750 and the outer shell 1800, thus preventing excessive shaking and/or movement of the sample specimen containers stored in the storage compartment 1754. The inner shell 1750 can be coupled to the connector 1850 using one or more coupling mechanisms including, but not limited to screws, bolt fasteners, welding, brazing, adhesives, or any combination thereof. In some implementations, the inner shell 1750 can be coupled to the connector 1850 via an engineering fit, interreference fit, press fit and/or friction fit. For example, in some implementations, the connector 1850 can include an interference fit that can secure the inner shell 1750 to the connector 1850 by friction, after a surface defining the opening 1751 of the inner shell 1750 and the connector 1850 are pushed together. In some implementations, the inner shell 1750 can include a threaded end or threaded portion that can be coupled to a similarly sized threaded end or threaded portion disposed on the connector 1850 such that the inner shell 1750 and the connector 1850 are secured. In some implementations, the inner shell 1750 can include an O-ring 1756 that surrounds the lateral wall(s) of the inner shell 1750 and provides an airtight seal between the exterior of the inner shell 1750 and the connector 1850.

The outer shell 1850 can be any suitable structure configured to provide a thermal and mechanical barrier and/or a shield protecting the sample specimen containers stored in the storage compartment 1754. The outer shell 1800 can define an interior volume larger than the volume of the inner shell 1750 such that the outer shell 1800 can enclosed and/or contain the inner shell 1750. The outer shell 1800 can be any suitable shape, form and/or configuration. In some embodiments, the outer shell 1800 can be a three-dimensional shape having a length and any suitable cross-sectional area including for example, circular, oval, square, rectangular, and/or other polygonal cross-sectional area. The outer shell 1800 can include an open end, a closed end, and one or more lateral walls which collectively define an enclosure. In some embodiments, the outer shell 1800 and the inner shell 1750 can have a cylindrical shape, with the inner shell 1750 being disposed inside the outer shell 1800 in a concentric manner. The interior volume of the outer shell 1800 that is unoccupied by the inner shell 1750 forms an annular region and/or volume that suitable for disposing a PCM 1804, as further described herein.

The outer shell 1800 can be made of any suitable materials having sufficient structural strength and rigidity, including, for example, metal, glass, ceramic, and/or polymers. In some embodiments, the outer shell 1800 can be made of one or more layers of thermally insulating materials including those described above with respect to the insulation block 1102 and/or the access port 1200 stacked together to form and/or provide a continuous barrier that reduces and/or minimizes the rate of heat transfer between one or more exterior surfaces of the outer shell (e.g., the surfaces disposed outside the outer shell and exposed to air and/or other environments surrounding the refrigerated device) and one or more surfaces disposed inside the outer shell. For example, the outer shell 1800 can be made of one or more materials that have inherently low heat transfer characteristics including polyurethanes, polyisocyanurates, polyesters, polystyrene, polyethylene, polypropylene, cellulose, fiberglass and others. Moreover, in some embodiments, the outer shell 1800 can be made of materials having low heat transfer characteristics as well as suitable mechanical properties, such as being easy to form and/or machine. For example, in some embodiments the outer shell 1800 can be made of thermosetting or thermoplastics polymers and polymer formulations. In some embodiments the outer shell (e.g., any of the outer shells described herein) can include a first layer and a second layer made of thermally insulating materials such as those described above, with the second layer being disposed inside the first layer and spaced or separated from the first layer to define a volume or chamber therebetween. The chamber can be used to draw vacuum and thus reduce and/or restrict heat transfer between the environment surrounding the exterior of the outer shell 1800 and the interior of the outer shell 1800.

The outer shell 1800 can house and/or contain a PCM 1804 configured to absorb thermal energy at phase transition to provide cooling to the interior shell 1750 and the sample specimen containers disposed on the storage compartment 1754. The PCM 1804 can be disposed inside the outer shell, occupying a volume or region adjacent to and/or at least partially surrounding the inner shell 1750. For example, in some implementations the PCM 1804 can be disposed on an annular region, space, and/or volume generated inside the outer shell 1800 and outside the inner shell 1750, when the outer shell 1800 and the inner shell 1750 have cylindrical shape, with the inner shell 1750 being disposed inside the outer shell 1800 in a concentric manner. In some implementations, the PCM 1804 can be configured to absorb heat by transitioning from a solid phase to a liquid phase. In other implementations, the PCM 1804 can be configured to absorb heat by transitioning from a first crystalline structure to a second crystalline structure different from the first crystalline structure. In some implementations, the PCM 1804 can be an organic (carbon-containing material) including chemical compounds derived from petroleum, plants, and/or animals. In some embodiments, the PCM 1804 can be an inorganic salt hydrate derived from mineral deposits. In some implementations the PCM 1804 can be an alkane hydrocarbon or a paraffin including, but not limited to n-decane, n-dodecane, n-tetradecane, n-hexadecane, n-octadecane, n-eicosane, n-docosane or a combination thereof. In some embodiments, the PCM 1804 can be a commercially available product such as BioPCM, PlusICE, RT-2HC, RT-3HC, RT-4, RT-5 and others.

The outer shell 1800 can be coupled to the connector 1850 to form an airtight structure. The outer shell 1800 can be coupled to the connector 1850 using one or more coupling mechanisms including, but not limited to screws, bolt fasteners, welding, brazing, adhesives, or any combination thereof. In some embodiments, the outer shell 1800 can be coupled to the connector 1850 via an engineering fit, inter-reference fit, press fit and/or friction fit. For example, in some embodiments, the connector 1850 can include an interference fit that can secure the outer shell 1800 to the connector 1850 by friction, after a surface defining the opening of the outer shell 1800 and the connector 1850 are pushed together. In some embodiments, the outer shell 1800 can include a threaded end or threaded portion that can be coupled to a similarly sized threaded end or threaded portion disposed on the connector 1850 such that the outer shell 1800 and the connector 1850 are secured.

The connector 1850 can be any suitable mechanism by which the inner shell 1750 and the outer shell 1800 of the container 1700 form a thermally insulated and airtight structure that can be coupled to the insulated cap 1100 to form the insulated carrier 1000. The connector 1800 can include any mechanism capable of creating a thermally insulated and airtight seal between the inner shell 1750 and the outer shell 1800 of the container 1700. The mechanism of the connector 1850 can be configured to prevent and/or avoid leaks of phase change material (PCM) from the container 1700 to the surrounding environment, as well as any leaks of gases such as air, and/or moisture from the surrounding environment into the container 1700. Similarly, the mechanism of the connector 1850 can be configured minimize heat losses from the interior of the refrigerated carrier 1000 and the exterior environment (e.g., air at ambient conditions) surrounding the refrigerated carrier 1000. That is, the mechanism of the connector 1850 can be configured to reduce the rate of heat transfer between the interior side or face of the insulated cap 1100, which is in contact with (an can be thermally equilibrated with) the storage compartment 1754, and the exterior surfaces of the refrigerated carrier 1000 exposed to air at ambient conditions. In some embodiments, the connector 1850 can include an engineering fit, interreference fit, press fit and/or friction fit. For example, in some embodiments, the connector 1850 can include an interference fit that can secure the insulated cap 1100 to the container 1700 by friction, after the open end 1751 of the container 1700 and the insulated cap 1100 are pushed together. In some embodiments, the connector 1850 can include a threaded end or threaded portion that can be coupled to a similarly sized threaded end disposed on the insulated cap 1100 and/or the container coupling 1400 such that the container 1700 and the insulated cap 1100 and are secured producing a thermally insulated airtight seal. The mechanism of the connector 1850 to secure the insulated cap 1100 and the container 1700 is not limited to any particular mechanism and can include any mechanism and/or combination of mechanisms whereby the insulated cap 1100 and the container 1700 are secured together creating a thermally insulated and airtight seal.

FIG. 3 shows a schematic illustration of the refrigerated carrier 1000. The refrigerated carrier 1000 is formed by coupling the insulation cap 1100 to the container 1700, as previously described above with respect to FIGS. 1 and 2. The refrigerated carrier 1000 can be configured to facilitate (i) transferring sample specimen containers that hold biological material such as capillary blood samples, directly (without exposure to ambient conditions) and automatically (without direct human intervention) from a sample processing unit 1900 into the storage compartment 1754 of the refrigerated carrier 1000, and (ii) maintaining the sample specimen containers at a refrigerated temperature, preserving the integrity of the sample during their transport from a collection site to an analysis site.

In use, the refrigerated carrier 1000 can be cooled and/or pre-chilled prior to its use storing and/or transporting sample specimen containers. The refrigerated carrier 1000 can be cooled and/or pre-chilled by any suitable means. For example, the refrigerated carrier 1000 can be cooled by exposing the storage compartment 1754 of the container 1700 to a media and/or fluid at a sufficiently low temperature for a period of time, and subsequently coupling the insulated cap 1100 to preserve the low temperature inside the container 1700. In some instances, the storage compartment 1754 can be loaded with a low temperature media such as solid carbon dioxide (e.g., dry ice) for a period of time to cool the container 1700 and cause the transition of the PCM 1804 disposed within the container 1700 to its lower temperature phase (e.g., solidification). In other instances, the storage compartment 1754 of the container 1700 can be exposed to a low temperature cryogenic liquid such as nitrogen, helium, argon, and/or methane to cool the container 1700 and cause the transition of the PCM material 1804 to its lower temperature phase.

The transition of the PCM material 1804 from its higher temperature phase to its lower temperature phase (e.g., transition from liquid to solid) can be referred to as "charging" the container 1700 and/or the refrigerated carrier 1000. In some instances, the refrigerated carrier 1000 can be charged at the sample collection site prior to its use. In other instances, the refrigerated carrier 1000 can be charged and stored at a centralized location, and then be transferred to a sample collection sample for further use. The charged container 1700 can be then coupled to the insulated cap 1100 to prevent warming of the storage compartment 1754 to ambient temperature, with the concomitant undesired formation and/or accumulation of water condensate and/or excessive moisture. In some implementations, the container 1700 can be coupled to a single, unique insulated cap 1100 (e.g., the insulated cap 1100 and the container 1700 are configured to be a match). In such implementations, the container coupling 1400 of the insulated cap 1100 and/or the connector 1800 of the container 1700 may be configured to have a matching threaded portion such that only that only one particular insulated cap 1100 can be coupled to a particular container 1700. In other implementations, the container 1700 can be coupled to any insulating cap 1100. That is, the container coupling 1400 of the insulated cap 1100 comprises a threaded portion configured to be matched to any container 1700.

The charged refrigerated carrier 1000 can be used to store sample specimen containers prior to and during their transfer to an analysis site. The refrigerated carrier 1000 can be coupled to a sample processing unit 1900 via the sample processing unit coupling 1650 to enable automatic loading of sample specimen containers comprising biological material such as capillary blood samples processed at the sample processing unit 1900, as further described herein. In some implementations, the refrigerated carrier 1000 can include one or more structures such as handles, grips, and/or knobs disposed on any suitable external surface of the container 1700 so that a user can lift the refrigerated container 1000 and align the coupling 1650 with a component of the sample processing unit 1900 enabling the refrigerated carrier 1000 to be received and/or loaded in the sample processing unit 1900. In such implementations, the size and weight of the charged refrigerated container 1000 is selected so that an average user can lift the refrigerated carrier 1000. In other implementations, the refrigerated carrier 1000 can include one or more structures configured such that a component of the sample processing unit 1900 can receive and/or load the charged refrigerated carrier 1000 without any direct human intervention (e.g., automatically).

The charged refrigerated carrier 1000 can be configured such that the communications module 1600 can transmit a signal representative of the temperature of the storage compartment 1754 (measured by the temperature sensor 1500) to the sample processing unit 1900 upon loading of the charged refrigerated carrier 1000 on the sample processing unit 1900. In some implementations, the communications module 1600 can transmit an RF signal representative of the temperature of the storage compartment 1754 at predetermined frequency specifically selected to overcome interferences caused by the materials of the refrigerated carrier 1000 surrounding the communication module 1600, such that a control unit the sample processing unit 1900 can receive the signal. For example, in some implementations the communication module 1600 can be configured to transmit a radio signal representative of the temperature of the storage compartment 1754 at about 800 Hz, overcoming interference caused by the materials of the refrigerated carrier and/or the sample processing unit 1900.

As described above, the charged refrigerated carrier 1000 can be further configured to be engaged by a component of the sample processing unit 1900 to load one or more sample specimen containers via the insulated cap 1100 according to an automated manner (e.g., without direct human intervention). For example, in some implementations, an engagement member of the gate 1300 can be engaged by one or more components of the sample processing unit 1900 to transition the gate 1300 from the closed configuration to the open configuration, as described above with reference to FIG. 1, allowing sample specimen container to be transferred from the sample processing unit 1900, through the access port 1200 and into the storage compartment 1700. In some implementations, the refrigerated carrier 1000 can be configured to allow automatic loading of sample specimen containers only when the temperature measured by the temperature sensor 1500 is within a predetermined range. In such implementations, a process control unit of the refrigerated carrier 1000 can, for example, control a magnet biasing member 1303 of the gate 1300 to prevent the transitioning of the gate 1300 from the closed configuration to the open configuration until the temperature of the storage compartment 1754 is within a predetermined range. For example, in some implementations, the refrigerated carrier 1000 can be configured to allow automatic loading of sample specimen containers only when the temperature measured by the temperature sensor 1500 is between about 2° C. and about 8° C.

In some implementations, the charged refrigerated carrier 1000 can be configured to receive sample specimen containers one at a time. In other implementations, the charged refrigerated carrier 1000 is configured to receive multiple sample specimen containers simultaneously. The charged refrigerated carrier 1000 can be configured to receive sample specimen containers in any suitable manner. For example, in some implementations, the charged refrigerated carrier 1000 can be configured to receive sample specimen containers fed by gravity from an automatic loading magazine, as further described herein. In other implementations, the charged refrigerated carrier 1000 can be configured to receive sample specimen containers fed with the aid of an elevator, a sample holder, a clamp, and/or the like included on the sample processing unit 1900. The charged refrigerated carrier 1000 can be configured to store one or more sample specimen containers in the storage compartment 1754 at a temperature between about 2° C. and about 8° C. for a predetermined amount of time. For example, in some implementations, the charged refrigerated carrier 1000 can be configured to store sample specimen containers in the storage compartment 1754 at a temperature between about 2° C. and about 8° C. for a period of time of no more than 2 hours, no more than 4 hours, no more than 8 hours, no more than 16 hours, no more than 24 hours, no more than 36 hours, no more than 48 hours, no more than 72 hours, no more than 96 hours, inclusive of all values and ranges therebetween. In some embodiments, the charged refrigerated carrier 1000 can be configured to store sample specimen containers in the storage compartment 1754 at a low temperature for a period of time of at least about 96 hours, at least about 60 hours, at least about 48 hours, at least about 44 hours, at least about 36 hours, at least about 30 hours, at least about 24 hours, at least about 20 hours, at least about 15 hours, at least about 12 hours, at least about 8 hours, at least about 4 hours, at least about 2 hours, inclusive of all values and ranges therebetween. Combinations of the above referenced ranges for the period of time the refrigerated carrier 1000 can store sample specimen containers at low temperature are also possible (e.g., a period of time of at least about 5 hours to no more than about 40 hours, at least about 16 hours to no more than about 96 hours). In some instances, the charged refrigerated carrier 1000 can be loaded with sample specimen containers and remain inside the sample processing unit 1900 for an extended period of time until a currier can retrieve the charged refrigerated carrier and transport it to an analysis site for analysis of the samples. In other instances, the charged refrigerated carrier 1000 can be loaded with sample specimen containers and then be immediately retrieved by a carrier for transport to an analysis site.

As described above, the charged refrigerated carrier 1000 is configured to maintain a low temperature on the storage compartment 1754 for a period of time, preventing thermal degradation of the biological samples stored inside the storage compartment 1754, and avoid exposure of the sample specimen containers to undesirable ambient air, which can cause condensation, and increased humidity. The storage compartment 1754 of the charged refrigerated carrier 1000 can be preserved at low temperatures during storage and/or transfer of the sample specimen containers from a collection site to an analysis site owing to the PCM material 1804 surrounding the storage compartment 1754. When the charged refrigerated carrier 1000 is exposed ambient conditions, thermal energy is transferred from the exterior surfaces of the refrigerated carrier 1000 to the cooled storage compartment 1754. The PCM material 1804 disposed inside the outer shell 1800 is disposed on the refrigerated carrier 1000 surrounding at least a portion of the storage compartment 1754 such that the PCM material 1804 can absorb heat transferred from the exterior surfaces of the refrigerated carrier resulting a change of phase of the PCM material 1804 without increasing the temperature of the storage compartment 1754. In some implementations, the charged refrigerated carrier 1000 can be configured to transmit a signal representative of the temperature of the storage compartment 1754 to one or more external devices, while the charged refrigerated carrier 1000 stores sample specimen containers. In that way, the refrigerated carrier 1000 can facilitate tracking, monitoring, and or recording the temperature of the storage compartment 1754 as a function of time while the charged refrigerated carrier 1000 stores sample specimen containers FIGS. 4-9 show an insulated cap 2100 which can be coupled to a container 2700 (shown in FIG. 10) to form a refrigerated carrier 2000 (shown in FIGS. 11-13), according to an embodiment. The insulated cap 2100 can be any suitable shape, size, and/or configuration. For example, at least a portion of the insulated cap 2100 can be similar to and/or substantially the same as one or more portions (and/or combination of portions) of the insulated cap 1100 described above with reference to FIGS. 1A and 1B. More specifically, the insulated cap 2100 can be substantially similar in at least form and/or function to the insulated cap 1100 described in detail above. Thus, portions of the insulated cap 2100 may not be described in further detail herein.

Figure 4:
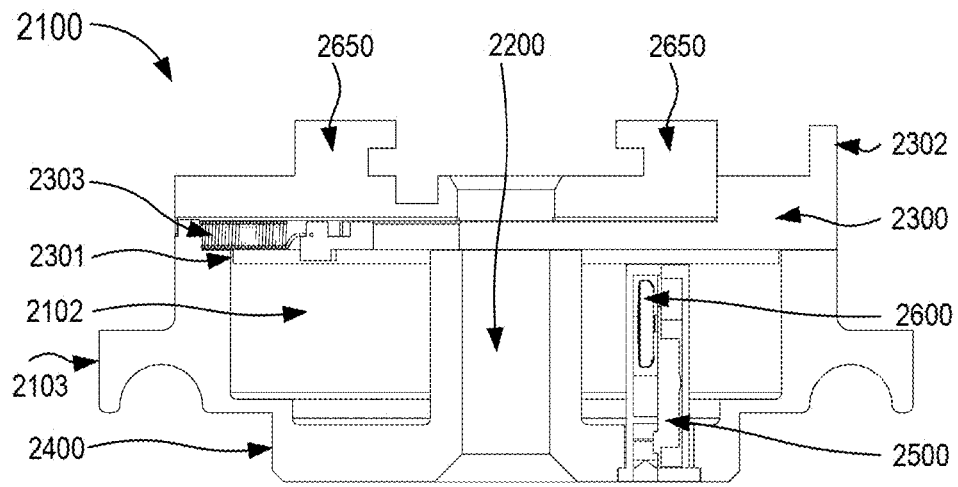
FIG. 4 is a cross-sectional front view of an insulated cap according to an embodiment.
Figure 11:
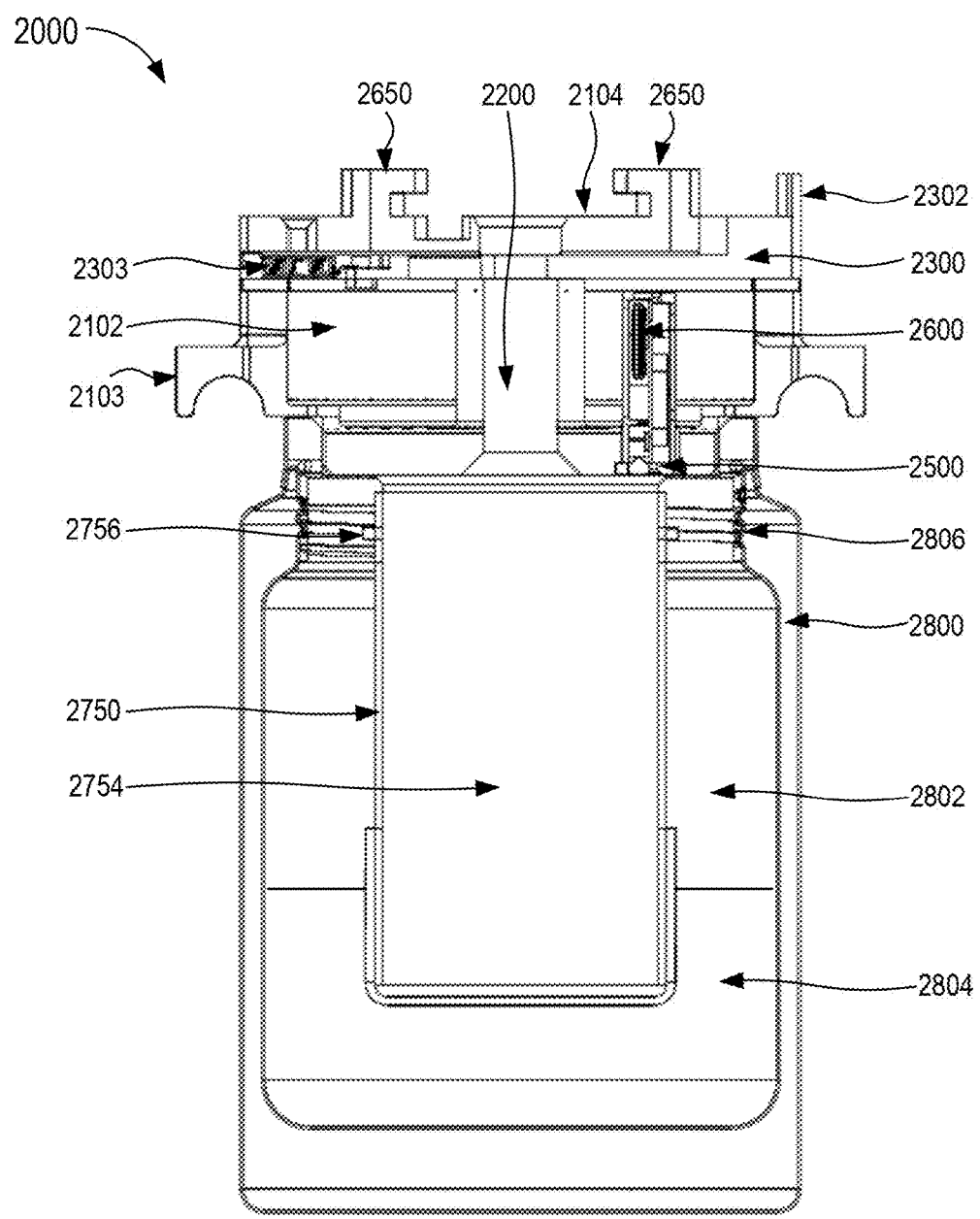
FIG. 11 is a cross-sectional front view of a refrigerated carrier, including an assembly of the insulated cap of FIGS. 4-9 and the container of FIG. 10.
Figure 12:
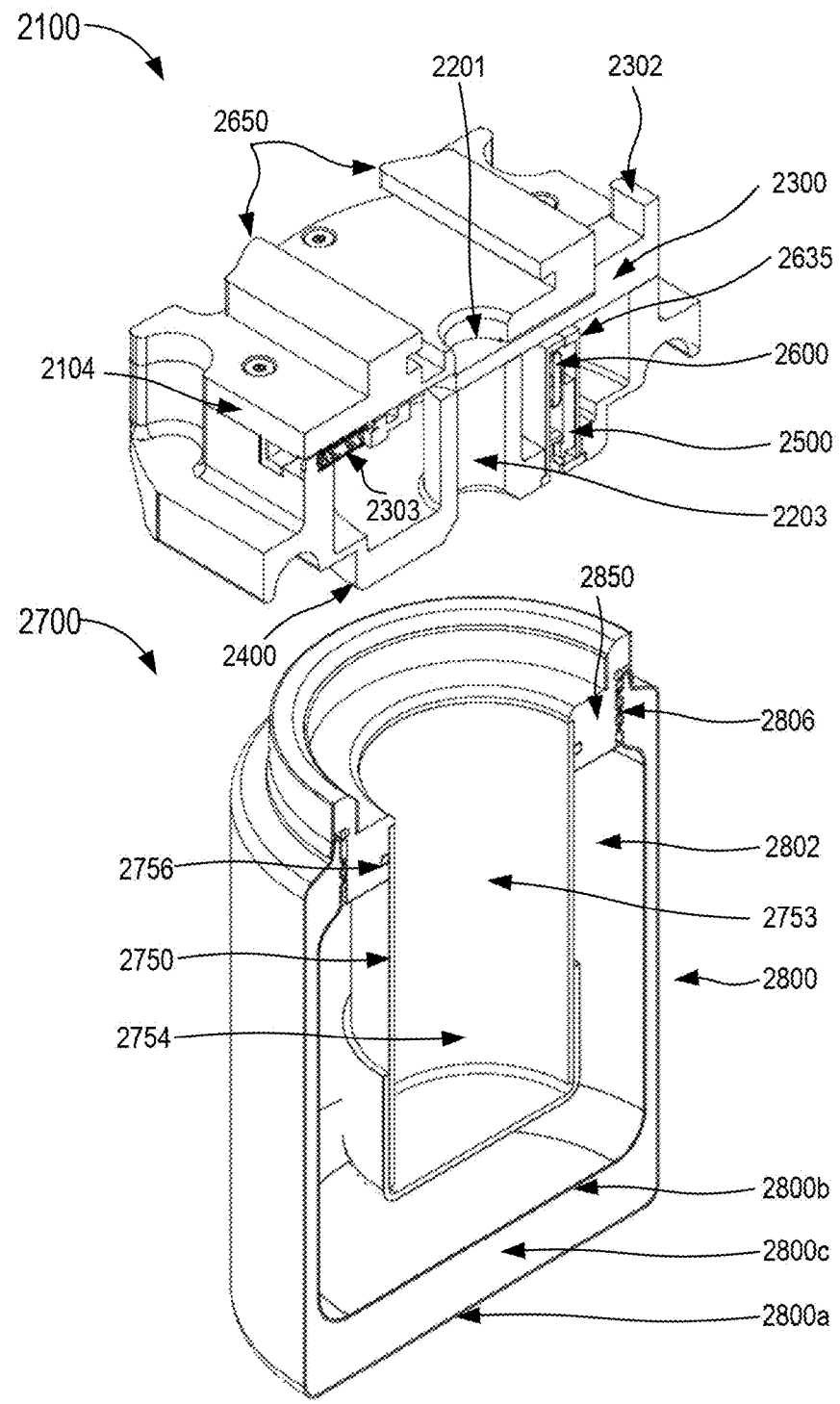
FIG. 12 is a cross-sectional perspective view of the refrigerated carrier of FIG. 11 in a closed configuration.

FIG. 4 shows a cross-sectional view of the insulated cap 2100. The insulated cap 2100 includes an access port 2200, a gate 2300, a container coupling 2400, a temperature sensor 2500, a communications module 2600, and a sample processing unit coupling 2650. The insulated cap 2100 is configured to be coupled to the container 2700 via the container coupling 2400 to selectively seal the opening of said container 2700 and collectively form the refrigerated carrier 2000 (as shown in FIG. 12), as further described herein. The insulated cap 2100 is configured to be coupled to the container 2700 (collectively forming the refrigerated carrier 2000), and to a sample processing unit (not shown) via the sample processing unit coupling 2650. In that way, the refrigerated carrier 2000 can allow and/or facilitate transferring of samples and/or sample specimen containers storing biological material such as capillary blood samples, directly (without exposure to ambient conditions outside the sample processing unit) and automatically (without direct human intervention) from the sample processing unit into a storage compartment 2754 of the refrigerated carrier 2000, as further described herein. The temperature sensor 2500 is configured to measure a temperature of the storage compartment 2754 of the container 2700 when the insulated cap 2100 is coupled to the container 2700 (as shown in FIG. 11).

The insulated cap 2100 includes a temperature sensor 2500 and a communications module 2600 operatively coupled to the temperature sensor 2500 and configured to read the temperature measured by the temperature sensor 2500 and send a signal representative of the measured temperature to an external device and/or network, as further described herein.

Figure 5:
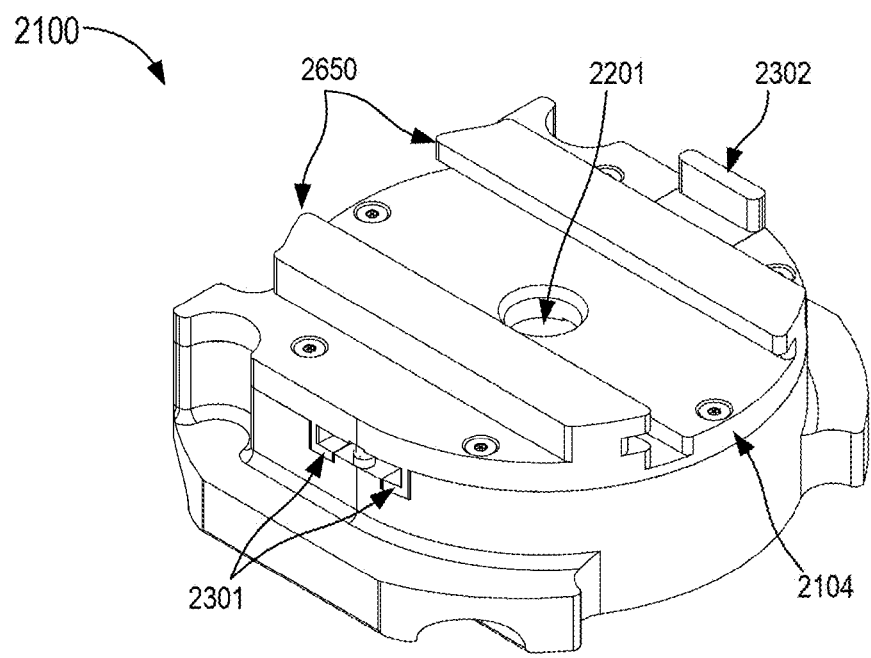
FIG. 5 is a perspective view of the insulated cap of FIG. 4.

In this embodiment, the insulated cap 2100 has a three-dimensional shape having a length and a substantially circular cross-sectional area, as shown in the perspective view of the insulated cap 2100 of FIG. 5. Alternatively, in other embodiments, the cross-sectional area of an insulated cap can be shaped as an ellipse, a square, a triangle, a polygon and/or any suitable geometric shape. The insulated cap 2100 can include any suitable structure and/or component configured to provide a resealable thermally insulated closure for the opening of the container 2700 when the insulated cap 2100 is coupled to the container 2700. For example, the insulated cap 2100 can include an insulation block 2102 (shown in FIGS. 4, and 7), formed of any suitable insulating material and configured to enhance and/or improve the thermal insulating properties of the insulated cap 2100. That is, the insulation block 2102 can be configured to reduce the rate of heat transfer between the one or more surfaces of the insulated cap 2100 that are in contact with, or adjacent to an opening of the container 27000, when the container 2700 is coupled to the insulated cap 2100. In other words, the insulation block 2102 may be configured to function as a thermal barrier to heat transfer when the insulated cap 2100 is coupled to the container 2700, between the interior and the exterior of the insulated container 2700 via the opening 2751 of the container 2700.

The insulation block 2102 can incorporate any suitable material and/or structure configured to reduce heat transfer. For example, the insulation block 2102 may include one or more materials that have inherently low heat transfer characteristics including polyurethanes, polyisocyanurates, polyesters, polystyrene, polyethylene, polypropylene, cellulose, fiberglass and others. In some implementations, the insulation block 2102 can include materials having low heat transfer characteristics as well as suitable mechanical properties, such as being easy to form and/or machine. For example, in some implementations the insulation block 2102 can include thermosetting or thermoplastics polymers and polymer formulations.

Figure 6:
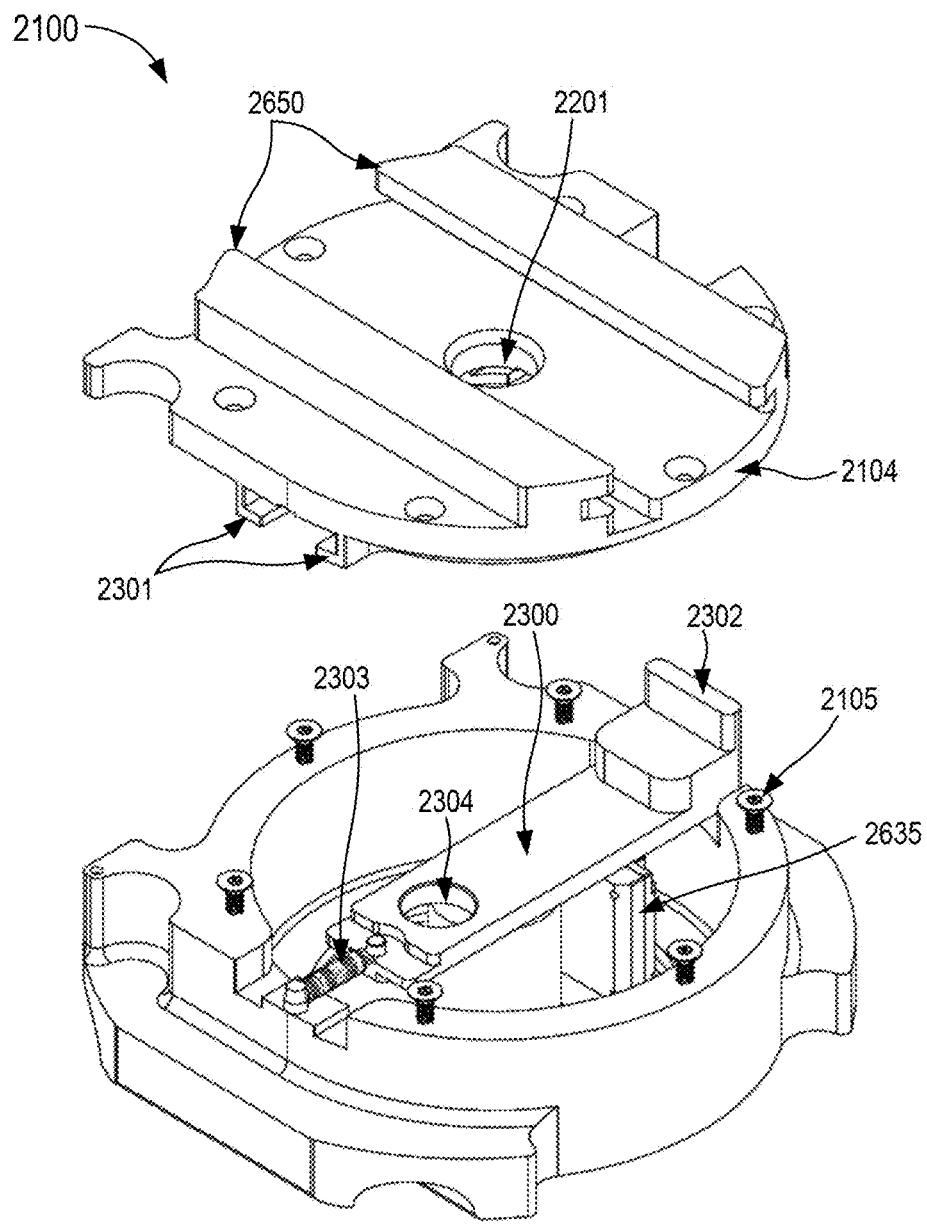
FIG. 6 is a partial exploded view of the insulated cap of FIG. 4.

FIG. 6 shows a partial exploded view of the insulated cap 2100, displaying a cover 2104 which can be removably coupled to the insulated cap 2100. The cover 2104 can be configured to provide access to the interior space and/or volume of the insulated cap 2100, facilitating introducing and/or removing one or more components of the insulated cap 2100 such as the insulation block 2102, the gate 2300, and a cartridge 2635 that houses the temperature sensor 2500 and the communications module 2600, as further described herein. The cover 2104 can be removably coupled to the insulation cap 2100 via the screws 2105. Alternatively, in other implementations the cover 2104 can be removably coupled to the insulation cap 1100 via any suitable coupling mechanism such as bolts, nuts, fasteners, rivets, anchors and the like. FIG. 6 shows the cover 2104 including a set of tracks 2301, which can be configured to facilitate transitioning the gate 2300 from a closed configuration to an open configuration, as further described herein.

The cover 2104 can be made of any suitable materials having sufficient structural strength and rigidity, including, for example, metal, glass, ceramic, and/or polymers. In some implementations, the cover 2104 can be made of one or more insulated materials including those described above with respect to the insulation block 2102. The cover 2104 can be configured to house, accommodate, and/or provide support to other components of the insulated cap 2100. For example, the cover 2104 includes and/or incorporates a set of tracks 2301, which are configured to facilitate transitioning the gate 2300 from a closed configuration to an open configuration, as further described herein. Similarly, the cover 2104 can also provide structural support to the sample processing unit coupling 2650, which is configured to attach and/or detach the insulated cap 2100 (and the container 2700 coupled to the insulated cap 2100 to form the refrigerated carrier 2000) to a sample processing unit (not shown).

Figure 8:
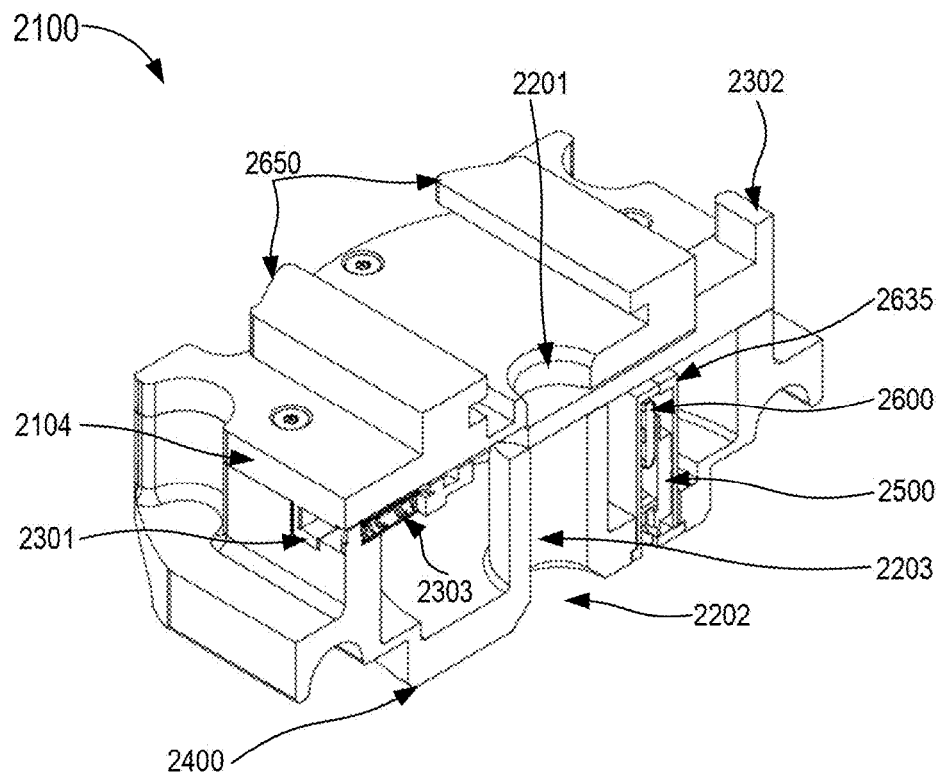
FIG. 8 is a cross-sectional perspective view of the insulated cap of FIG. 4 in an open configuration.

As shown, the access port 2200 is an opening, aperture, and/or a passage that defines a channel, duct, and/or corridor configured to convey, transfer and/or transport samples, and/or sample specimen containers through the insulated cap 2100. FIG. 8 shows the access port 2200 defines a channel that extends through the insulated cap 2100 from a first surface of the insulated cap 2100 located on the cover 2104 adjacent to the sample processing unit coupling 2650 (e.g., the exterior side or face of the insulated cap 2100) to a second surface of the insulated cap 2100 adjacent to the container coupling 2400 and the temperature sensor 2500 (e.g., the interior side or face of the insulated cap 2100). The access port 2200 defines a channel comprising a first open end 2201, a second open end 2202, and lateral wall 2203, as shown in FIG. 8. The first open end 2201 is disposed on the cover 2104 and can be sized and configured to facilitate admitting or loading sample specimen containers storing biological material such as capillary blood samples from a sampling processing unit (not shown) into the access port 2200. The second open end 2202 can be sized and configured to facilitate withdrawing, transferring and/or unloading sample specimen containers from the access port 2200 to the container 2700. The one or more lateral walls 2203 can extend from the first open end 2201 to the open end 2202 and can define the channel configured to convey the sample specimen.

The access port 2200 can be made of any suitable material, having sufficient structural strength and rigidity, including, for example, metal, glass, ceramic, and/or polymers. In some implementations, the access port 2200 can be made of one or more insulated materials including those described above with respect to the insulation block 2102. For example, the access port 2200 can be made of one or more materials that have inherently low heat transfer characteristics including polyurethanes, polyisocyanurates, polyesters, polystyrene, polyethylene, polypropylene, cellulose, fiberglass and others. In some implementations, the access port 2200 can be made of materials having low heat transfer characteristics as well as suitable mechanical properties, such as being easy to form and/or machine. For example, in implementations, the access port 2200 can be made of thermosetting or thermoplastics polymers and polymer formulations.

The gate 2300 can be one or more structures and/or components configured to transition between a closed configuration in which the gate 2300 obstructs the access port 2200 and seals and/or prevents access to the storage compartment 2754 of a container 2700, when the container 2700 is coupled to the insulated cap 2100, and an open configuration in which the gate 2300 unobstructs or opens the access port 2200 and unseals and/or allows access to the storage compartment of the container 2700. The gate 2300 can be a plate, or a lid configured to be removably disposed across the access port 2200 such that the gate 2300 can block, obstruct and/or seal the channel defined by the access port 2200, as shown in the cross-sectional perspective view of the insulated cap 2100 in FIG. 8. More specifically, the gate 2300 is in the closed configuration when the plate is disposed across the access port 2200 between the first open end 2201 and the second open end 2202 of the access port 2200 orientated perpendicular to the path defined by the access port 2200, such that the plate substantially blocks, obstructs and/or seals the channel defined by the access port 2200 preventing sample specimen containers storing biological material to be transferred from a sampling processing unit (not shown in FIG. 8) through the insulated cap 2100 and into a container 2700. When the gate 2300 is in the closed configuration, the gate 2300 also prevents sample specimen containers stored in the container 2700 from experiencing undesirable high temperatures or temperature fluctuations.

Figure 7:
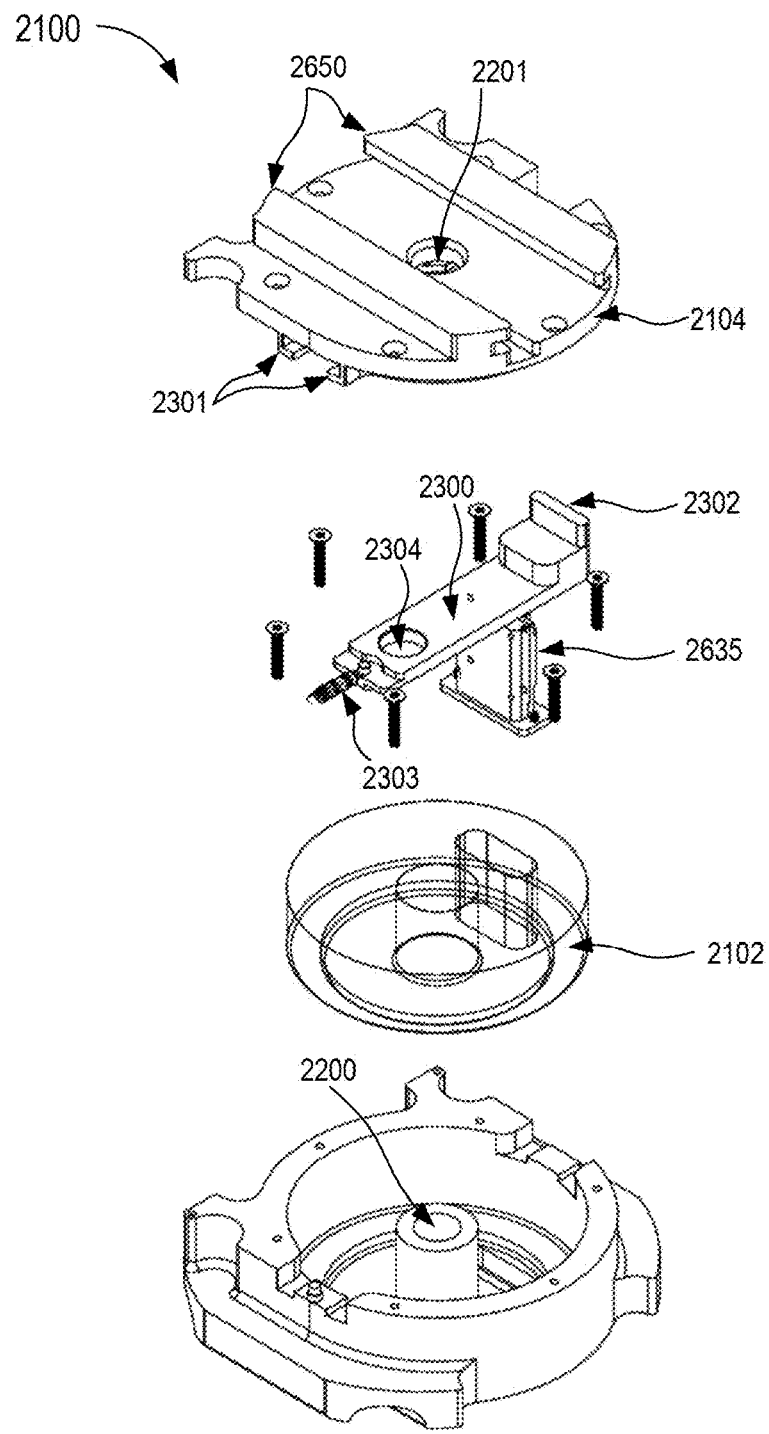
FIG. 7 is an exploded view of the insulated cap of FIG. 4.
Figure 9:
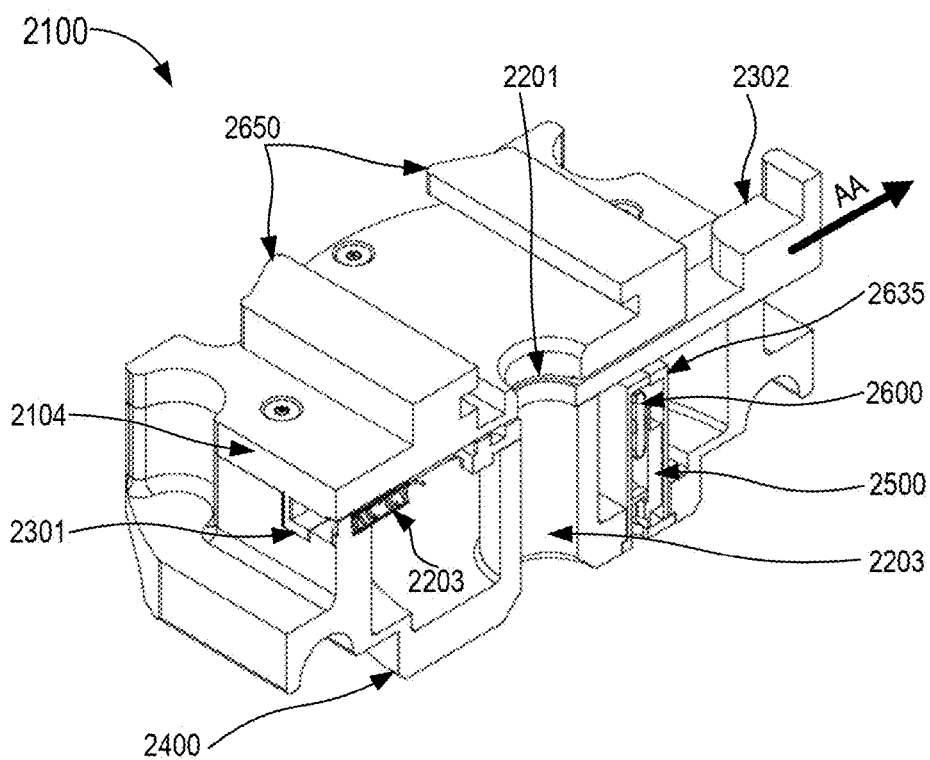
FIG. 9 is a cross-sectional perspective view of the insulated cap of FIG. 4 in a closed configuration.

The gate 2300 can be transitioned from the closed configuration to the open configuration by moving the gate 2300 away from the access port 2200, thus rendering the channel defined by the access port 2200 unobstructed, which allows and/or facilitates transferring sample specimen containers storing biological material such as capillary blood samples from a sample processing unit, through the insulated cap 2100 and into the container 2700. FIG. 9 shows a cross-sectional perspective view of the insulated cap 2100 in which the gate 2300 has been transitioned from the closed configuration to the open configuration, by moving and/or sliding the gate 2300 in the direction of the arrows AA. It is worth noticing that the gate 2300 includes an opening, a hole, and/or a cavity 2304 which is best shown in FIG. 7, configured to be aligned with the access port 2200 when the gate 2300 is transitioned from the open configuration to the closed configuration. When the gate 2300 is transitioned from the closed configuration to the open configuration, the opening 2304 becomes aligned with the access port 2200 allowing samples to go through the opening 2304, as shown in FIG. 9.

The gate 2300 can be made of any suitable material, having sufficient structural strength and rigidity, including, for example, metal, glass, ceramic, and/or polymers. In some embodiments, the gate 2300 can be made of one or more insulated materials including those described above with respect to the insulation block 2102 and/or the access port 2200. For example, the gate 2300 can be made of one or more materials that have inherently low heat transfer characteristics including polyurethanes, polyisocyanurates, polyesters, polystyrene, polyethylene, polypropylene, cellulose, fiberglass and others. In some implementations, the gate 2300 can be made of materials having low heat transfer characteristics as well as suitable mechanical properties, such as being easy to form and/or machine. For example, in some implementations the gate 2300 can be made of thermosetting or thermoplastics polymers and polymer formulations The gate 2300 can include one or more suitable structures and/or components configured to assist and/or facilitate the transition of the gate 2300 between its open and closed configurations. For example, FIG. 6 shows the gate 2300 includes a set of tracks, rails and/or pathways 2301 that provide a low friction surface suitable for moving at least a portion of the gate 2300, allowing the gate 2300 to be transitioned from its closed configuration (shown in FIG. 8) to the open configuration (shown in FIG. 9), allowing sample specimen containers to be deposited through the access port 2200. Said in other words, the set of tracks 2301 can provide a pathway for guiding the translational movement of the gate 2300 from a first position in which the gate 2300 is in the closed configuration to a second position in which the gate 2300 is in the open configuration. FIG. 6 shows the set of tracks 2301 can be disposed on the cover 2104. Alternatively, in some implementations, the tracks 2301 can be mechanically supported on one or more components of the insulated cap 2100. For example, in some implementations the set of tracks 2301 can be disposed on at least a portion of the insulation block 2102 such that the insulation blocks 2102 provides the rigidity and structural support required for the set of tracks 2301 to facilitate sliding the gate 2300 from the closed configuration to the open configuration.

The tracks 2301 can be made of or include any suitable material having surface texture and and/or surface material properties providing low surface friction for sliding and/or moving the one or more components of the gate 2300 front the closed configuration to the open configuration. For example, in some implementations, the tracks 2301 can be made of, or include a coating of Polytetrafluoroethylene (PTFE), Polyetheretherketone (PEEK), Polyphenylensulfide (PPS), Nylon, Acetal Polyoxymethylene (POM), Polyethylene terephthalate (PET), Molybdenum Disulfide, Tungsten Disulfide, and others.

FIGS. 6-9 show the gate 2300 includes an engagement member 2302 configured to be engaged to transition the gate 2300 from the closed configuration to the open configuration. The engagement member 2302 is a tab configured to be engaged either manually (by a user) or automatically (by a component of a sample processing unit) to transition the gate 2300 from the closed configuration to the open configuration. In some implementations, the engagement member 2302 can include a mechanical structure such as a joint, a shaft, a gear, and/or pulley configured to be engaged by an electrical motor, a piezoelectric actuator, or the like to change the position and/or orientation of the gate 2300, transitioning the gate 2300 from the closed configuration to the open configuration.

FIG. 6 also shows the gate 2300 includes a biasing member 2303 configured to bias the gate 1300 into its closed configuration. The biasing member 2303 can be configured to resist movement of the gate 2300 when engaged (e.g., by a user, an electric motor, a piezoelectric actuator, a hydraulic mechanism or the like) to transition the gate 2300 from the closed configuration to the open configuration. In other words, the biasing member 2303 can be any suitable structure and/or component configured to exert a restitution force that opposes the force or forces exerted on the gate 2300 (via the engagement member 1302) to transition the gate 2300 from the closed configuration to the open configuration, thereby encouraging the gate 2300 to be in the closed configuration, by default (i.e., without opposing forces). The biasing member 2303 can include one or more springs or coils coupled to the gate 2300, as shown in FIG. 6, such that when the gate 2300 is in the closed configuration, the springs or coils remain in the thermodynamic equilibrium position (e.g., the position that minimizes the potential and kinetic energy of the spring or coil). When the gate 2300 is engaged via the engagement member 2302 to transition from the closed configuration to the open configuration, the biasing member 2303 can exert a force on the gate 2300 that opposes the forces exerted on the gate 2300 via the engagement member 2302. In some instances, the magnitude of the force exerted by the biasing member 2303 exceeds the magnitude of the force exerted via the engagement member 2302. In such instances, the gate 2300 will remain in the closed configuration. Alternatively, in other instances the magnitude of the force exerted by the biasing member 2303 is less than the magnitude of the force exerted via the engagement member 2302. In those instances, the gate 2300 can be transitioned from the closed configuration to the open configuration.

In some implementations, the biasing member 2303 can include any suitable structures and/or components configured to resist movement of the gate 2300 or "bias" the gate 2300 to be in the closed configuration. For example, the biasing member 2303 can include one or more magnets coupled to the gate 2300 and configured to exert a magnetic force suitable to resist movement of the gate 2300 when engaged (e.g., by a user, an electric motor, a piezoelectric actuator, a hydraulic mechanism or the like) to transition the gate 2300 from the closed configuration to the open configuration. In some instances, the magnitude of the force exerted by the magnet of the biasing member 2303 can exceed the magnitude of a force exerted on the gate 2300 via the engagement member 2302 to transition the gate 2300 from the closed configuration to the open configuration. In such instances, the gate 2300 will remain in the closed configuration. In other instances, the magnitude of the force exerted on the gate 2300 via the engagement member 2302 exceeds the magnitude of the force exerted by the magnet of the biasing member 2303. In those instances, the gate 2300 will transition from the closed configuration to the open configuration, facilitating loading and/or transferring samples through the insulated cap 2100 to a container 2700. In such implementations, the one or more magnets can be operably coupled to a control unit that can selectively transition the gate 2300 from the closed configuration to the open configuration when the control unit receives instructions from an external and/or a remote device such as a sample processing unit.

The container coupling 2400 can be any suitable mechanism by which the insulated cap 2100 can be secured to an open end of the container 2700 such that the insulated cap 2100 and the container 2700 collectively form a refrigerated carrier 2000, as shown in FIG. 11. The container coupling 2400 can include any mechanism capable of creating a removable, thermally insulated and airtight seal between the insulated cap 2100 and the container 2700. The mechanism of the container coupling 2400 can be configured to prevent and/or avoid leaks of fluids including liquids and/or gases such as air when the refrigerated carrier 2000 is oriented in any direction. Similarly, the mechanism of the container coupling 2400 can be configured minimize heat losses from the interior of the refrigerated carrier 2000 and the exterior environment (e.g., air at ambient conditions) surrounding the refrigerated carrier 2000. That is, the mechanism of the container coupling 2400 can be configured to reduce the rate of heat transfer between the interior side or face of the insulated cap 2100, which is in contact with (an can be thermally equilibrated with) the storage compartment 2754 disposed on the container 2700 (as further detail herein), and the exterior surfaces of the refrigerated carrier 1000 exposed to air at ambient conditions. The container coupling 2400 can include an engineering fit, interreference fit, press fit and/or friction fit. For example, in some implementations, the container coupling 2400 can include an interference fit that can secure the insulated cap 2100 to the container 2700 by friction, after an open end of the container 2700 and the insulated cap 2100 are pushed together. Alternatively, the container coupling 2400 can include a threaded end or threaded portion that can be coupled to a similarly sized threaded end disposed on the container 2700 such that the insulated cap 2100 and the container 2700 are secured producing a thermally insulated airtight seal.

The temperature sensor 2500 can be any suitable device disposed on the insulated cap 2100 and configured to sense and quantify a temperature representative of the temperature of the storage compartment 2754 (shown in FIG. 10), when the insulated cap 2100 is coupled to the container 2700. The temperature sensor 2500 can include a K-type thermocouple (e.g., a Nickel Chromium-Nickel Aluminum K-type thermocouple probe). Alternatively, in some implementations, the temperature sensor 2500 can include a resistance temperature detector (RTD) a thermistor, and/or a semiconductor based integrated circuit disposed on the insulated cap 1100 such that the sensor 2500 can be in close proximity and in thermal communication with a storage compartment 2754 of a container 2700. FIG. 11 shows the temperature sensor 2500 is located near to or adjacent to the interior side or face of the insulated cap 2100, such that the thermocouple is in mechanical and thermal communication with at least a portion of a storage compartment 2754 of the container 2700 when the insulated cap 2100 is coupled to the container 2700. Moreover, the thermocouple of the temperature sensor 2500 is disposed on the insulated cap 2100, for example within the insulating block 2102, such that the thermocouple is both in thermal communication with at least a portion of a storage compartment 2754, and thermally insulated from any exterior surface of the insulated cap 2100 and/or the container 2700 exposed to the exterior environment (e.g., air at ambient conditions). In that way, the temperature sensor 2500 can be used to sense and record an accurate temperature representative of the temperature of the storage compartment 2754 included in the container 2700.

In this embodiment, the temperature sensor 2500 is integrated with a cartridge 2635, as shown in FIGS. 7, 8 and 9 to accommodate or house other components including the communications module 2600, a power source (not shown), and/or a control unit (not shown), as further described herein (in some embodiments, the temperature sensor may not be integrated with a cartridge). The cartridge 2635 can facilitate installing, inspecting, replacing, and/or removing one or more components of the insulated cap 2100 such as the communications module 2600. The cartridge 2635 is disposed on the insulated cap 1100 such that a portion of the cartridge which comprises the probe of the thermocouple can be in thermal communication with at least a portion of the storage compartment 2754 of the container 2700, when the insulated cap 2100 is coupled to said container 2700 via the container coupling 2400.

The temperature sensor 2500 can be electrically and/or mechanically coupled to a communications module 2600. The temperature sensor 2500 can be configured to sense and/or measure a temperature and send and/or transmit a signal (for example a voltage) representative of the temperature sensed and/or measured by the probe of the temperature sensor 2500 to the communication module 2600, which in turn can transmit that signal to one or more external devices. In some implementations, the temperature sensor 2500 can be configured to send signals representative of the temperature sensed and/or measured to the communication module 2600 for a predetermined period of time. In some implementations, the temperature sensor 2500 can be configured to send signals representative of the temperature sensed and/or measured to the communication module 2600 at constant time intervals, for example every thirty second, every minute, every two minutes, every ten minutes and so on. In some implementations, the temperature sensor 2500 can be configured to send signals representative of the temperature sensed and/or measured to the communication module 2600 every time the sensed temperature changes. In some implementations, the temperature sensor 2500 can be configured to send signals representative of the temperature sensed and/or measured to the communication module 2600 every time the temperature sensor receives a request from the communication module 2600.

The communications module 2600 can be any device configured to receive signals representative of a temperature sensed and/or measured by the temperature sensor 2500, and transmit signals, including the signals received from the temperature sensor 2500, to one or more external devices such as for example, a sample processing unit. FIGS. 4, 8 and 9 show the communications module 2600 can be disposed on the cartridge 2635 in close physical proximity to the temperature sensor 2500. In that way, the communications module 2600 and the temperature sensor 2500 can be electrically coupled without requiring long wires and/or lines connecting the two components. Additionally, disposing the communications module 2600 with the temperature sensor 2500 in the cartridge 2635 facilitates rapidly replacing and/or exchanging either component in case of a malfunction. The communications module 2600 can include a transducer (e.g., an RF antenna) configured to convert an electrical signal (e.g., a voltage) received from a transmitter such as the temperature sensor 2500 into a radio signal. The RF antenna can also be configured to pick up radio signals emitted by one or more external devices and convert them into a voltage that can be stored and/or transmitted to one or more components of the insulated cap 2100. In that way, the communications module 2600 can include an RF antenna configured to receive signals (for example a voltage) representative of the temperature sensed and/or measured by the probe of the temperature sensor 2500, and convert those signals into a high frequency radio signal that can be transmitted and received by one or more external devices such as a sample processing unit, or other devices located on a remote location. In some implementations, the communications module 2600 can include an RF antenna configured to produce radio signals at a predetermined frequency specifically selected to overcome interferences caused by materials surrounding the communication module 2600, such as for example, the insulating block 2102 of the insulated cap 2100. For example, in some implementations the communication module 2600 can be configured to produce radio signals at about 800 Hz.

In some implementations, the communications module 2600 can include an RFID tag that can be used to identify the insulated cap 2100 and also determine, record, and/or transmit the geographic location of a refrigerated carrier 2000 formed when the insulated cap 2100 is coupled to a container 2700. The RFID tag can include an RF antenna, a tag including all the information about the refrigerated carrier 2000, and a reader or interrogator configured to read and interprets data on the tag. When triggered by an interrogation pulse form a nearby RFID reader, the RFID tag transmits digital data that identifies the insulated cap 2100 (e.g., an inventory number, product number, or a serialization code). In some implementations, the RFID tag can include an active RFID tag comprising a power source (e.g., a battery, not shown) that can extend the range of distances that the RFID signal can be read by an RFID reader. In some implementations, the RFID tag can include a passive RFID tag that is powered by energy from the RFID reader's interrogation pulse. In that way, the communication module 2600 can operate with very low energy consumption for an extended period of time.

In some implementations, the communications module 2600 can include one or more additional components (not shown) such as power source, and/or a control unit. The power source can be any suitable energy source and/or energy storage device, such as one or more rechargeable batteries. The control unit can be configured to activate and/or control the operation of the communications module 2600, e.g., by receiving electrical signal(s) from and/or sending electrical signal(s) to other components of the insulated cap 2100. The control unit can include a memory, a processor, and an input/output (I/O) device. The memory can be, for example, a random access memory (RAM), that can store signals received from the temperature sensor 2500 (e.g., temperature readings as a function of time) or instructions received from an external device such as a sample processing unit, or a remote device, which can be executed by the processor. Such instructions can be designed for example, report the geographical position of the insulated cap 2100, the temperature sensed and/or measured by the temperature sensor 2500, and/or the time since the last time the refrigerated carrier was loaded with sample specimen containers storing biological material such as capillary blood samples. The processor can be, for example, a general-purpose processor, a Field Programmable Gate Array (FPGA), an Application Specific Integrated Circuit (ASIC), a Digital Signal Processor (DSP), and/or the like. The input/output (I/O) device can include one or more components for receiving information and/or sending information to other components of insulated cap 2100 and/or an external device. In some embodiments, the I/O device can include a network interface that can enable communication between the control unit and one or more external devices, including, for example, an external user device (e.g., a mobile phone, a tablet, a laptop) and/or other compute devices (e.g., a local or remote computer, a server, etc.). The network interface can be configured to provide a wired connection with the external device, e.g., via a port or firewall interface. Alternatively, or optionally, the network interface can be configured to communicate with the external device via a wireless network (e.g., Wi-Fi, Bluetooth®, low powered Bluetooth®, Zigbee and the like). In some embodiments, the communication interface can also be used to recharge the power source (e.g., the rechargeable battery).

The sample processing unit coupling 2650 can be any suitable structure and/or mechanism by which the refrigerated carrier 2000 (formed by coupling the insulated cap 2100 to the container 2700) can be coupled, connected, associated, and/or integrated to a sample processing unit to facilitate the automatic loading and/or transferring of sample specimen containers from the sample processing unit through the access port 2200 and to the container 2700, as further described herein. FIG. 6 show the sample processing unit coupling 2650, which can be referred to as "the coupling 2650" can be a set of rails disposed on the cover 2104 adjacent to the open end 2201 of the access port 2200. The coupling 2650 can be configured to provide a low friction surface in which a component of a sample processing unit 2900 can be slid in to support at least a portion of the weight of the refrigerated carrier 2000 (formed by coupling the insulated cap 2100 to the container 2700) when such refrigerated carrier 2000 is disposed on the sample processing unit 1900. The coupling 2650 can be configured to stabilize, secure, fasten and/or attach at least a portion of the refrigerated carrier 2000 facilitating alignment of the open end 2201 of the access port 2200 with one or more components of the sample processing unit 2900 for automatic loading of sample specimen containers.

The coupling 2650 can be made of any suitable material, having sufficient structural strength and rigidity, including, for example, metal, glass, ceramic, and/or polymers. In some embodiments, the coupling 2650 can be made of one or more insulated materials including those described above with respect to the insulation block 2102 and/or the access port 2200 of the insulated cap 1100. The coupling 2650 can also be made of or include any suitable material having surface texture and and/or surface material properties providing low surface friction for receiving the refrigerated carrier 2000 on the sample processing unit. For example, in some embodiments, the coupling 2650 can be made of or include a coating of Polytetrafluoroethylene (PTFE), Polyetheretherketone (PEEK), Polyphenylensulfide (PPS), Nylon, Acetal Polyoxymethylene (POM), Polyethylene terephthalate (PET), Molybdenum Disulfide, Tungsten Disulfide, and others.

Figure 10:
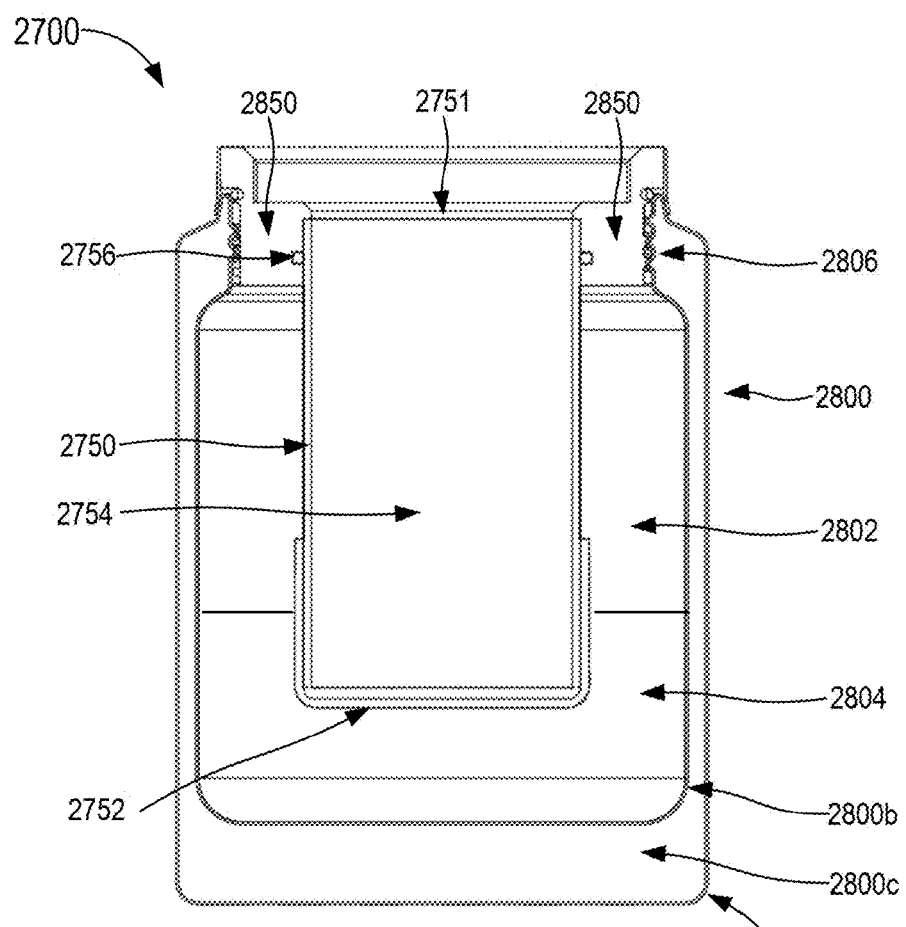
FIG. 10 is a cross-sectional front view of a container configured to be coupled to the insulated cap of FIGS. 4-9, to form a refrigerated carrier.

FIG. 10 shows a cross-sectional front view of the container 2700 configured to store sample specimen containers that store and/or contain biological material such as capillary blood samples facilitating their transport from a sample collection site to one or more analysis sites and/or laboratories. The container 2700 can be configured to store the sample specimen containers under controlled conditions such as a constant temperature, typically below ambient temperature, to prevent the degradation of the biological material stored inside each one of the sample container specimens. The container 2700 includes an inner shell 2750, an outer shell 2800, and a connector 2850. The outer shell 2800 provides a barrier to the container 2700 against the external environment surrounding the container 2700 and defines an interior space and/or volume suitable for accommodating the inner shell 2750. As shown in FIGS. 10 and 12, in this embodiment, the outer shell 2800 includes a first layer 2800a and a second layer 2800b (which, for example, may be made of thermally insulating materials such as those described above), with the second layer 2800b being disposed inside the first layer 2800a and spaced or separated from the first layer 2800a to define a volume or chamber 2800c therebetween. The chamber 2800c can be used to draw vacuum and thus reduce and/or restrict heat transfer between the environment surrounding the exterior of the outer shell 2800 and the interior of the outer shell 2800. In some implementations, the outer shell 2800 can be made of one or more layers of thermally insulating material including, for example, those described above with respect to the insulation block 2102 and/or the access port 2200 stacked together to form and/or provide a continuous barrier that reduces and/or minimizes the rate of heat transfer between one or more exterior surfaces of the outer shell 2800 and one or more surfaces disposed inside the outer shell.

The inner shell 2750 is disposed inside the outer shell 2800 in a concentric arrangement, such that the inner shell 2750 and the outer shell 2800 define an annular region, space, and/or volume 2802 located outside of the inner shell 2750 and inside of the outer shell 2800. The annular volume 2802 is used to accommodate a PCM 2804, as shown in FIG. 11. The inner shell 2750 can be coupled to the outer shell 1800 via the connector 2850. Moreover, the container 2700 can be coupled via the connector 2850 to the insulated cap 2100 (as described above with reference to FIGS. 4-9) to form the refrigerated carrier 2000, as further described herein.

FIGS. 10 and 12 show the inner shell 2750 has a three-dimensional shape with a length and a substantially circular cross-sectional area. FIG. 10 shows the inner shell 2750 includes an open end (also referred as opening 2751), a closed end 2752, and a lateral wall 2753 which collectively define a storage compartment 2754. The opening 2751 and the interior volume of the storage compartment 2754 can be configured to facilitate the transferring and storage of multiple sample specimen containers. For example, in some implementations the opening 2751 can be characterized by a diameter of no more than 50 cm, no more than 40 cm, no more than 30 cm, no more than 25 cm, no more than 20 cm, no more than 15 cm, no more than 10 cm, no more than 5 cm, inclusive of all values and ranges therebetween. In some implementations, the opening 2751 can be characterized by a diameter of at least about 3 cm, at least about 5 cm, at least about 8 cm, at least about 10 cm, at least about 15 cm, at least about 25 cm, at least about 30 cm, at least about 40 cm, at least about 50 cm, inclusive of all values and ranges therebetween. Combinations of the above referenced ranges for the diameter of the opening 2751 are also possible (e.g., a diameter of at least about 5 cm to no more than about 40 cm, at least about 20 cm to no more than about 50).

In some implementations the storage compartment 2754 can be sized and configured to store no more than 150 samples, no more than 130 samples, no more than 100 samples, no more than 80 samples, no more than 60 samples, no more than 40 samples, no more than 30 samples, no more than 25 samples, no more than 20 samples, no more than 15 samples, no more than 10 samples, inclusive of all values and ranges therebetween. In some implementations, the storage compartment 2754 can be sized and configured to store at least about 5 samples, at least about 10 samples, at least about 15 samples, at least about 20 samples, at least about 25 samples, at least about 30 samples, at least about 40 samples, at least about 80 samples, at least about 160 samples, at least about 200 samples.

The inner shell 2750 can be made of any suitable materials having sufficient structural strength and rigidity and high thermal conductivity including, metals, metal alloys, and/or selective metal oxides. For example, the inner shell 2750 can be made of copper. Alternatively, in some implementations the inner shell 2750 can be made of other materials such as aluminum, nickel, tungsten, zinc, silicon carbide, beryllium oxide, aluminum-bronze alloys, Nickel-chromium alloys and the like The connector 2850 can be any suitable structure configured to be coupled to the inner shell 2750 to provide stability and prevent undesired movements and/or collisions between the inner shell 2750 and the outer shell 2800, thus preventing excessive shaking and/or movement of the sample specimen containers stored in the storage compartment 2754. FIG. 12 shows the connector 2850 can be coupled to the inner shell 2750 via an engineering fit, interreference fit, press fit and/or friction fit. Alternatively, the connector 2850 can be coupled to the inner shell 2750 using an adhesive, screws, bolt fasteners, welding, brazing, or any combination thereof. In some implementations, the inner shell 2750 can include a threaded end or threaded portion that can be coupled to a similarly sized threaded end or threaded portion disposed on the connector 2850 such that the inner shell 2750 and the connector 2850 are secured. FIGS. 11 and 12 show the inner shell 1750 can include an O-ring 2756 that surrounds the lateral wall(s) of the inner shell 2750 and provides an airtight seal between the exterior of the inner shell 2750 and the connector 2850

FIGS. 10 and 12 show the outer shell 2850 has a three-dimensional shape with a length and a substantially circular cross-sectional area. The outer shell 2800 defines an interior volume larger than the volume of the inner shell 2750 such that the outer shell 2800 can enclose and/or contain the inner shell 2750. The outer shell 2800 and the inner shell 2750 are disposed on a concentric arrangement, defining an annular volume 2802 suitable for disposing a phase change material (PCM) 2804.

The outer shell 2800 can include a PCM 2804 configured to absorb thermal energy at phase transition to provide cooling to the interior shell 2750 and the sample specimen containers disposed on the storage compartment 2754. The PCM 2804 can be disposed inside the outer shell, occupying a portion of the annular volume 2802 and surrounding at least a portion of the inner shell 2750. The PCM 2804 can be configured to absorb heat by transitioning from a solid phase to a liquid phase. In other embodiments, the PCM 2804 can be configured to absorb heat by transitioning from a first crystalline structure to a second crystalline structure different from the first crystalline structure. In some implementations, the PCM 2804 can be an organic (carbon-containing material) including chemical compounds derived from petroleum, plants, and/or animals. In some implementations, the PCM 2804 can be an inorganic salt hydrate derived from mineral deposits. In some implementations the PCM 2804 can be an alkane hydrocarbon or a paraffin including, but not limited to n-decane, n-dodecane, n-tetradecane, n-hexadecane, n-octadecane, n-eicosane, n-docosane or a combination thereof. In some embodiments, the PCM 2804 can be a commercially available product such as BioPCM, PlusICE, RT-2HC, RT-3HC, RT-4, RT-5 and others FIG. 10 shows the outer shell 2800 can be coupled to the connector 2850 to form an airtight structure. The outer shell 2800 includes a threaded end or threaded portion 2806 that can be coupled to a similarly sized threaded end or threaded portion disposed on the connector 1850 such that the outer shell 1800 and the connector 1850 are secured. Alternatively, in some implementations, the outer shell 2800 can be coupled to the connector 2850 using one or more coupling mechanisms including, but not limited to screws, bolt fasteners, welding, brazing, adhesives, or any combination thereof. In other implementations, the outer shell 2800 can be coupled to the connector 2850 via an engineering fit, interreference fit, press fit and/or friction fit. For example, in some embodiments, the connector 2850 can include an interference fit that can secure the outer shell 2800 to the connector 2850 by friction, after a surface defining the opening of the outer shell 2800 and the connector 2850 are pushed together.

The connector 2850 can be any suitable mechanism by which the inner shell 2750 and the outer shell 2800 of the container 2700 form a thermally insulated and airtight structure that can be coupled to the insulated cap 2100 to form the insulated carrier 2000. As shown in FIGS. 10, 11 and 12, in some implementations the connector 2850 includes a threaded portion 2806 configured to be coupled to a similarly threaded portion of the outer shell 2800 to provide a secure and gas tight connection. The connector 2850 is also configured to be coupled to the inner shell 2750 via an engineering fit, interreference fit, press fit and/or friction fit. Alternatively, the connector 2850 can be coupled to the inner shell 2750 using an adhesive, screws, bolt fasteners, welding, brazing, or any combination thereof. The connector 2850 can be configured to prevent and/or avoid leaks of phase change material (PCM) from the container 2700 to the surrounding environment, as well as any leaks of gases such as air, and/or moisture from the surrounding environment into the container 2700. Similarly, the connector 2850 can be configured minimize heat losses from the interior of the refrigerated carrier 2000 and the exterior environment (e.g., air at ambient conditions) surrounding the refrigerated carrier 2000. That is, the mechanism of the connector 2850 can be configured to reduce the rate of heat transfer between the interior side or face of the insulated cap 2100, which is in contact with (an can be thermally equilibrated with) the storage compartment 2754, and the exterior surfaces of the refrigerated carrier 2000 exposed to air at ambient conditions.

In some embodiments, the connector 2850 can include a threaded end or threaded portion that can be coupled to a similarly sized threaded end disposed on the insulated cap 2100 and/or the container coupling 2400 such that the container 2700 and the insulated cap 2100 and are secured producing a thermally insulated air tight seal. The mechanism of the connector 2850 to secure the insulated cap 2100 and the container 2700 is not limited to any particular mechanism and can include any mechanism and/or combination of mechanisms whereby the insulated cap 2100 and the container 2700 are secured together creating a thermally insulated and airtight seal.

FIG. 11 shows a cross-sectional front view of the refrigerated carrier 2000, formed by coupling the insulation cap 2100 to the container 2700. The refrigerated carrier 2000 can be configured to facilitate (i) transferring sample specimen containers that hold biological material such as capillary blood samples, directly (without exposure to ambient conditions) and automatically (without direct human intervention) from a sample processing unit (not shown) into the storage compartment 2754 of the refrigerated carrier 2000, and (ii) maintaining the sample specimen containers at a refrigerated temperature, preserving the integrity of the sample during their transport from a collection site to an analysis site.

In use, the refrigerated carrier 2000 can be cooled and/or pre-chilled prior to its use storing and/or transporting sample specimen containers. The refrigerated carrier 2000 can be cooled and/or pre-chilled by any suitable means. For example, the refrigerated carrier 2000 can be cooled by exposing the storage compartment 2754 of the container 2700 to a media and/or fluid at a sufficiently low temperature for a period of time, and subsequently coupling the insulated cap 2100 via the container coupling 2400 and/or the connector 2850 to preserve the low temperature inside the container 2700. In some instances, the storage compartment 2750 can be loaded with a low temperature media such as solid carbon dioxide (e.g., dry ice) for a period of time to cool the container 2700 and cause the transition of the PCM material 2804 to its lower temperature phase (e.g., solidification). In other instances, the storage compartment 2754 of the container 2700 can be exposed to a low temperature cryogenic liquid such as nitrogen, helium, argon, and/or methane to cool the container 2700 and cause the transition of the PCM material 2804 to its lower temperature phase.

The transition of the PCM material 2804 from its higher temperature phase to its lower temperature phase (e.g., transition from liquid to solid) can be referred to as "charging" the container 2700 and/or the refrigerated carrier 2000. In some instances, the refrigerated carrier 2000 can be charged at the sample collection site prior to its use. In other instances, the refrigerated carrier 2000 can be charged and stored at a centralized location, and then be transferred to a sample collection sample for further use. The charged container 2700 can be then coupled to the insulated cap 2100 with the aid of the container coupling 2400 to prevent warming of the storage compartment 2754 to ambient temperature, with the concomitant undesired formation and/or accumulation of water condensate and/or excessive moisture. In some implementations, the container 2700 can be coupled to a single, unique insulated cap 2100 (e.g., the insulated cap 2100 and the container 2700 are configured to be a match). In such implementations, the container coupling 2400 of the insulated cap 2100 and/or the connector 2800 of the container 2700 may be configured to have a matching threaded portion such that only that only one particular insulated cap 2100 can be coupled to a particular container 2700. In other implementations, the container 2700 can be coupled to any insulating cap 2100. That is, the container coupling 2400 of the insulated cap 1100 comprises a threaded portion configured to be matched to any container 1700.

The charged refrigerated carrier 2000 can be used to store sample specimen containers prior to and during their transfer to an analysis site. The refrigerated carrier 2000 can be coupled to a sample processing unit via the sample processing unit coupling 2650 to enable automatic loading of sample specimen containers comprising biological material such as capillary blood samples processed at the sample processing unit, as further described herein. The refrigerated carrier 2000 can include one or more structures such as the handles 2103 shown on FIGS. 4 and 11, configured to enable a user to lift the refrigerated container 2000 and align the coupling 2650 with a component of the sample processing unit facilitating the refrigerated carrier 2000 to be received and/or loaded in the sample processing unit. In such implementations, the size and weight of the charged refrigerated container 2000 can be selected so that an average user can lift the refrigerated carrier 2000. In other implementations, the refrigerated carrier 2000 can include one or more structures configured such that a component of the sample processing unit can receive and/or load the charged refrigerated carrier 2000 without direct human intervention (e.g., automatically), as further described herein.

The charged refrigerated carrier 2000 can be configured such that the communications module 2600 can transmit a signal representative of the temperature of the storage compartment 2754 (measured by the temperature sensor 2500) to the sample processing unit upon loading of the charged refrigerated carrier 2000 on the sample processing unit. In some implementations, the communications module 2600 can transmit an RF signal representative of the temperature of the storage compartment 2754 at predetermined frequency specifically selected to overcome interferences caused by the materials of the refrigerated carrier 2000 surrounding the communication module 2600, such that a control unit the sample processing unit (not shown) can receive the signal. For example, in some implementations the communication module 2600 can be configured to transmit a radio signal representative of the temperature of the storage compartment 2754 at about 800 Hz, overcoming interference caused by the materials of the refrigerated carrier and/or the sample processing unit.

Figure 13:
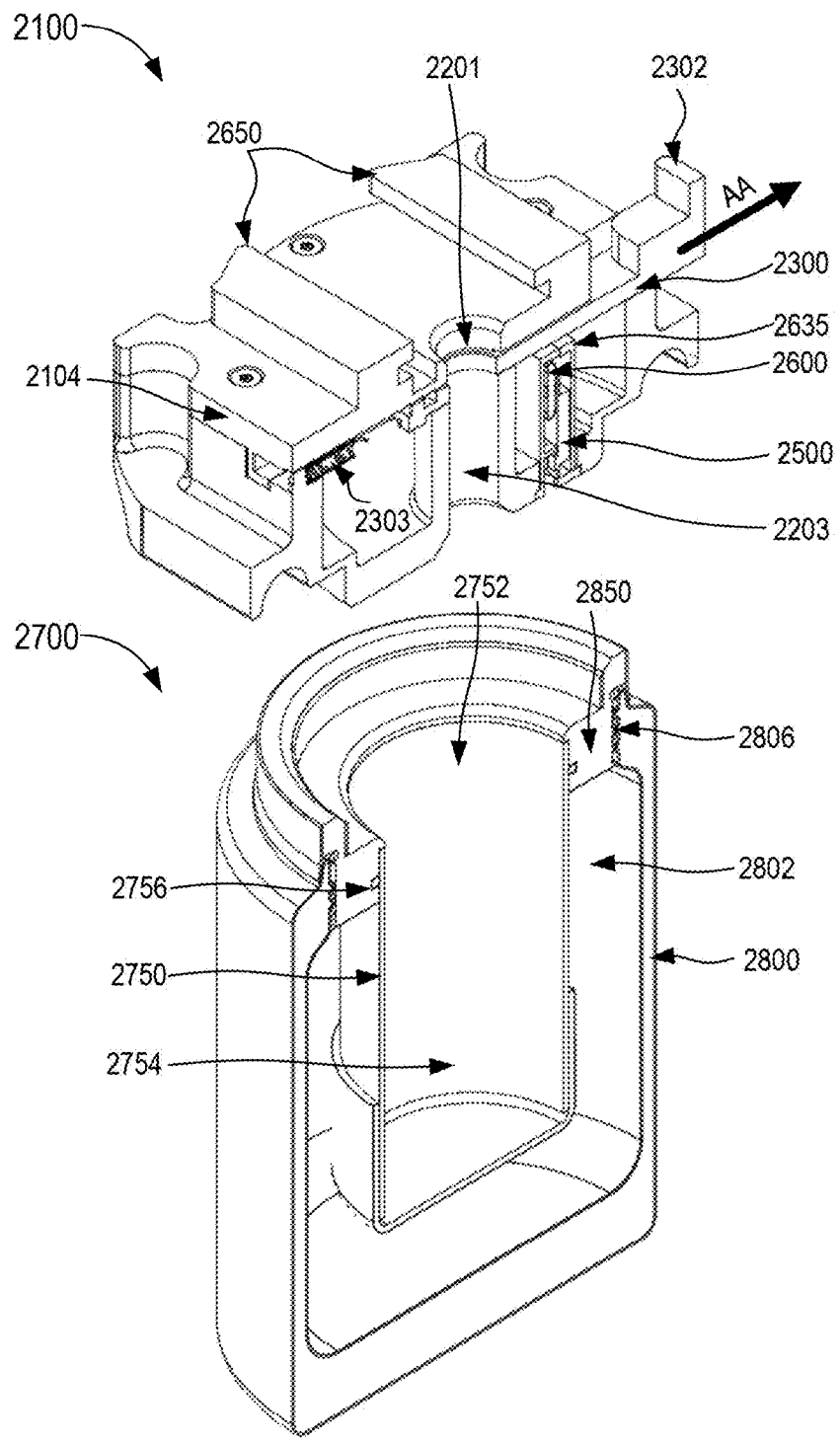
FIG. 13 is a cross-sectional perspective view of the refrigerated carrier of FIG. 11 in an open configuration according to an embodiment.

As described above, the charged refrigerated carrier 2000 can be engaged by a component of the sample processing unit to load one or more sample specimen containers via the insulated cap 2100 according to an automated manner (e.g., without direct human intervention). In some implementations the engagement member 2302 of the gate 2300 can be engaged by one or more components of the sample processing unit to transition the gate 2300 from the closed configuration to the open configuration. For example, as shown in FIG. 12, the gate 2300 of the insulated cap 2100 can initially be in the closed configuration owing to the action of the biasing member 2303. The gate 2300 can be transitioned from the closed configuration to the open configuration with the aid of one or more components of the sample processing unit which can exert a force on the engagement member 2302 to overcome the o force exerted on the gate 2300 by the biasing member 2303 and thus cause the gate 2300 to slide and/or move. FIG. 13 shows the engagement member 2302 of the gate 2300 can be engaged to move the gate 2300 in the direction marked by the arrow AA. The movement of the gate 2300 in the direction AA can effectively transition the gate 2300 from the closed configuration to the open configuration. In the open configuration, shown on FIG. 13, the opening 2304 is aligned with the access port 2200 facilitating sample specimen containers to be automatically loaded from the sample processing unit into the storage compartment 2754.

In some implementations, the refrigerated carrier 2000 can be configured to allow automatic loading of sample specimen containers only when the temperature measured by the temperature sensor 2500 is within a predetermined range. In such implementations, a process control unit of the refrigerated carrier 2000 can, for example, control a magnet biasing member 2303 of the gate 2300 to prevent the transitioning of the gate 2300 from the closed configuration to the open configuration until the temperature of the storage compartment 2754 is within a predetermined range. For example, in some implementations, the refrigerated carrier 2000 can be configured to allow automatic loading of sample specimen containers only when the temperature measured by the temperature sensor 2500 is between about 2° C. and about 8° C.

In some implementations, the charged refrigerated carrier 2000 can be configured to receive sample specimen containers one at a time. In other implementations, the charged refrigerated carrier 2000 is configured to receive multiple sample specimen containers simultaneously. The charged refrigerated carrier 2000 can be configured to receive sample specimen containers in any suitable manner. For example, in some implementations, the charged refrigerated carrier 2000 can be configured to receive sample specimen containers fed by gravity from an automatic loading magazine, as further described herein. In other implementations, the charged refrigerated carrier 2000 can be configured to receive sample specimen containers fed with the aid of an elevator, a sample holder, a clamp, and/or the like included on the sample processing unit.

The charged refrigerated carrier 2000 can be configured to store one or more sample specimen containers in the storage compartment 2754 at a low temperature for a predetermined amount of time. In some instances, the charged refrigerated carrier 2000 can be loaded with sample specimen containers and remain disposed inside the sample processing unit for a period of time until a currier can retrieve the charged refrigerated carrier and transport it to an analysis site for analysis of the samples. In other instances, the charged refrigerated carrier 2000 can be loaded with sample specimen containers and then retrieved by a carrier for transport to an analysis site. In some implementations, the charged refrigerated carrier 2000 can be configured to store sample specimen containers in the storage compartment 2754 at a low temperature for a period of time of no more than 2 hours, no more than 4 hours, no more than 8 hours, no more than 16 hours, no more than 24 hours, no more than 36 hours, no more than 48 hours, no more than 72 hours, no more than 96 hours, inclusive of all values and ranges therebetween. In some embodiments, the charged refrigerated carrier 2000 can be configured to store sample specimen containers in the storage compartment 2754 at a low temperature for a period of time of at least about 96 hours, at least about 60 hours, at least about 48 hours, at least about 44 hours, at least about 36 hours, at least about 30 hours, at least about 24 hours, at least about 20 hours, at least about 15 hours, at least about 12 hours, at least about 8 hours, at least about 4 hours, at least about 2 hours, inclusive of all values and ranges therebetween. Combinations of the above referenced ranges for the period of time the refrigerated carrier 2000 can store sample specimen containers at low temperature are also possible (e.g., a period of time of at least about 5 hours to no more than about 40 hours, at least about 16 hours to no more than about 96 hours).

Figure 14:
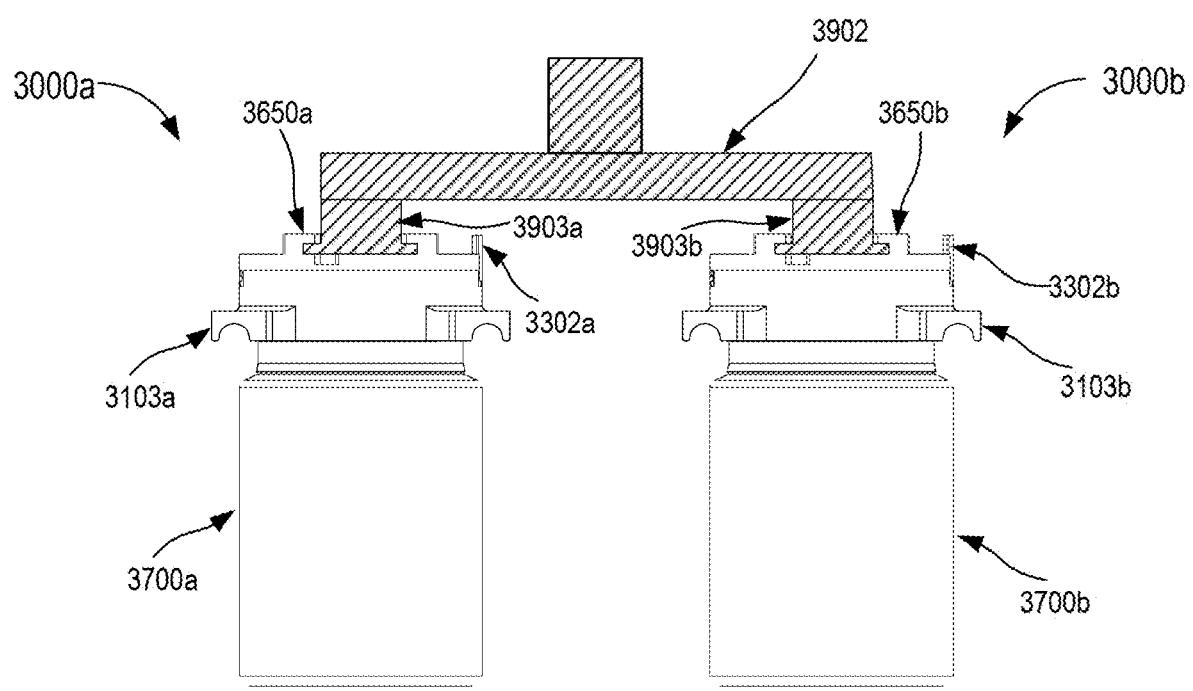
FIG. 14 is a front view of two refrigerated carriers coupled to an adapter that is configured to be removably coupled to a sample processing unit, according to an embodiment.

FIG. 14 illustrates two refrigerated carriers 3000a and 3000b coupled to one another, according to an embodiment. The refrigerated carriers 3000a and 3000b can be any suitable shape, size, and/or configuration. For example, at least a portion of the refrigerated carriers 3000a and 3000b can be similar to and/or substantially the same as one or more portions (and/or combination of portions) of the refrigerated carrier 1000 and/or 2000, in form and/or in function, (or any suitable combinations thereof) described above. Thus, portions of the refrigerated carriers 3000a and 3000b may not be described in further detail herein.

FIG. 14 shows the refrigerated carriers 3000a and 3000b coupled to a loading component 3902 of a sample processing unit (not shown) to facilitate the automatic loading and/or transfer of sample specimen containers from the sample processing unit to the refrigerated carriers 3000a and 3000b. The refrigerated carriers 3000a and 3000b include one or more structures such as the handles 3103a and 3103b which can enable a user to lift the refrigerated containers 3000a and 3000b and align the couplings 3650a and 350b with the loading component 3902 of the sample processing unit. In some implementations, the couplings 3650a and 3650b can be configured to support the weight of the refrigerated carriers and the sample specimen containers loaded in the container 3700a and 3700b. In other implementations, the couplings 3650a and 3650b can be configured to partially support the weight of the refrigerated carrier 3000 when the refrigerated carrier 3000 is disposed on the loading component 3902 of the sample processing unit.

FIG. 14 shows the refrigerated carriers 3000a and 3000b can only be coupled to the loading component 3902 when the refrigerated carriers 3000a/3000b are oriented in such manner that the end portions 3903a and 3903b of the loading component 3902 can occupy the space between the rails comprising the couplings 3650a and 3650b. In some implementations, the orientation that the refrigerated carriers 3000a and 3000b can assume when coupled to the sample processing unit can be predetermined such that a communication module (e.g., similar to or the same as communication module 2600) (not shown in FIG. 14) is disposed adjacent to a control unit of a sample processing unit, facilitating the communication between said sample control unit and the refrigerated carriers 3000a and 3000b and minimizing signal interferences caused by the insulating materials used to fabricate the refrigerated carriers as well as the sample processing unit. For example, FIG. 14 shows the refrigerated carriers 3000a and 3000b can only be coupled to the loading component 3902 when the refrigerated carriers are oriented in such a way that the end portions 3903a and 3903b can slide within the couplings 3650a and 3650b. That orientation may correspond to a short distance between the communication module of the refrigerated carriers 3000a and 3000b and one or more component of the sample processing unit, facilitating and/or improving the exchange of signals between the refrigerated carriers and the sample processing unit.

FIG. 14 shows the loading component 3902 of a sample processing unit can include and/or be coupled to a device and/or mechanism suitable for engaging the engagement member 3302a and 3302b to transition the gates of the refrigerated carriers 3000a and 3000b automatically (without direct human intervention) from the closed configuration to the open configuration, as previously described with reference to the refrigerated carriers 1000 and 2000. The automatic transitioning (e.g., without direct human intervention) of the gates of the refrigerated carriers 3000a and 3000b from the closed configuration to the open configuration to facilitate loading of the sample specimen containers from the sample processing unit into a storage compartment of the refrigerated carriers 3000a and 3000b without major human intervention can bypass potential errors caused by a technician.

Figure 15:
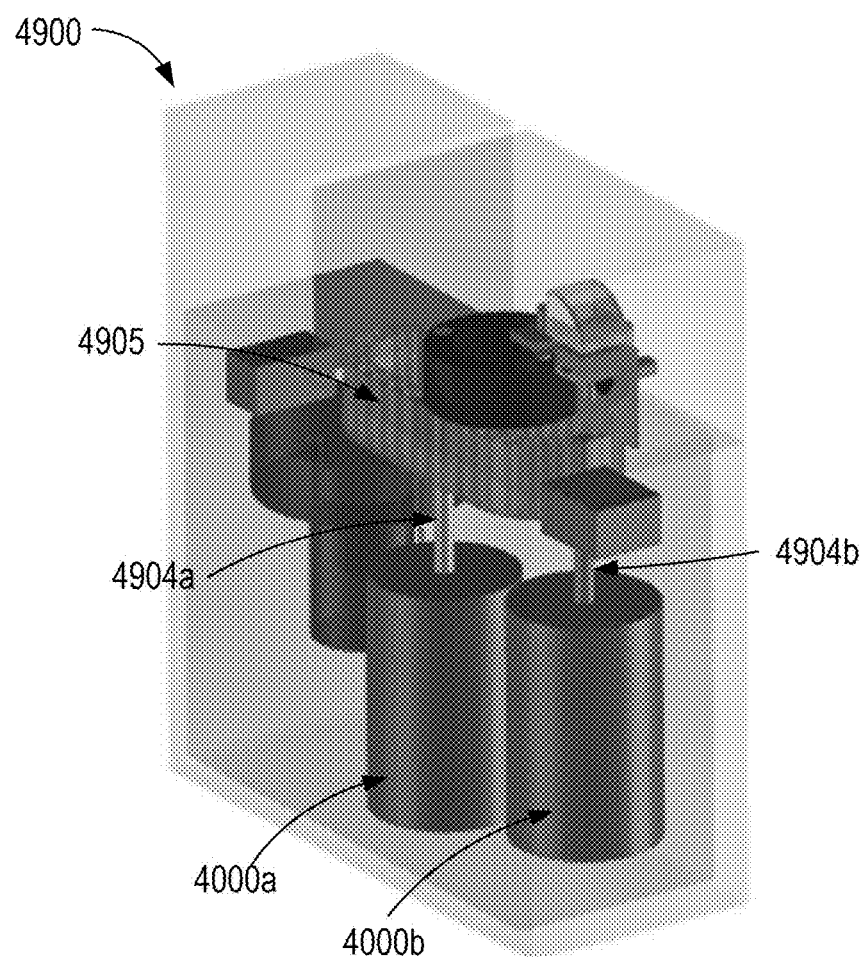
FIG. 15 is a schematic illustration of two refrigerated carriers of FIG. 14 coupled to an adapter and operably disposed in a sample loading device according to an embodiment.
Figure 16:
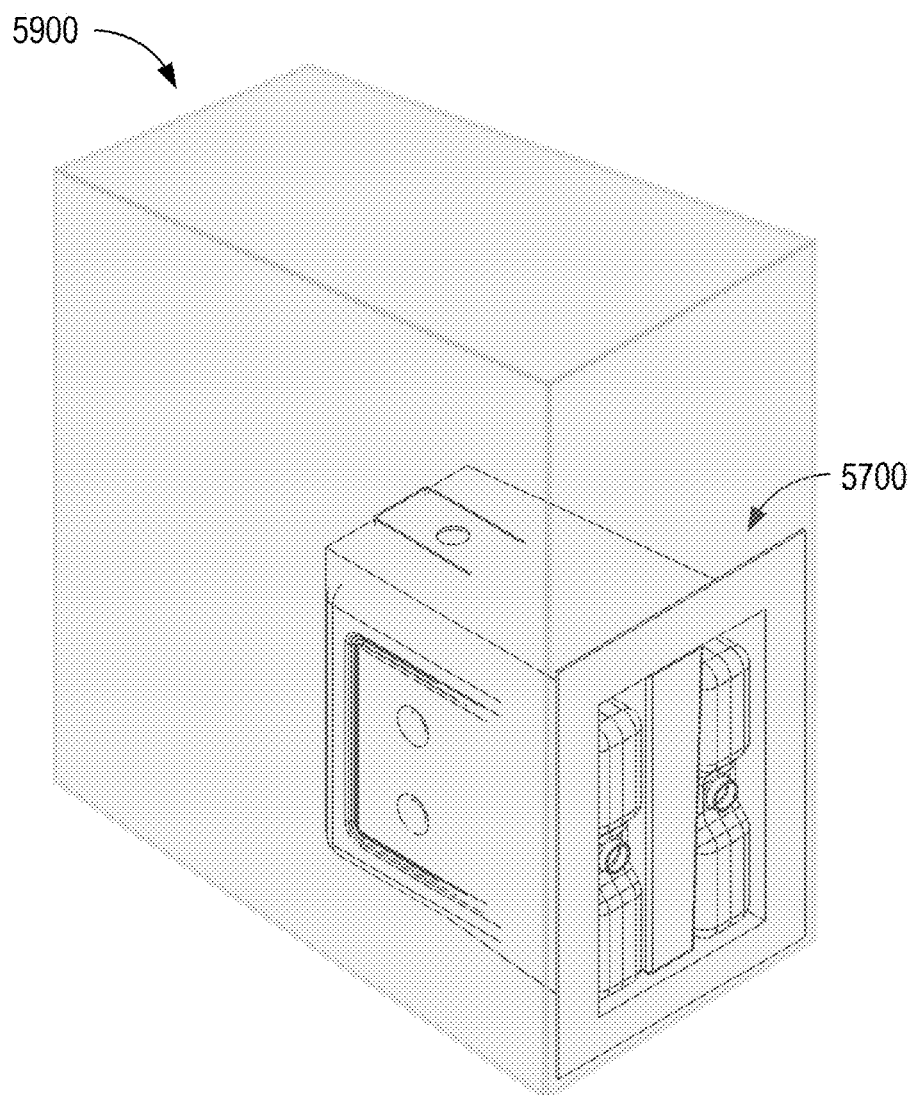
FIGS. 16 and 17 are a partially exploded perspective view and a front view, respectively, of a container configured to be removably coupleable to a sample processing unit, according to an embodiment.

FIG. 15 shows a schematic illustration of two refrigerated carriers 4000a and 4000b disposed inside a sample processing unit 4900, according to an embodiment. The refrigerated carriers 4000a and 4000b can be any suitable shape, size, and/or configuration. For example, at least a portion of the refrigerated carriers 4000a and 4000b can be similar to and/or substantially the same as one or more portions (and/or combination of portions) of the refrigerated carrier 1000, 2000 and/or 3000 (or any suitable combinations thereof), in form and/or in function, described above. Thus, portions of the refrigerated carriers 4000a and 4000b may not be described in further detail herein.

The refrigerated carriers 4000a and 4000b can be oriented and/or aligned with a loading component 4904a and 4904b of the sample processing unit 4900 configured to load, transfer, and/or feed one or more sample specimen containers into the refrigerated carriers 4000a and 4000b. In some implementations, the refrigerated carriers 4000a and 4000b can be configured to receive sample specimen containers one at a time. In other implementations, the refrigerated carriers 4000a and 4000b can be configured to receive multiple sample specimen containers simultaneously. The refrigerated carriers 4000a and 4000b can receive sample specimen containers fed by gravity from the automatic loading magazine 4905, shown in FIG. 15. Alternatively, in other implementations, the refrigerated carriers 4000a and 4000b can be configured to receive sample specimen containers fed with the aid of an elevator, a sample holder, a clamp, and/or the like (none of which are shown here) included on the sample processing unit 4900

FIGS. 16-21 show a container 5700 configured to be removably coupled to a sample processing unit 5900, according to an embodiment. The container 5700 can be coupled to a cap (e.g., an insulated cap, not shown) to form a refrigerated carrier that can be removably coupleable to the sample processing unit 5900. The container 5700 can be coupled to the sample processing unit 5900 to facilitate the automatic loading and/or transfer of sample specimen containers from the sample processing unit 5900 to the container 5700. In some implementations, the sample processing unit 5900 can include a gate substantially similar to the gates 1300 and 2300 described above with reference to FIGS. 1-9. In such implementations, the container 5700 can be coupled to an insulated cap or lid that may not include a gate, and instead, the system may rely only on the gate of the sample processing unit 5900 to open and close access from the sample processing unit 5900 into a storage compartment of the container 5700 when the container 5700 is disposed within or otherwise operably coupled to the sample processing unit 5900. In some implementations the container 5700 can be coupled to an insulated cap or lid that does not include a gate (and instead relies on a gate disposed on the container 5700) and does not include a temperature sensor and/or a communications module. In such implementations, the container 5700 may include a temperature sensor and/or a communications module, as further described herein.

Figure 17:
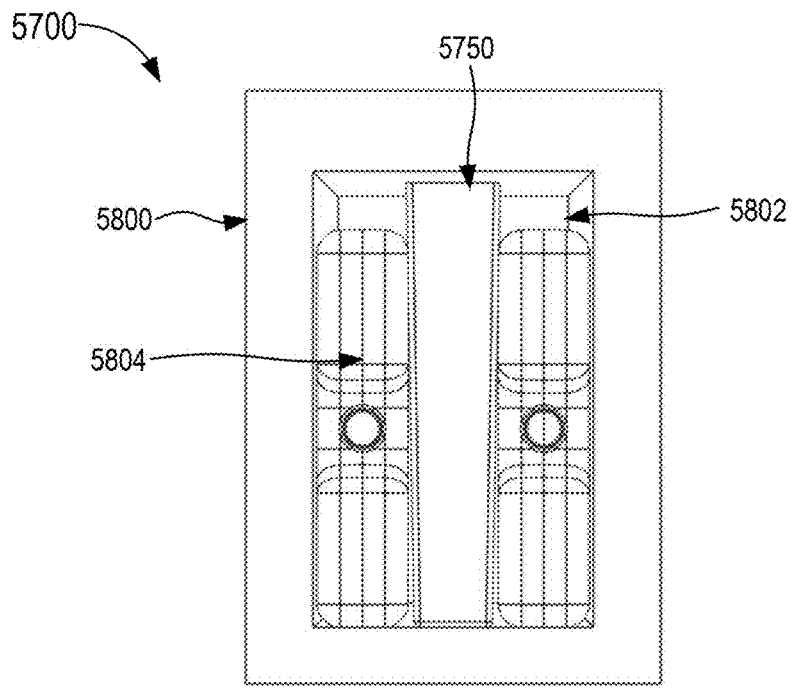

The container 5700 (or portions thereof) can be similar to and/or substantially the same as one or more portions (and/or combination of portions) of the container 1700 and the container 2700 described above with reference to FIGS. 2 and 10. Thus, portions of the container 5700 may not be described in further detail herein. The container 5700 can be configured to store the sample specimen containers under controlled conditions such as a constant temperature, typically below ambient temperature, to prevent the degradation of the biological material stored inside each one of the sample container specimens. FIG. 17 shows the container 5700 includes an inner shell 5750, and an outer shell 5800. The outer shell 5800 provides a barrier to the container 5700 against the external environment surrounding the container 5700 and defines an interior space and/or volume suitable for accommodating the inner shell 5750. The inner shell 5750 is disposed inside the outer shell 5800 such that the inner shell 5750 and the outer shell 5800 define a region, space and/or volume 5802 located outside of the inner shell 5750 and inside the outer shell 5800 adjacent to the inner shell 5750. The region, space and/or volume 5802 can be used to accommodate a PCM 5804. In some implementations, the PCM 5804 can disposed inside one or more container that facilitate replacing and/or exchanging the PCM 5804, as shown in FIG. 17. In some implementations, the inner shell 5750 can be coupled to the outer shell 800 via a connector (not shown).

Figure 18:
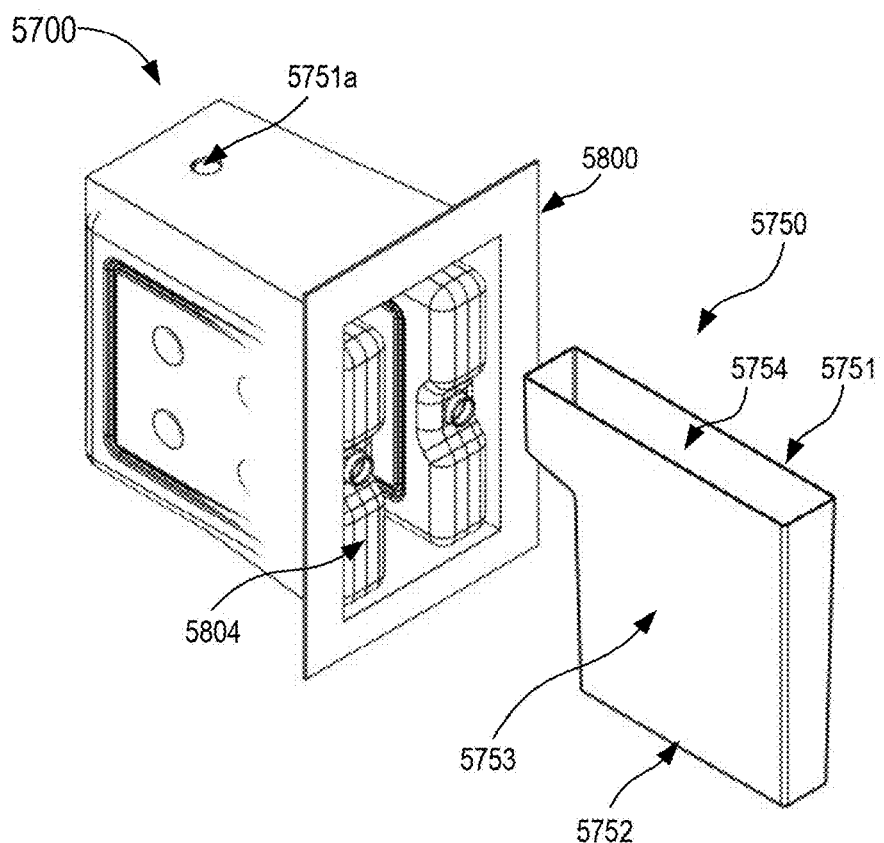
FIG. 18 is a partially exploded perspective view of the container of FIG. 16, displaying an inner shell, an outer shell, and two containers including a phase change (PCM) material.
Figure 19:
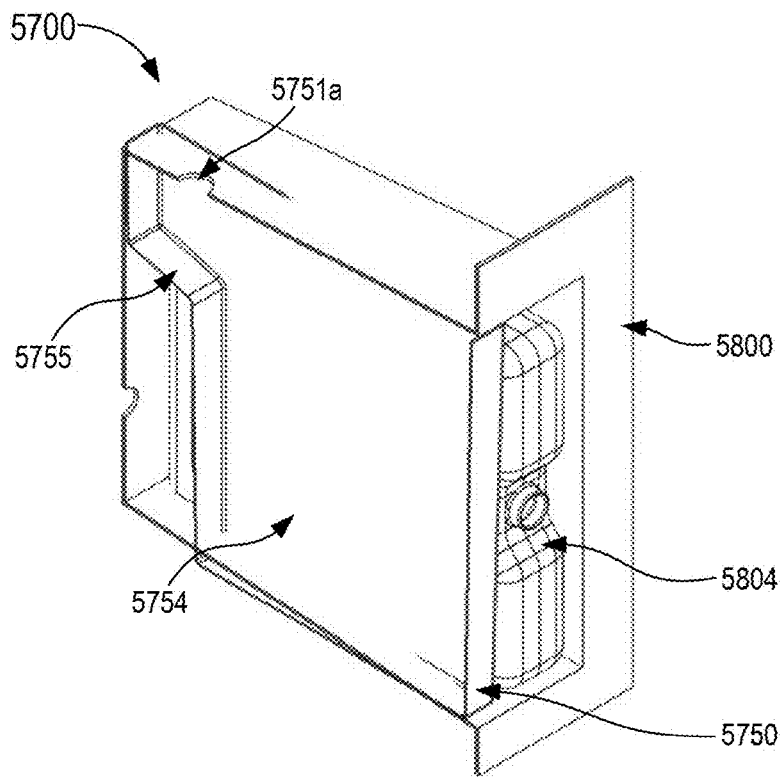
FIG. 19 is a cross-sectional perspective view of the container of FIG. 16.
Figure 20:
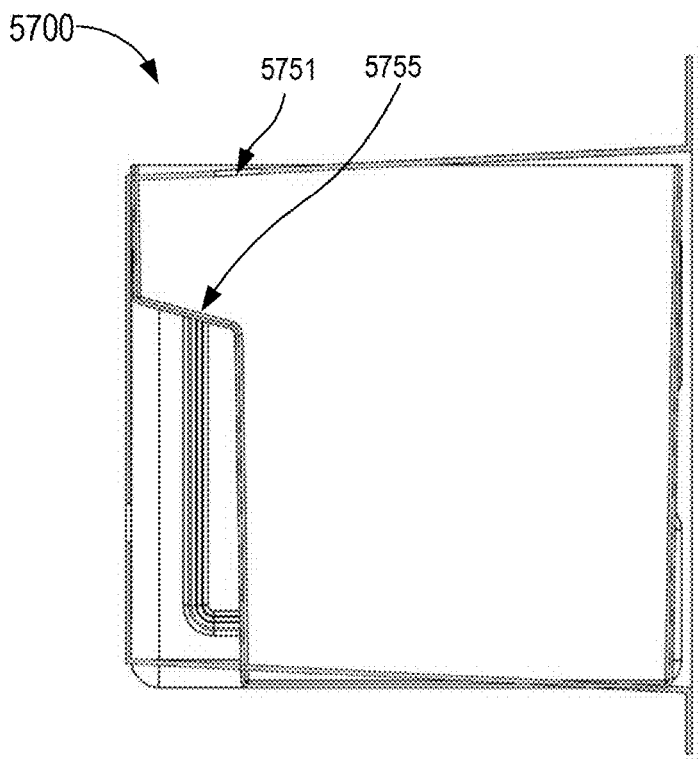
FIG. 20 is a cross-sectional side view of the container of FIG. 16

FIG. 18 shows a partially exploded perspective view of the container 5700, displaying the inner shell 5750. The inner shell has a three-dimensional shape defined by a length and a substantially rectangular cross-sectional area. FIG. 18 shows the inner shell 5750 includes an open end 5751, a closed end 5752, and a lateral wall 5753, which collectively define a storage compartment 5754. FIGS. 19 and 20 show the storage compartment 5754 includes a biasing member 5755. The biasing member 5755 can be any suitable structure configured to convey, encourage, urge, or otherwise direct (or re-direct) a sample container as it enters the storage compartment 5754 (via the open end 5751 and the opening 5751a on the outer shell 5800) to a particular location within the storage compartment 1755 to maximize the usable storage capacity of the storage compartment 5754. The biasing member 5755 is a ledge (also referred to as a kick ledge) or ramp that causes a sample container (e.g., tube) to move towards a front side or corner of the storage compartment 5754 (e.g., in cases in which the opening to the storage compartment 5754 is on its back side or corner), so that the storage compartment 5754 fills from the front side or corner, and as additional sample containers are added, they stack on one another beginning from that front side or corner, thereby increasing, maximizing, and/or optimizing the usable volume of the storage compartment 5754.

Figure 21:
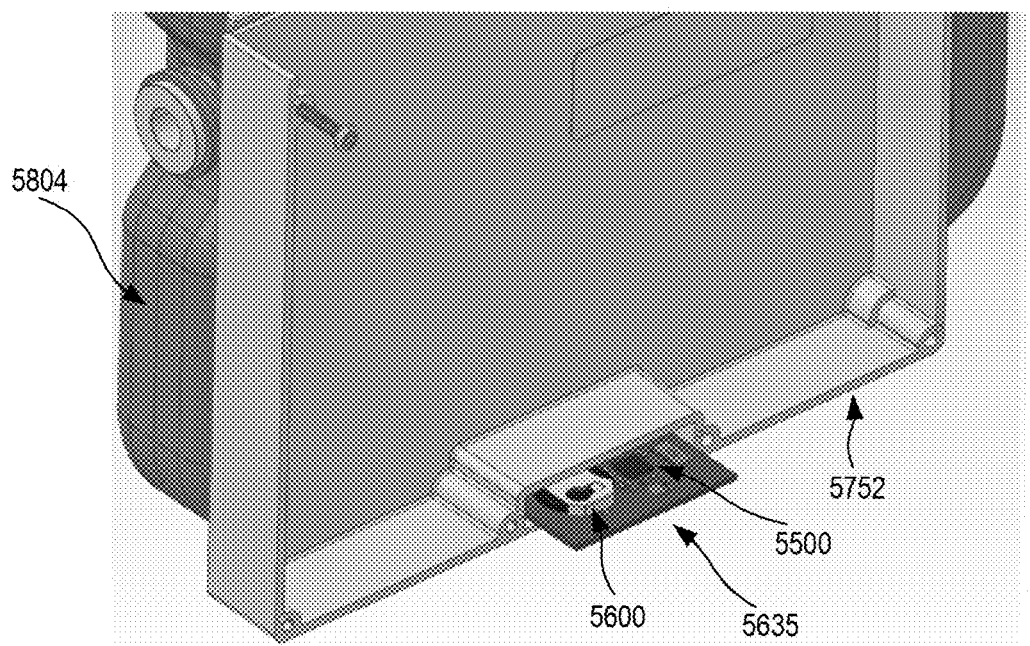
FIG. 21 is a cross-sectional perspective view of a portion of the container of FIG. 16 displaying a communications module and temperature sensor cartridge.

As described above, in some implementations the container 5700 can be coupled to an insulated cap or lid that does not include a temperature sensor and/or a communications module. In such implementations, the container 5700 can include a temperature sensor 5500 disposed on the closed end 5752 of the inner shell 5750, as shown in FIG. 21. The temperature sensor 5500 can be similar to and/or substantially the same as the temperature sensor 1500 and 2500 described above. For example, the temperature sensor 5500 can be a sensor configured to sense and quantify a temperature representative of the temperature of the storage compartment 5754. The temperature sensor 5500 can include and/or be a thermocouple, a resistance temperature detector (RTD), a thermistor, and/or a semiconductor based integrated circuit, disposed on the closed end 5752 of the inner shell 5750 such that the sensor can be in close proximity and thermal communication with a storage compartment 5754 of the container 5700. In some implementations, the temperature sensor 5500 can include one or more thermocouples including for example an E-type, J-Type, K-type, N-type, T-type, and/or R/S-type thermocouple. In some implementations the thermocouple(s) can be disposed on inner shell 5750 near to or adjacent to the interior side or bottom side of the storage compartment 5754, such that the thermocouple(s) can be in thermal communication with at least a portion of a storage compartment 5754 of the container 5700.

In some implementations, the container 5700 can include a communications module 5600 disposed on the closed end 5752 of the inner shell 5750, as shown in FIG. 21. The communications module 5600 can be similar to and/or substantially the same as the communications module 1600 and 2600 described above. For example, the communications module 5600 can be any suitable device configured to receive signals representative of a temperature sensed and/or measured by the temperature sensor 5500 of the container 5700, and transmit signals, including the signals received from the temperature sensor 5500 of the container 5700, to one or more external devices such as for example, the sample processing unit 5900. This communications module 5600 can be disposed on the inner shell 5750 in close physical proximity to a temperature sensor, as described above. In that way, the communications module 5600 and the temperature sensor 5500 of the container 5700 can be electrically coupled without requiring long wires and/or lines connecting the two components.

As Shown in FIG. 17, in some implementations the container 5700 can include a communications module 5600 and a temperature sensor 5500 disposed on a cartridge 5635 that facilitates rapidly replacing and/or exchanging either component in case of a malfunction. The communications module 5600 can include a transducer (e.g., an RF antenna) configured to convert an electrical signal (e.g., a voltage) received from a transmitter such as the temperature sensor 5500 of the container 5700 into a radio signal. The RF antenna can also be configured to pick up radio signals emitted by one or more external devices and convert them into a voltage that can be stored and/or transmitted to one or more components of the container 5700. In that way, the communications module 5600 can receive signals (for example a voltage) representative of the temperature sensed and/or measured by the probe of the temperature sensor 5500 and convert those signals into a high frequency radio signal that can be transmitted and received by one or more external devices such as the sample processing unit 5900, or other devices located on a remote location. In some implementations, the communications module 5600 of the container 5700 can include an RF antenna configured to produce radio signals at a predetermined frequency specifically selected to overcome interferences caused by materials surrounding the communication module, such as for example, an insulating component of the container 5700. For example, in some implementations the communication module 5600 of the container 5700 can be configured to produce radio signals of suitable frequencies (e.g., a frequency of at least about 300 Hz to no more than about 850 Hz, or at least about 860 Hz to no more than about 930 Hz).

While various embodiments have been described above, it should be understood that they have been presented by way of example only, and not limitation. While the embodiments have been particularly shown and described, it will be understood that various changes in form and details may be made. Where schematics and/or embodiments described above indicate certain components arranged in certain orientations or positions, the arrangement of components may be modified. Although various embodiments have been described as having particular features and/or combinations of components, other embodiments are possible having a combination of any features and/or components from any of embodiments as discussed above. For example, as described above, the refrigerated carrier 3000 can be a combination of certain features and/or aspects of the refrigerated carriers 1000 and/or 2000.

The invention claimed is:

1. An apparatus, comprising:
    a container defining a storage compartment with an opening, the container configured to remove heat from the storage compartment; the container including:
        an inner shell defining the storage compartment;
        an outer shell disposed adjacent to the inner shell and defining a region between the inner shell and the outer shell; and
        a phase change material disposed in the region between the inner shell and the outer shell, the phase change material configured to remove heat from the storage compartment;
    an insulated cap configured to be removably coupled to the container and to a sample loader, the insulated cap including a gate configured to be engaged by an adapter of the sample loader to transition the gate between a closed configuration in which the gate seals the opening, and an open configuration in which the gate unseals the opening; and
    a sensor disposed in one of the container or the insulated cap, the sensor configured to measure a temperature of the storage compartment.

2. The apparatus of claim 1, wherein the container further comprises a communications module operably coupled to the sensor, the communications module configured to read the temperature measured by the sensor and transmit a signal representative of the temperature to an external device.

3. The apparatus of claim 2, wherein the communication module is configured to transmit the signal at a frequency of at least about 800 Hz.

4. The apparatus of claim 1, wherein the container is configured to maintain the temperature of the storage compartment between about 2° C. and about 8° C.

5. The apparatus of claim 4, wherein the container is configured to maintain the temperature of the storage compartment continuously for at least 48 hours.

6. The apparatus of claim 1, wherein the phase change material includes a paraffin.

7. The apparatus of claim 1, wherein the inner shell includes a thermally conductive material.

8. The apparatus of claim 7, wherein the thermally conductive material includes copper.

9. The apparatus of claim 1, wherein the gate in the open configuration allows samples to be transferred through the opening and into the storage compartment when the insulated cap is coupled to the container.

10. The apparatus of claim 9, wherein the gate is biased into the closed configuration.

11. The apparatus of claim 9, wherein the insulated cap includes a biasing member configured to bias the gate into the closed configuration.

12. The apparatus of claim 11, wherein the biasing member is a spring.

13. The apparatus of claim 1, wherein the insulated cap includes a coupling member configured to be coupled to the adapter of the sample loader, the sample loader configured to convey sample specimen containers into the storage compartment when the coupling member is coupled to the adapter and the adapter is coupled to the sample loader.

14. An apparatus, comprising:
    a container including an inner shell and outer shell, the inner shell defining a storage compartment with an opening, the outer shell being disposed adjacent to the inner shell and defining a region between the inner shell and the outer shell;
    a phase change material disposed within the region between the inner shell and the outer shell and configured to remove heat from the storage compartment;
    an insulated cap configured to be coupled to the container and to a sample loader, the insulated cap including a gate configured to be engaged by an adapter of the sample loader to transition the gate between a closed configuration in which the gate seals the opening, and an open configuration in which the gate unseals the opening; and
    a biasing member disposed within the storage compartment, the biasing member configured to bias the gate into the closed configuration.

15. The apparatus of claim 14, wherein the apparatus further comprises:
    a sensor configured to measure a temperature of the storage compartment; and a communications module operably coupled to the sensor, the communications module configured to read and transmit the temperature measured by the sensor to an external device.

16. The apparatus of claim 15, wherein the communication module is configured to transmit the temperature of the storage compartment at a frequency of at least about 800 Hz.

17. The apparatus of claim 16, wherein the container is configured to maintain the temperature of the storage compartment between about 2° C. and about 8° C.

18. The apparatus of claim 17, wherein the container is configured to maintain the temperature of the storage compartment continuously for at least 48 hours.

19. The apparatus of claim 14, wherein the phase change material is a paraffin.

20. The apparatus of claim 14, wherein the inner shell includes a thermally conductive material.

21. The apparatus of claim 20, wherein the thermally conductive material is copper.

22. The apparatus of claim 14, wherein the outer shell is insulated.

23. An insulated cap configured to be coupled to a container and to a sample loader such that the sample loader can load a sample into a storage compartment of the container via the insulated cap, the insulated cap comprising:
    an access port extending therethrough; and
    a gate configured to be engaged by an adapter of the sample loader operable to transition the gate between a closed configuration in which the gate seals the access port; and an open configuration in which the gate unseals the access port, thereby allowing a sample to be transferred through the access port and into the storage compartment of the container when the insulated cap is coupled to the container.

24. The insulated cap of claim 23, further comprising:
a sensor configured to measure a temperature of the storage compartment; and
a communications module operably coupled to the sensor, the communications module configured to read the temperature measured by the sensor and transmit a signal representative of the temperature to an external device.

25. The insulated cap of claim 24, wherein the communications module includes a Radio-Frequency Identification (RFID) tag.

26. The insulated cap of claim 24, wherein the communications module is configured to transmit the signal at a frequency of at least about 800 Hz.

27. The insulated cap of claim 23, wherein the gate is biased into the closed configuration.

28. The insulated cap of claim 27, wherein the gate further comprises a biasing member configured to bias the gate into the closed configuration.

29. The insulated cap of claim 28, wherein the biasing member is a spring.

30. The insulated cap of claim 23, further comprising:
a coupling member configured to couple the insulated cap to the sample loader.

31. The insulated cap of claim 30, wherein the coupling member includes a rail configured to be coupled to the adapter of the sample loader.

\* \* \* \* \*